US008282494B2

(12) United States Patent
Saeki et al.

(10) Patent No.: US 8,282,494 B2
(45) Date of Patent: Oct. 9, 2012

(54) DAMPER DEVICE

(75) Inventors: Tomohiro Saeki, Anjo (JP); Satoshi Nakagaito, Kariya (JP); Yoshitaka Inoshita, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 410 days.

(21) Appl. No.: 12/535,403

(22) Filed: Aug. 4, 2009

(65) Prior Publication Data

US 2010/0032259 A1 Feb. 11, 2010

(30) Foreign Application Priority Data

Aug. 7, 2008 (JP) .................................. 2008-203799

(51) Int. Cl.
*F16F 15/129* (2006.01)
(52) U.S. Cl. ...................... 464/46; 464/68.41; 464/68.8
(58) Field of Classification Search .................... 464/46, 464/68.4, 68.41, 68.7, 68.8; 192/213.11, 192/213.12, 213.21, 213.22
See application file for complete search history.

(56) References Cited

U.S. PATENT DOCUMENTS

| | | | |
|---|---|---|---|
| 4,966,261 A * | 10/1990 | Kohno et al. ........ | 192/213.11 X |
| 5,120,276 A | 6/1992 | Maucher et al. | |
| 5,123,877 A | 6/1992 | Maucher et al. | |
| 5,151,065 A | 9/1992 | Maucher et al. | |
| 5,180,335 A | 1/1993 | Maucher et al. | |
| 5,269,725 A | 12/1993 | Maucher et al. | |
| 5,456,634 A | 10/1995 | Maucher et al. | |
| 5,590,752 A | 1/1997 | Takehira et al. | |
| 5,649,864 A | 7/1997 | Rohrle et al. | |
| 5,743,371 A | 4/1998 | Takehira et al. | |
| 5,871,401 A | 2/1999 | Maucher et al. | |
| 5,992,593 A | 11/1999 | Yamamoto | |
| 6,056,103 A * | 5/2000 | Hashimoto et al. ...... | 192/213.12 |
| 6,409,605 B1 * | 6/2002 | Hemeryck .................. | 464/68.8 |

(Continued)

FOREIGN PATENT DOCUMENTS

JP 58-131431 A 8/1983

(Continued)

OTHER PUBLICATIONS

U.S. Appl. No. 12/476,774, filed Jun. 2, 2009, entitled "Torque Fluctuation Absorbing Apparatus" naming Satoshi Nakagaito, Tomohiro Saeki, Tsutomu Sekine and Yoshitaka Inoshita as inventors.

(Continued)

*Primary Examiner* — Gregory Binda
(74) *Attorney, Agent, or Firm* — Buchanan Ingersoll & Rooney PC

(57) ABSTRACT

A damper device includes damper portions arranged in series with each other in a power transmission path and absorbing torsion by means of elastic force, hysteresis portions arranged in parallel with the damper portions at the power transmission path and absorbing the torsion by means of friction force, an input plate inputting rotational torque into one of the damper portion closest to the input side and the hysteresis portion closest to the input side, an intermediate plate transmitting the rotational torque from the damper portion, arranged at the input side, and the hysteresis portion, arranged at the input side, to the damper portions, arranged at the output side, and the hysteresis portions, arranged at the output side, and an output plate outputting the rotational torque from the damper portion closest to the output side and the hysteresis portion closest to the output side.

12 Claims, 27 Drawing Sheets

U.S. PATENT DOCUMENTS

| | | | |
|---|---|---|---|
| 7,837,018 B2 * | 11/2010 | Nakamura | 464/68.8 X |
| 7,993,206 B2 * | 8/2011 | Sugiyama et al. | 464/68.7 |
| 2003/0213237 A1 | 11/2003 | Ebata et al. | |

FOREIGN PATENT DOCUMENTS

| | | | |
|---|---|---|---|
| JP | 59-194635 U | | 12/1984 |
| JP | 06-040467 U | | 5/1994 |
| JP | 6-213280 A | | 8/1994 |
| JP | 7-71524 A | | 3/1995 |
| JP | 8-4835 A | | 1/1996 |
| JP | 10-311373 A | | 11/1998 |
| JP | 11-166593 A | | 6/1999 |
| JP | 2000-274488 A | | 10/2000 |
| JP | 2003-278836 A | | 10/2003 |
| JP | 2006-161895 A | | 6/2006 |

OTHER PUBLICATIONS

Japanese Office Action issued Apr. 24, 2012 by the Japanese Patent Office in Japanese Patent Application No. 2008-203799, and partial English translation of Official Action.

U.S. Appl. No. 12/535,276, filed Aug. 4, 2009 entitled "Damper Device" naming Tomohiro Saeki, Satoshi Nakagaito, Yoshitaka Inoshita, Masanori Suzuki and Hiroaki Suezaki as inventors.

U.S. Appl. No. 12/535,321, filed Aug. 4, 2009 entitled "Damper Device" naming Tomohiro Saeki, Makoto Takeuchi, Hiroaki Suezaki, Yoshitaka Inoshita and Atsushi Yamazumi as inventors.

Japanese Office Action issued Jul. 10, 2012 by the Japanese Patent Office in Japanese Patent Application No. 2008-203799, and partial English translation of Official Action discussing relevance of cited documents.

* cited by examiner

F I G. 18
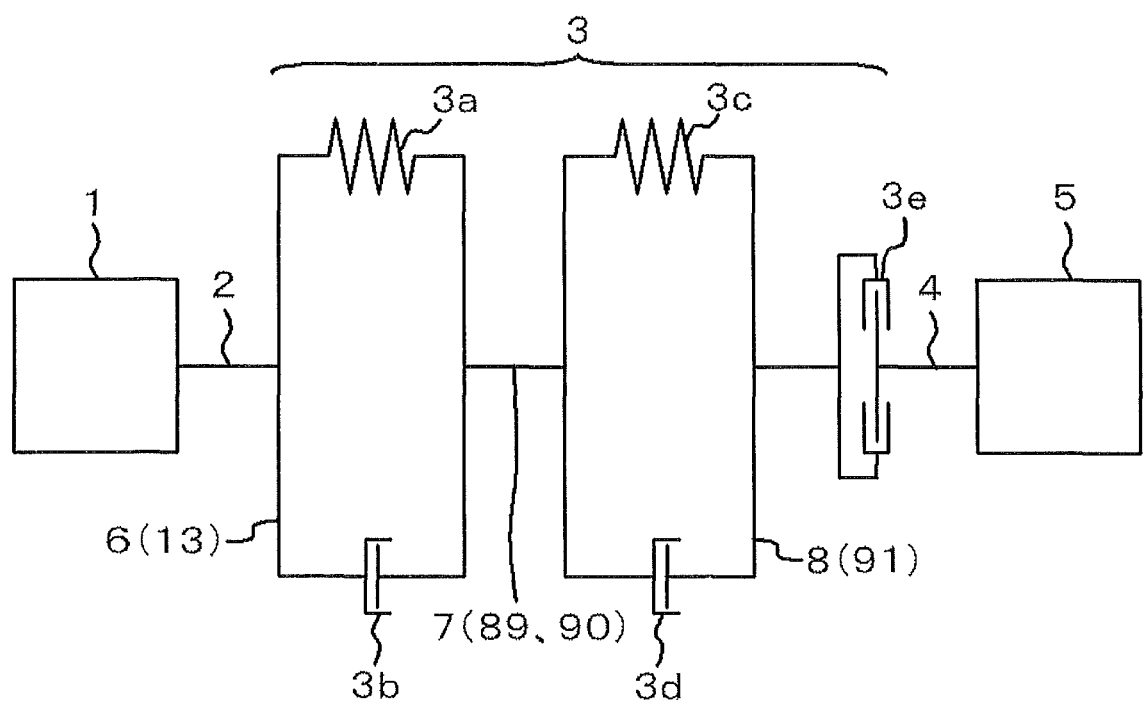

DAMPER DEVICE

CROSS REFERENCE TO RELATED APPLICATIONS

This application is based on and claims priority 35 U.S.C. §119 to Japanese Patent Application 2008-203799, filed on Aug. 7, 2008, the entire contents of which is incorporated herein by reference.

TECHNICAL FIELD

This disclosure relates to a damper device for absorbing a torque fluctuation generated between rotational shafts. More specifically, the disclosure relates to a damper device having damper portions arranged in series with each other.

BACKGROUND

A damper device is arranged at a power transmission path between an engine and a clutch, for example, so as to absorb a torque fluctuation generated between the engine and a transmission. When the torque fluctuation is generated, the damper device absorbs torsion (the torque fluctuation) by means of elastic force of coil springs and friction force (hysteresis torque) generated by friction materials. A conventional damper device includes two kinds of damper portions (coil springs and elastic members), each of which is arranged in series with each other, in order to absorb a torque fluctuation in accordance with a driving state of an engine (for example, at the time when the engine is started, and at the time when the engine is in an idling state).

According to JP2003-278836A, a torque fluctuation absorber absorbs a torque fluctuation of a driving source in a hybrid vehicle having both an internal combustion engine and an electric motor, which is driven by means of electricity supplied from a battery, as the driving source, and an electric generator, which is configured to charge the battery with an electrical energy generated by driving the internal combustion engine. The torque fluctuation absorber is configured to absorb the torque fluctuation of the internal combustion engine by means of a first torsion member and a second torsion member, whose torsional rigidity is larger than the first torsion member. The torsional rigidity of the first torsion member is set to absorb a torque fluctuation of the internal combustion engine, the torque fluctuation being generated when the electric generator generates the electrical energy by means of the internal combustion engine.

However, in the torque fluctuation absorber according to JP2003-278836A, the first torsion member, which is provided at a radially inward portion, is arranged between a flange portion and a hub portion. As a result of such structural limitation, the first torsion member of the torque fluctuation absorber is limited to absorb a small amount of torque. Accordingly, a performance of absorbing the torque fluctuation by means of the first torsion member is achieved only when the small amount of torque is generated from the engine that is in the idling state and the like. Further, a torsion angle may not be set to be large at a position where the first torsion member is arranged, and therefore, the torsional rigidity is set at a high level so as to absorb only a relatively small amount of torque.

Further, the first torsion member is arranged at a space between an inner spline of the flange portion and an outer spline of the hub portion in a circumferential direction. Therefore, only a part of end surfaces of the first torsion member contact the inner spline of the flange portion and the outer spline of the hub portion, and as a result, strength is limited and an impact is easily generated. Furthermore, splines are formed at the flange portion and the hub portion. Therefore, a processing cost is increased.

Furthermore, the hub portion, which is arranged at an output side, may include a large amount of inertia in order to absorb noise and vibration. However, according to the torque fluctuation absorber in JP2003-278836A, the hub portion is arranged at a more radially inward portion than the flange portion, and therefore, inertia of the hub portion may not be set to a large level.

A need thus exists for a damper device, which is not susceptible to the drawback mentioned above.

SUMMARY

This disclosure relates to a damper device inputting torque of a power source from an input side and outputting the torque to an output side, the damper device includes a plurality of damper portions arranged in series with each other in a power transmission path and absorbing torsion by means of elastic force, a plurality of hysteresis portions arranged in parallel with the plurality of damper portions at the power transmission path and absorbing the torsion by means of friction force, an input plate inputting rotational torque into one of the damper portion closest to the input side among the plurality of damper portions and the hysteresis portion closest to the input side among the plurality of hysteresis portions, an intermediate plate transmitting the rotational torque from the damper portion, arranged at the input side, and the hysteresis portion, arranged at the input side, to the damper portions, arranged at the output side, and the hysteresis portions, arranged at the output side, at a position between the damper portion closest to the input side and the damper portion closest to the output side and between the hysteresis portion closest to the input side and the hysteresis portion closest to the output side, and an output plate outputting the rotational torque from the damper portion closest to the output side among the plurality of damper portions and the hysteresis portion closest to the output side among the plurality of damper portions.

BRIEF DESCRIPTION OF THE DRAWINGS

The foregoing and additional features and characteristics of this disclosure will become more apparent from the following detailed description considered with the reference to the accompanying drawings, wherein:

FIG. 18 is a schematic view (a skeleton diagram) illustrating the configuration in which the damper device according to the modified example (embodiment 4-1) of embodiment 4 is provided between the engine and the component having the large amount of inertia;

DETAILED DESCRIPTION

Figure 1:
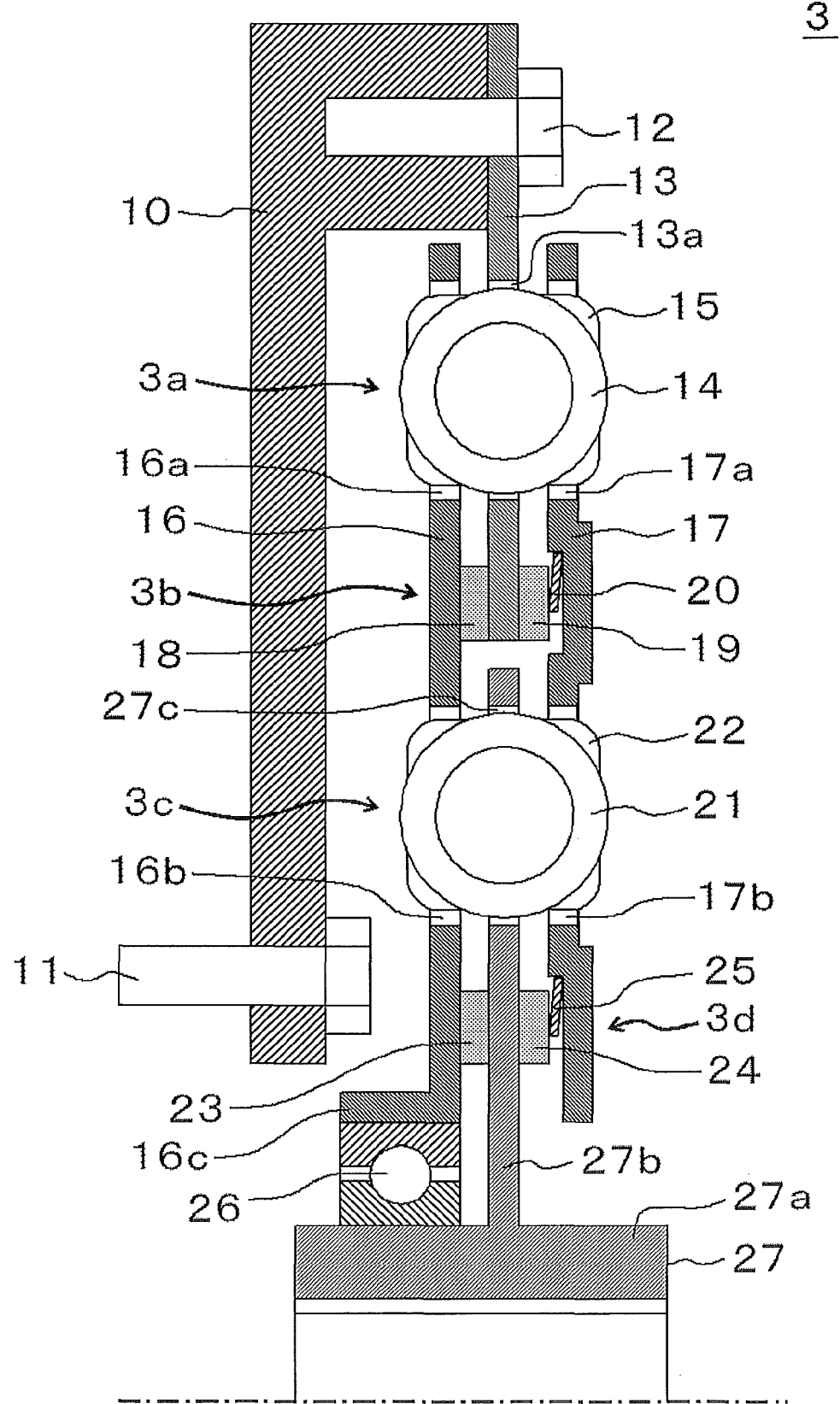
FIG. 1 is a cross-sectional view schematically illustrating a configuration of a damper device according to embodiment 1.

A damper device 3 inputting torque of a power source 1 from an input side and outputting the torque to an output side, the damper device 3 includes a plurality of damper portions (3a, 3c) arranged in series with each other in a power transmission path and absorbing torsion by means of elastic force, a plurality of hysteresis portions (3b, 3d) arranged in parallel with the plurality of damper portions (3a, 3c) at the power transmission path and absorbing the torsion by means of friction force, an input plate (13) inputting rotational torque into one of the damper portion (3a, 3c) closest to the input side among the plurality of damper portions (3a, 3c) and the hysteresis portion (3b, 3d) closest to the input side among the plurality of hysteresis portions (3b 3d), an intermediate plate (16, 17) transmitting the rotational torque from the damper portion (3a, 3c), arranged at the input side, and the hysteresis portion (3b, 3d), arranged at the input side, to the damper portions (3a, 3c), arranged at the output side, and the hysteresis portions (3b, 3d), arranged at the output side, at a position between the damper portion (3a, 3c) closest to the input side and the damper portion (3a, 3c) closest to the output side and between the hysteresis portion (3b, 3c) closest to the input side and the hysteresis portion (3b, 3c) closest to the output side, and an output plate (27, 27b) outputting the rotational torque from the damper portion (3a, 3c) closest to the output side among the plurality of damper portions (3a, 3c) and the hysteresis portion (3b, 3d) closest to the output side among the plurality of damper portions (3a, 3c). In the following embodiments, one first damper portion 3a, one second damper portion 3c, one first hysteresis portion 3b and one second hysteresis portion 3d are described in order to simplify an explanation. However, the number of the first damper portion 3a, the second damper portion 3c, the first hysteresis portion 3b, the second hysteresis portion 3d are not limited to the following description, and a modification will be made. Further, "axial direction" hereinafter corresponds to an axial direction of a rotational shaft of an engine (a rotational shaft of a component having a large amount of inertia), while "circumferential direction" corresponds to a circumferential direction of each plate and "radial direction" corresponds to a radial direction of each of the plate, unless otherwise indicated.

[First Embodiment]

Embodiment 1 of the damper device 3 will be described hereinafter with reference to the attached drawings.

Figure 2:
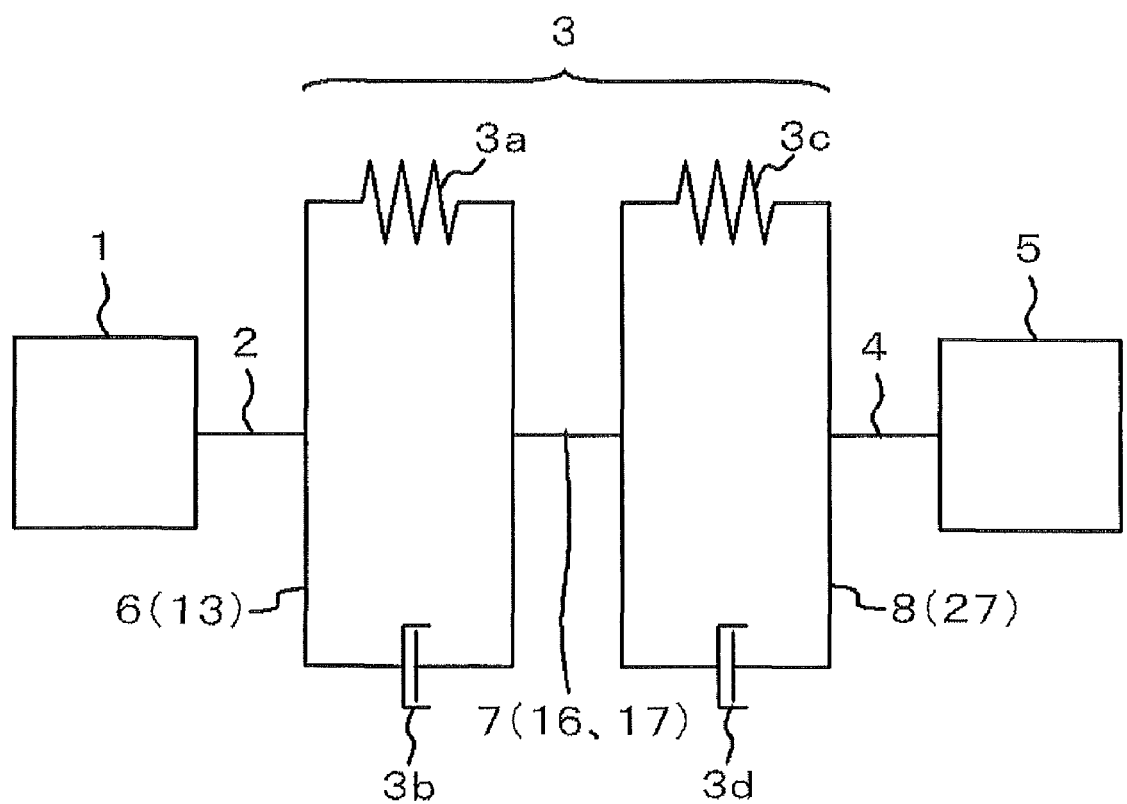
FIG. 2 is a schematic view (a skeleton diagram) illustrating a configuration in which the damper device according to embodiment 1 is provided between an engine and a component having a large amount of inertia.

As illustrated in FIG. 2, the damper device 3 according the embodiment 1 is provided, for example, between the first rotational shaft 2 of an engine 1 (a power source) and the second rotational shaft 4 of a component 5 (a clutch drum of an automatic transmission, a pulley of a Continuously Variable Transmission (CVT), a motor of a hybrid vehicle, and the like) having a large amount of inertia. The damper device 3 absorbs (restricts) a torque fluctuation generated by torsion of the first rotational shaft 2 and the second rotational shaft 4. The damper device 3, having a torsion-damping function, includes the first damper portion 3a, the second damper portion 3c, the first hysteresis portion 3b and the second hysteresis portion 3d. The first damper portion 3a and the second damper portion 3c absorb the torque fluctuation by means of the elastic force. The first hysteresis portion 3b and the second hysteresis portion 3d absorb (restrict) the torque fluctuation by means of the hysteresis torque, such as a friction force and the like. The first damper portion 3a and the second damper portion 3c are arranged to be in series with each other. A rotational torque of the first rotational shaft 2 is inputted into the first damper portion 3a via the input plate 6, and the first damper portion 3a then outputs a rotational torque thereof to the second damper portion 3c. The rotational torque of the first damper portion 3a is inputted into the second damper portion 3c via the intermediate plate 7, and the second damper portion 3c then outputs a rotational torque thereof to the second rotational shaft 4 via the output plate 8. The first damper portion 3a and the first hysteresis portion 3b are arranged to be in parallel with each other. The second damper portion 3c and the second hysteresis portion 3d are arranged to be in parallel with each other.

A maximum torsion torque of one of first and second damper portions 3a and 3c is set to be equal to or more than an engine torque. A maximum torsion torque of the other of first and second damper portions 3a and 3c is set to be a torsion torque equal to or more than half of the engine torque. Further, the maximum torsion torque of both of the first and second damper portions 3a and 3b are set to be the torsion torque equal to or more than the engine torque. According to the above-described settings, even when one of the first and second damper portions 3a and 3c is stopped by means of a stopper, the other of the first and second damper portions 3a and 3c absorbs an impact, and consequently durability is ensured.

The first and second hysteresis portions 3b and 3d may be set to include different hysteresis torque values. A hysteresis torque value of one of the first and second hysteresis portions 3b and 3d may be set to be equal to or more than three times of a hysteresis torque value of the other of the first and second hysteresis portions 3b and 3d. According to the above-described settings, a large vibration, such as a vibration generated when the engine 1 is started and the like, is restricted by means of the hysteresis portion, having the larger hysteresis torque value, and a small vibration, such as a vibration generated when a vehicle is driven and the like, is absorbed by means of the hysteresis portion, having the smaller hysteresis torque value.

The damper device 3 according to the configuration shown in FIG. 1 includes an input plate 13, first and second intermediate plates 16 and 17 and an output plate (a hub 27). The damper device 3 includes a first plate 10 (a connecting plate), first and second bolts 11 and 12, the input plate 13, a first coil spring 14 (an arc spring), a pair of first seat 15, the first and second intermediate plates 16 and 17, first and second thrust members 18 and 19, a first coned disc spring 20, a second coil spring 21 (an arc spring), a pair of second seat 22, third and fourth thrust members 23 and 24, a second coned disc spring 25, a bearing 26 (a guide) and the hub 27.

The first plate 10, formed into a substantially circular-shape, is fixed at, for example, the first rotational shaft 2 (see FIG. 2) of the engine 1 (see FIG. 2) by means of the first bolt 11. The first plate 10 includes a cylindrical portion, which protrudes from a vicinity of a radially outward end of the first plate 10 toward one side of an axial direction (toward a right side in FIG. 1). The input plate 13 is fixed at a surface of the cylindrical portion, the surface extending to be substantially orthogonal relative to the axial direction.

The input plate 13, formed into a substantially-circular shape, inputs a rotational torque to the first damper portion 3a and the first hysteresis portion 3b. The input plate 13 is fixed to the first plate 10 in the vicinity of a radially outward end portion of the input plate 13 by means of the second bolt 12. The input plate 13 is arranged between the first and second intermediate plates 16 and 17 to be spaced away therefrom. A first opening portion 13a, for accommodating the first coil spring 14 and the pair of first seat 15, is formed at a radially intermediate portion of the input plate 13, corresponding to the first damper portion 3a. The input plate 13 is provided in such a way that end surfaces of the first opening portion 13a in the circumferential direction contact/spaced away from the pair of first seat 15 respectively. The input plate 13 is slidably sandwiched between the first and second thrust members 18 and 19 at the first hysteresis portion 3b, which is arranged at a radially more inward portion of the first plate 13 than the first damper portion 3a.

The first coil spring 14 is a component of the first damper portion 3a. The first coil spring 14 is accommodated in the first opening portion 13a, a second opening portion 16a and a third opening portion 17a, which are formed at the input plate 13, the first intermediate plate 16 and the second intermediate plate 17, respectively, so as to contact the pair of first seat 15, which is respectively arranged at end portions of the first coil spring 14. The first coil spring 14 is compressed when the input plate 13 is rotated relative to the first and second intermediate plates 16 and 17 so as to absorb an impact generated by a rotational difference between the input plate 13 and the first and second intermediate plates 16 and 17. A straight-shaped spring, whose compressed direction extends in a straight line, or a straight-shaped bent spring, whose compressed direction extends in a straight line but being bent when being arranged, may be applied to the first coil spring 14. An arc spring, whose compressed direction extends along the circumferential direction, may be applied to the first coil spring 14 in order to absorb a greater amount of torsion torque.

The pair of first seat 15 is a component of the first damper portion 3a. The pair of first seat 15 is accommodated in the first, second and third opening portions 13a, 16a and 17a, which are formed at the input plate 13, the first intermediate plate 16 and the second intermediate plate 17, respectively. One of the first seat 15 is arranged between one end portion of the first coil spring 14 and one end surface of each of the first, second and third opening portions 13a, 16a and 17a in the circumferential direction. The other of the first seat 15 is arranged between the other end portion of the first coil spring 14 and the other end surface of each of the first, second and third opening portions 13a, 16a and 17a in the circumferential direction. The pair of first seat 15 may be made of a resin in order to reduce attrition of the first coil spring 14.

The first intermediate plate 16, formed into a substantially circular-shape, outputs a rotational torque, inputted by the first damper portion 3a and the first hysteresis portion 3b, while inputting the rotational torque into the second damper portion 3c and the second hysteresis portion 3d. The first intermediate plate 16 is connected to the second intermediate plate 17 by means of a rivet, and the like so as to be integrally rotated with the second intermediate plate 17. The second opening portion 16a, for accommodating the first coil spring 14 and the pair of first seat 15, is formed at a radially outward portion of the first intermediate plate 16, corresponding to the first damper portion 3a. The first intermediate plate 16 is provided in such a way that end surfaces of the second opening portion 16a in the circumferential direction contact/spaced away from the pair of first seat 15. The first intermediate plate 16 is press-fitted with the first thrust member 18 at the first hysteresis portion 3b, which is arranged at a radially more inward portion of the first intermediate plate 16 than the first damper portion 3a, so that the first intermediate plate 16 slides on the first thrust member 18. A fourth opening portion 16b, for accommodating the second coil spring 21 and the pair of second seat 22, is formed at a radially more inward portion of the first intermediate plate 16 than the first hysteresis portion 3b, corresponding to the second damper portion 3c. The first intermediate plate 16 is provide in such a way that end surfaces of the fourth opening portion 16b in the circumferential direction contact/spaced away from the pair of second seat 22. The first intermediate plate 16 is slidably press-fitted with the third thrust member 23 at the second hysteresis portion 3d, which is arranged at a radially more inward portion of the first intermediate plate 16 than the second damper portion 3c. The first intermediate plate 16 includes a cylindrical portion 16c, which is formed at a radially inward end of the first intermediate plate 16. The first intermediate plate 16 is supported by the hub 27 via the bearing 26 at an inner circumferential surface of the cylindrical portion 16c, so that the first intermediate plate 16 is rotatable relative to the hub 27.

The second intermediate plate 17, formed into a substantially circular-shape, outputs the rotational torque, inputted by the first damper portion 3a and the first hysteresis portion 3b, while inputting the rotational torque into the second damper portion 3c and the second hysteresis portion 3d. The second intermediate plate 17 is connected to the first intermediate plate 16 by means of the rivet, and the like so as to be integrally rotated with the first intermediate plate 16. The third opening portion 17a, for accommodating the first coil spring 14 and the pair of first seat 15, is formed at a radially outward portion of the second intermediate plate 17, corresponding to the first damper portion 3a. The second intermediate plate 17 is provided in such a way that end surfaces of the third opening portion 17a in the circumferential direction contact/spaced away from the pair of first seat 15. The second intermediate plate 17 supports the first coned disc spring 20 at the first hysteresis portion 3b, which is arranged at a radially more inward portion of the second intermediate plate 17 than the first damper portion 3a. A fifth opening portion 17b, for accommodating the second coil spring 21 and the pair of second seat 22, is formed at a radially more inward portion of the second intermediate plate 17 than the first hysteresis portion 3b, corresponding to the second damper portion 3c. The second intermediate plate 17 is provided in such a way that end surfaces of the fifth opening portion 17b in the circumferential direction contact/spaced away from the pair of second seat 22. The second intermediate plate 17 supports the second coned disc spring 25 at the second hysteresis portion 3d, which is arranged at a radially more inward portion of the second intermediate plate 17 than the second damper portion 3a.

The first thrust member 18 is a component of the first hysteresis portion 3b, and is a substantially circular-shaped friction material arranged between the input plate 13 and the first intermediate plate 16. The first thrust member 18 is slidably press-fitted with the input plate 13 and with the first intermediate plate 16.

The second thrust member 19 is a component of the first hysteresis portion 3b. The second thrust member 19 is a friction material formed into a substantially circular-shape. The second thrust member 19 is sandwiched between the input plate 13 and the second intermediate plate 17. The second thrust member 19 is biased by means of the first coned disc spring 20 from a direction of the second intermediate plate 17. The second thrust member 19 is slidably press-fitted with the input plate 13.

The first coned disc spring 20 is a component of the first hysteresis portion 3b. The first coned disc spring 20 is sandwiched between the second thrust member 19 and the second intermediate plate 17. The first coned disc spring 20, formed into a substantially disc shape, biases the second thrust member 19 toward the input plate 13.

The second coil spring 21 is a component of the second damper portion 3c. The second coil spring 21 is accommodated in the fourth opening portion 16b, the fifth opening portion 17b and a sixth opening portion 27c, which are formed at the first intermediate plate 16, the second intermediate plate 17 and an output plate 27b of the hub 27, respectively, so as to contact the pair of second seat 22, which is respectively arranged at end portions of the second coil spring 21. The second coil spring 21 is compressed, when the first and second intermediate plates 16 and 17 are rotated relative to the hub 27, so as to absorb an impact generated by a rotational difference between the first and second intermediate plates 16 and 17 and the hub 27. A straight-shaped spring, whose compressed direction extends in a straight line, or a straight-shaped bent spring, whose compressed direction extends in a straight line but being bent when being arranged, may be applied to the second coil spring 21. An arc spring, whose compressed direction extends along the circumferential direction, may be applied to the first coil spring 14 in order to absorb a greater amount of torsion torque.

The pair of second seat 22 is a component of the second damper portion 3c. The pair of second seat 22 is accommodated in the fourth, fifth and sixth opening portions 16b, 17b and 27c, which are formed at the first intermediate plate 16, the second intermediate plate 17 and the hub 27, respectively. The pair of second seat 22 is arranged between end portions of the second coil spring 21 and end surfaces of each of the fourth, fifth and sixth opening portions 16b, 17b, and 27c in the circumferential direction. The second seat 15 may be made of a resin in order to reduce attrition of the second coil spring 21.

The third thrust member 23 is a component of the second hysteresis portion 3d. The third thrust member 23 is a friction material formed into a substantially circular-shape. The third thrust member 23 is sandwiched between the first intermediate plate 16 and the output plate 27b of the hub 27. The third thrust member 23 is slidably press-fitted with the output plate 27b.

The fourth thrust member 24 is a component of the second hysteresis portion 3d. The fourth thrust member 24 is a friction material formed into a substantially circular-shape. The fourth thrust member 24 is sandwiched between the second intermediate plate 17 and the output plate 27b of the hub 27. The fourth thrust member 24 is biased by means of the second coned disc spring 25 from the direction of the second intermediate plate 17. The fourth thrust member 24 is slidably press-fitted with the output plate 27b.

The second coned disc spring 25 is a component of the second hysteresis portion 3d. The second coned disc spring 25 is sandwiched between the fourth thrust member 24 and the second intermediate plate 17. The second coned disc spring 25, formed into a substantially disc shape, biases the fourth thrust member 24 toward the output plate 27 of the hub 27.

The bearing 26 is a guide member for rotatably supporting the first intermediate plate 16 relative to the hub 27 at the inner circumference of the cylindrical portion 16c of the first intermediate plate 16. Another bearing, such as a bush and the like, may be used instead of the bearing 26.

The hub 27 outputs a rotational torque inputted by the second damper portion 3c and the second hysteresis portion 3d. The hub 27 includes the output plate 27b extending from a predetermined portion of an outer circumference of a hub portion 27a. A spline for being connected to the second rotational shaft 4 (see FIG. 2) is formed at an inner circumferential surface of the hub portion 27a. The hub portion 27a supports the first intermediate plate 16 via the bearing 26 so that the first intermediate plate 16 is rotatable relative to the hub 27. A sixth opening portion 27c, for accommodating the second coil spring 21 and the pair of second seat 22, is formed at a radially outward portion of the output plate 27b, corresponding to the second damper portion 3b. The output plate 27b is provided in such a way that end surfaces of the sixth opening portion 27c in the circumferential direction contact/spaced away from the pair of second seat 22. The output plate 27b is slidably sandwiched between the third and fourth thrust members 23 and 24 at surfaces of the second hysteresis portion 3d, which is arranged at a radially more inward portion of the output plate 27b than the second damper portion 3b, the surfaces extending to be substantially orthogonal relative to the axial direction.

According to embodiment 1, the hub 27, serving as the output plate, includes the output plate portion 27b. Therefore, inertia of the hub 27 is structurally set to be large, and consequently, performance of absorbing noise and vibration may be improved. Further, the first damper portion 3a is configured to absorb a torsion generated by a relative rotation between the first opening portion 13a of the input plate 13 and the second and third opening portions 16a and 17a of the first and second intermediate plates 16 and 17 (the second damper portion 3c is configured to absorb a torsion generated by a relative rotation between the sixth opening portion 27c of the hub 27 and the fourth and fifth opening portions 16b and 17b of the first and second intermediate plates 16 and 17). Therefore, a torsion angle may be increased and a torsional rigidity may be set to a relatively low level so as to absorb a high torque. Furthermore, the bearing 26 is provided between the first intermediate plate 16 and the hub 27. Therefore, eccentricity of the first intermediate plate 16 may be prevented.

A modified example (embodiment 1-1) of the damper device 3 according to embodiment 1 will be described hereinafter with reference to the attached drawings.

Figure 4:
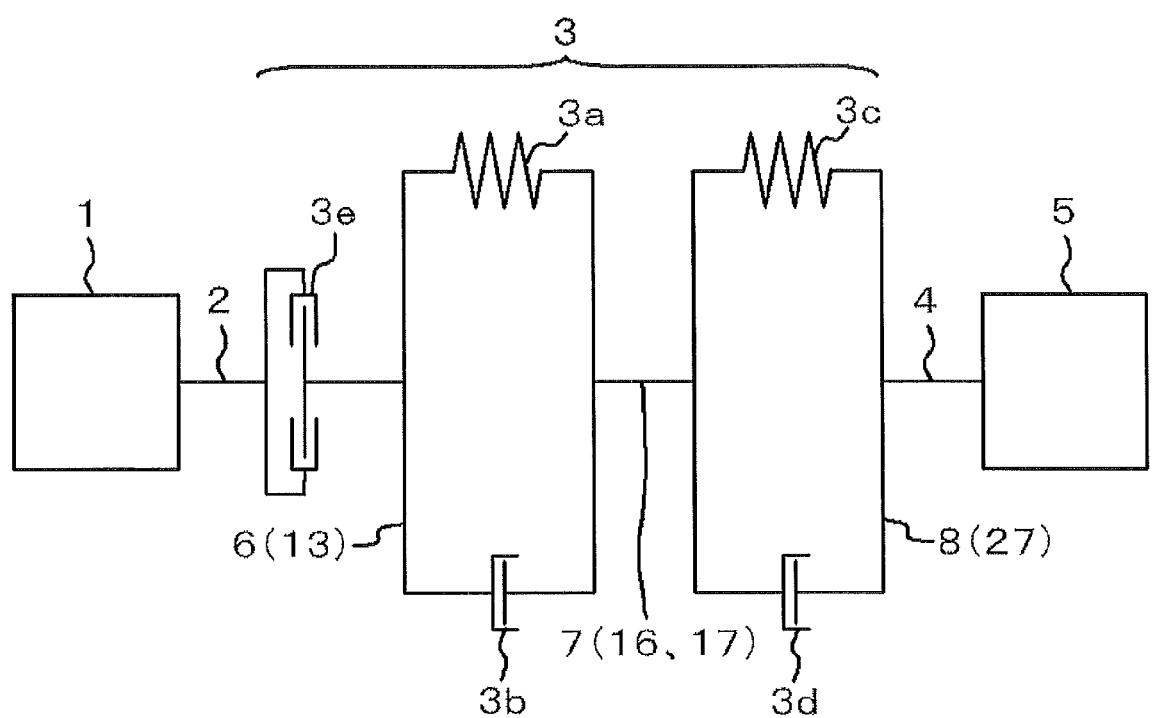
FIG. 4 is a schematic view (a skeleton diagram) illustrating the configuration in which the damper device according to the modified example (embodiment 1-1) of embodiment 1 is provided between the engine and the component having the large amount of inertia.

The damper device 3 according to embodiment 1-1 includes a limiter portion 3e (see FIG. 4). The limiter portion 3e is provided at a power transmission path between the first rotational shaft 2 and the first damper portion 3a so as to slide when a torsion generated between the first and second rotational shafts 2 and 4 reaches a level where the torsion is not absorbed by the first and second damper portions 3a and 3c and by the first and second hysteresis portions 3b and 3d. Other configurations of the damper device 3 according to embodiment 1-1 are similar to the damper device 3 according to embodiment 1 (see FIG. 1).

Figure 3:
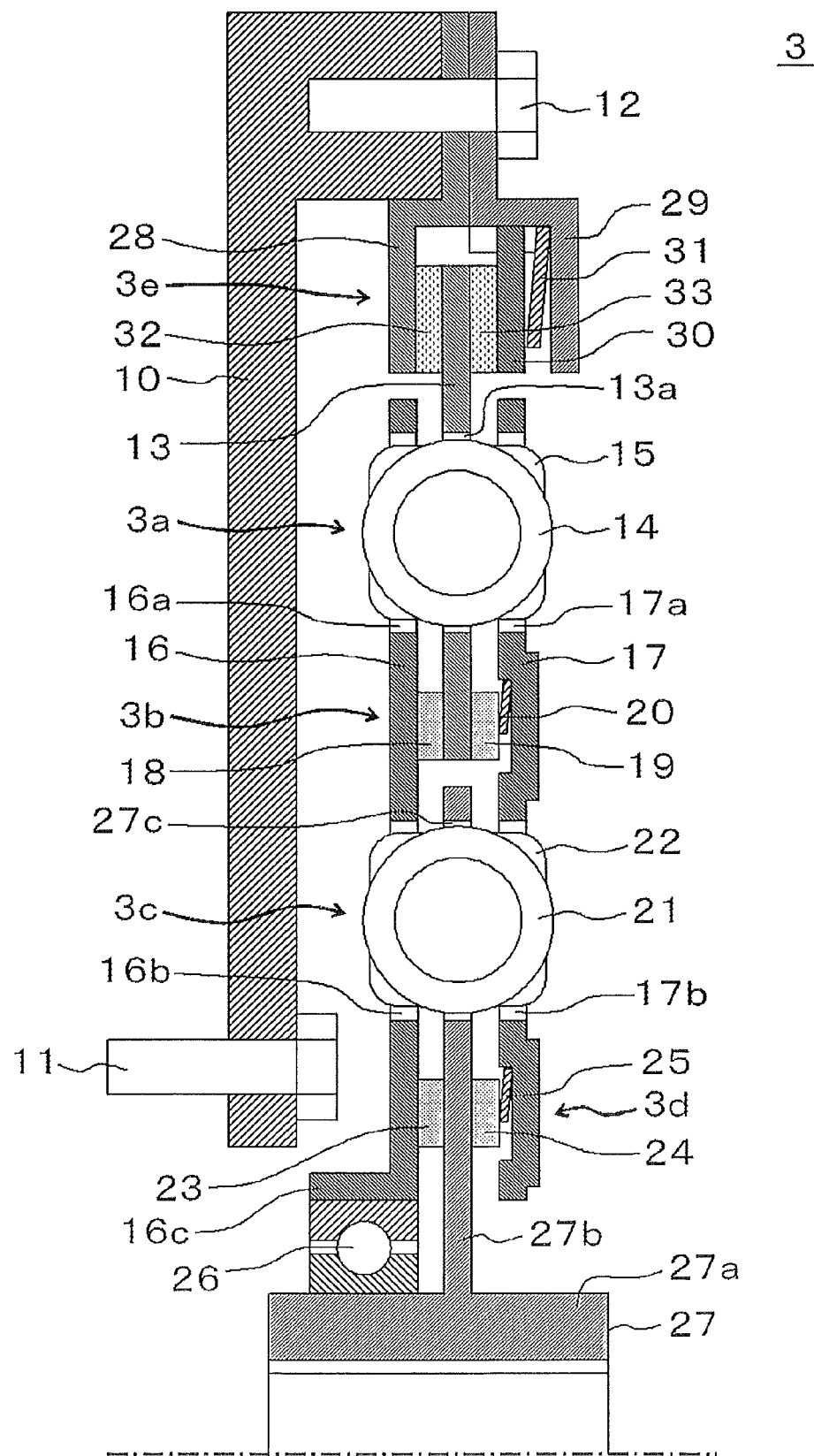
FIG. 3 is a cross-sectional view schematically illustrating the configuration of the damper device according to a modified example (embodiment 1-1) of embodiment 1.

The damper device 3 includes the limiter portion 3e at a radially more outward portion thereof than the first damper portion 3a (see FIG. 3). The limiter portion 3e may slide with an approximately 1.2 to 3 times greater torque than the engine torque. The damper device 3 includes second and third plates 28 and 29, a pressure plate 30, a third coned disc spring 31, first and second friction materials 32 and 33 and the input plate 13, as components of the limiter portion 3e.

The second plate 28, formed into a substantially circular-shape, is arranged between the first plate 10 and the third plate 29. The second plate 28 contacts the third plate 29 at a radially outward portion thereof, and the second plate 28 together with the third plate 29 are fixed at the first plate 10 by means of the second bolt 12. The second plate 28 is slidably press-fitted with the first friction material 32.

The third plate 29, formed into a substantially circular-shape, is arranged at a position more distant from the first plate 10 than the second plate 28 in the axial direction. The third plate 29 contacts the second plate 28 at an outer circumferential portion thereof, and the third plate 29 together with the second plate 28 are fixed at the first plate 10 by means of the second bolt 12. The third plate 29 supports the pressure plate 30 and the third coned disc spring 31 so as to restrict relative rotation between the third plate 29 and each of the pressure plate 30 and the third coned disc spring 31, and so that the pressure plate 30 and the third coned disc spring 31 are movable in the axial direction. The third plate 29 is press-fitted with the third coned disc spring 31.

The pressure plate 30, formed into a substantially circular-shape, is arranged between the third coned disc spring 31 and the second friction material 33. The pressure plate 30 is supported by the third plate 29 so as to be movable in the axial direction but so as not to be rotatable relative to the third plate 29. The pressure plate 30 is biased by the third coned disc spring 31 toward the second friction material 33, and the pressure plate 30 is slidably press-fitted with the second friction material 33.

The third coned disc spring 31, formed into a substantially disc-shape, is arranged between the third plate 29 and the pressure plate 30. The third coned disc spring 31 biases the pressure plate 30 toward the second friction material 33. The third coned disc spring 31 is supported by the third plate 29 so as to be movable in the axial direction but so as not to be rotated relative to the third plate 29.

The first friction material 32 is arranged between the input plate 13 and the second plate 28. The first friction material 32 together with the second friction material 33 are fixed at the input plate 13 by means of a rivet, and the like. The first friction material 32 is slidably press-fitted with the second plate 28.

The second friction material 33 is arranged between the pressure plate 30 and the input plate 13. The second friction material 33 together with the first friction material 32 are fixed at the input plate 13 by means of the rivet, and the like. The second friction material 33 is slidably press-fitted with the pressure plate 30.

Unlike the input plate 13 shown in FIG. 1, the input plate 13 according to the embodiment 1-1 is not fixed at the first plate 10 at a radially more outward portion of the input plate 13 than the first damper portion 3a. According to the embodiment 1-1, a radially more outward portion of the input plate 13 than the first damper portion 3a is arranged between the first and second friction materials 32 and 33, and the first and second friction materials 32 and 33 are fixed at the input plate 13 by means of the rivet, and the like (see FIG. 3). Other configurations of the input plate 13 according to the embodiment 1-1 are similar to the input plate 13 according to embodiment 1 (see FIG. 1).

According to embodiment 1-1, advantages similar to embodiment 1 may be obtained. In addition, the limiter portion 3e is provided. Therefore, an excessive torque is reduced, and as a result, a possibility of damaging the damper device 3 may be reduced. Further, the limiter portion 3e is arranged at the power transmission path between the first rotational shaft 2 (see FIG. 4), and the first damper portion 3a. Therefore, the limiter portion 3e is provided at a radially outward portion the damper device 3, and as a result, a torque is easily set (for example, a torque, which is absorbed by the limiter portion 3e, may be easily set because a load required to be applied to the pressure plate 30 by the third coned disc spring 31 is reduced when the limiter portion 3e is provided at a radially outward portion of the damper device 3.).

A modified example (embodiment 1-2) of the damper device 3 according to embodiment 1 will be described hereinafter with reference to the attached drawings.

Figure 5:
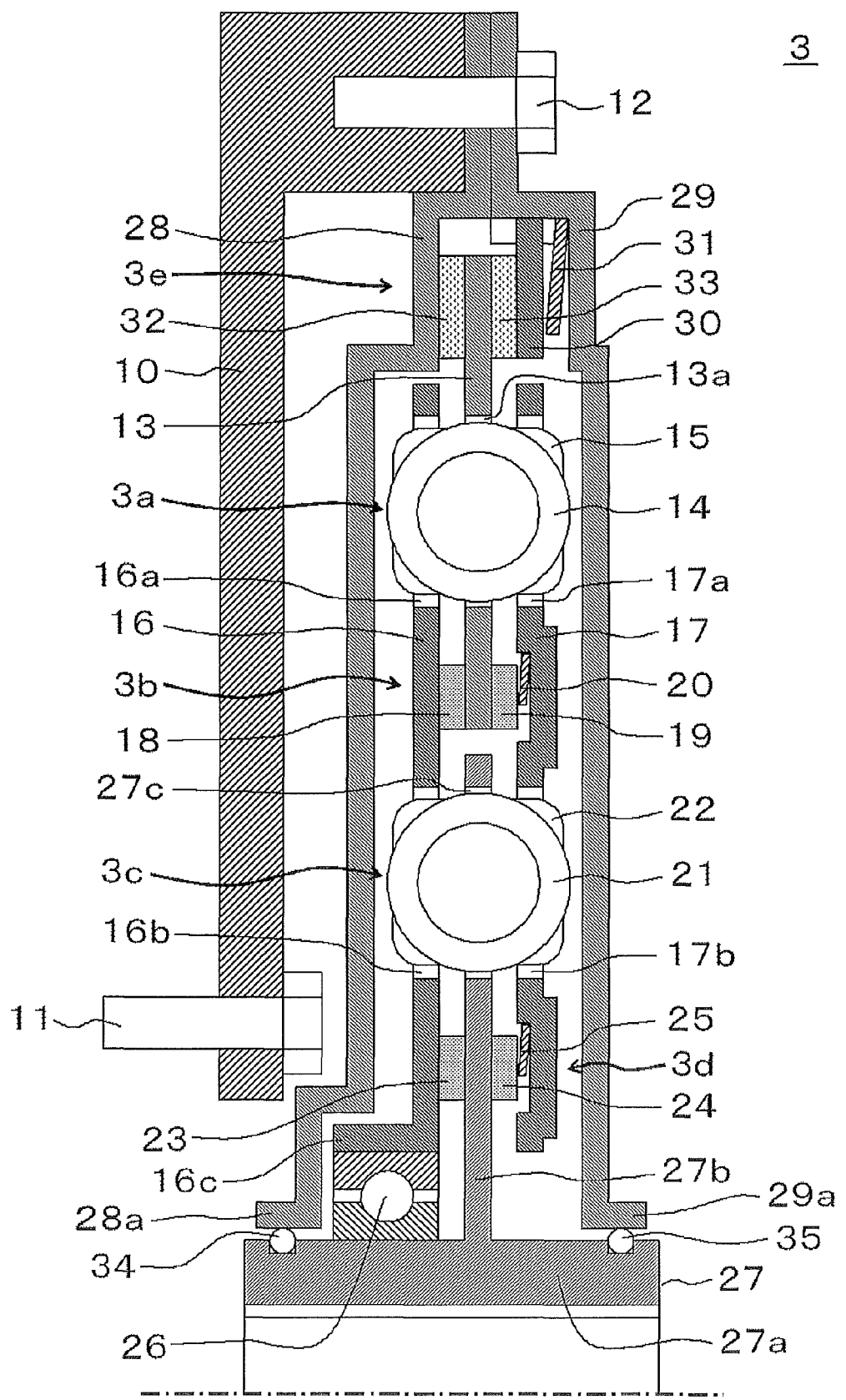
FIG. 5 a cross-sectional view schematically illustrating the configuration of the damper device according to a modified example (embodiment 1-2) of the embodiment 1.

In the damper device 3 according to embodiment 1-2, a configuration of the second and third plates 28 and 29 according to embodiment 1-1 (see FIG. 3) is modified (see FIG. 5), so that the first and second damper portions 3a and 3c, the first and second hysteresis portions 3b and 3d and the limiter portion 3e may be positioned within the space enclosed by the second plate 28 and the third plate 29, and the space is filled with oil (including grease) so as to lubricate the first and second damper portions 3a and 3c, the first and second hysteresis portions 3b and 3d and the limiter portion 3e. The second plate 28 (a covering member) extends to the outer circumference of the hub portion 27a of the hub 27 (a covering member). A first seal 34 (a covering member) is provided between an inner circumferential end of the second plate 28 and the hub portion 27a. The third plate 29 (a covering member) extends to the outer circumference of the hub portion 27a of the hub 27. A second seal 35 (a covering member) is provided between an inner circumferential end of the third plate 29 and the hub portion 27a. Other configurations of the damper device 3 according to embodiment 1-2 are similar to the configuration of the damper device 3 according to embodiment 1-1 (see FIGS. 3 and 4).

According to embodiment 1-2, advantages similar to embodiments 1 and 1-1 may be obtained. In addition, the space enclosed by the second plate 28 and the third plate 29 is filled with. Therefore, the possibility that components of the damper device 3 wear out is reduced.

[Embodiment 2]

The damper device 3 according to embodiment 3 will be described hereinafter with reference to the attached drawings.

Figure 6:
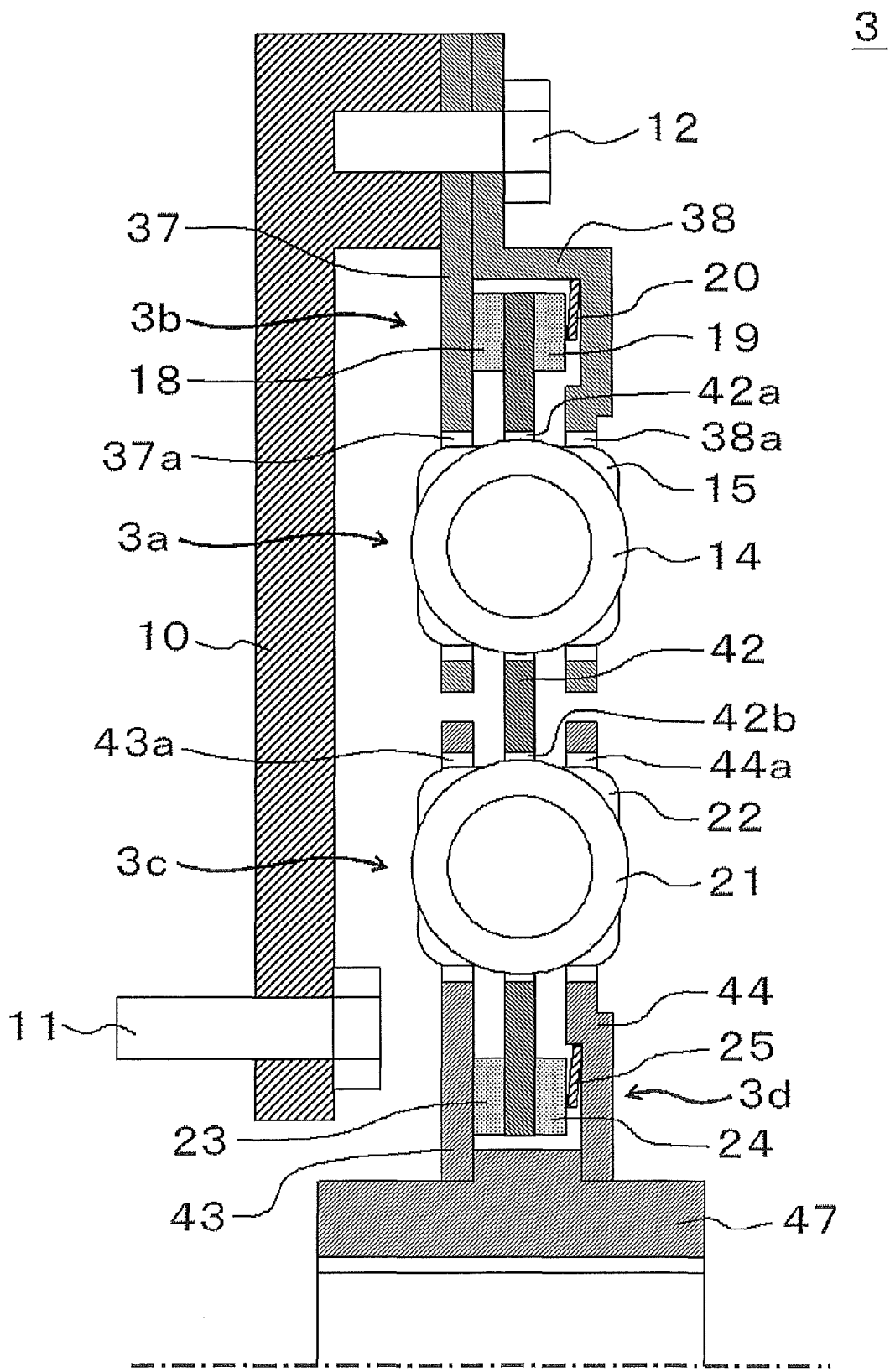
FIG. 6 a cross-sectional view schematically illustrating the configuration of the damper device according to embodiment 2.

According to the configuration shown in FIG. 6, the damper device 3 according to embodiment 2 includes first and second input plates 37 and 38, an intermediate plate 42 and first and second output plates 43 and 44. The damper device 3 includes the first plate 10, the first and second bolts 11 and 12, the first and second input plates 37 and 38, the first coil spring 14, the pair of first seat 15, the intermediate plate 42, the first and second thrust members 18 and 19, the first coned disc spring 20, the second coil spring 21, the pair of second seat 22, the third and fourth thrust members 23 and 24, the second coned disc spring 25, the first and second output plates 43 and 44 and a hub 47.

The first plate 10, the first and second bolts 11 and 12, the first coil spring 14, the pair of first seat 15, the first and second thrust members 18 and 19, the first coned disc spring 20, the second coil spring 21, the pair of second seat 22, the third and fourth thrust members 23 and 24 and the second coned disc spring 25 are similar to embodiment 1 (see FIG. 1). Further, the configuration of the damper device 3 according to embodiment 2 is similar to the configuration of the damper device 3 shown in FIG. 2.

The first input plate 37, formed into a substantially circular-shape, inputs the rotational torque to the first damper portion 3a and the first hysteresis portion 3b. The first input plate 37 is arranged between the first plate 10 and the second input plate 38, and is fixed to the first plate 10 together with the second input plate 37 in a vicinity of a radially outward end portion of the first input plate 37 by means of the second bolt 12. The first input plate 37 is slidably press-fitted with the first thrust member 18 at the first hysteresis portion 3b (at the surface extending to be substantially orthogonal relative to the axial direction), which is arranged at an intermediate portion of the first input plate 37 in the radial direction. A first opening portion 37a, for accommodating the first coil spring 14 and the pair of first seat 15, is formed at a radially more inward portion of the first input plate 37 than the first hysteresis portion 3b, corresponding to the first damper portion 3a. The first input plate 37 is provided in such a way that end surfaces of the first opening portion 37a in the circumferential direction contact/spaced way from the pair of first seat 15.

The second input plate 38, formed into a substantially circular-shape, inputs the rotational torque to the first damper portion 3a and the first hysteresis portion 3b. The second input plate 38 is arranged at a position more distant from the first plate 10 than the first input plate 37 in the axial direction, and is fixed at the first plate 10 together with the first input plate 37, in a vicinity of a radially outward end portion of the second input plate 38, by means of the second bolt 12. The second input plate 38 supports the first coned disc spring 20 at the first hysteresis portion 3b (at the surface extending to be substantially orthogonal relative to the axial direction), which is arranged at an intermediate portion of the second input plate 38 in the radial direction. A second opening portion 38a, for accommodating the first coil spring 14 and the pair of first seat 15, is formed at a radially more inward portion of the second input plate 38 than the first hysteresis portion 3b, corresponding to the first damper portion 3a. The second input plate 38 is provided in such a way that end surfaces of the second opening portion 38a in the circumferential direction contact/spaced away from the pair of first seat 15.

The intermediate plate 42, formed into a substantially circular-shape, outputs the rotational torque, inputted by the first damper portion 3a and the first hysteresis portion 3b, while inputting the rotational torque into the second damper portion 3c and the second hysteresis portion 3d. The intermediate plate 42 is arranged between the first and second input plates 37 and 38 so as to be spaced away from the first and second input plates 37 and 38. The intermediate plate 42 is slidably sandwiched between the first and second thrust members 18 and 19 at the surfaces of the first hysteresis portion 3b, which is arranged at a radially outward portion of the intermediate plate 42, the surfaces extending to be substantially orthogonal relative to the axial direction. A third opening portion 42a, for accommodating the first coil spring 14 and the pair of first seat 15, is formed at a radially more inward portion of the intermediate plate 42 than the first hysteresis portion 3b, corresponding to the first damper portion 3a. The intermediate plate 42 is provided in such a way that end surfaces of the third opening portion 42a in the circumferential direction contact/spaced away from the pair of first seat 15. The intermediate plate 42 is arranged between the first and second output plates 43 and 44 so as to be spaced away from the first and second output plates 43 and 44. A fourth opening portion 42b, for accommodating the second coil spring 21 and the pair of second seat 22, is formed at a radially more inward portion of the intermediate plate 42 than the first damper portion 3a, corresponding to the second damper portion 3c. The intermediate plate 42 is provided in such a way that end surfaces of the fourth opening portion 42b in the circumferential direction contact/spaced away from the pair of second seat 22. The intermediate plate 42 is sandwiched between the third and fourth thrust members 23 and 24 at surfaces of the second hysteresis portion 3d, which is arranged at a radially more inward portion of the intermediate plate 42 than the second damper portion 3b, the surface extending to be substantially orthogonal relative to the axial direction.

The first and second output plates 43 and 44 output the rotational torque inputted by the second damper portion 3c and the second hysteresis portion 3d. The first and second output plates 43 and 44 are connected to the hub 47 at inner circumferential surfaces of the first and second output plates 43 and 44 by means of welding, calking, and the like. The first output plate 43 is arranged between the intermediate plate 42 and the first plate 10 so as to be spaced away from the intermediate plate 42. The second output plate 44 is arranged at a position more distant from the first plate 10 than the intermediate plate 42 in the axial direction so as to be spaced away from the intermediate plate 42. Fifth and sixth opening portions 43a and 44a, for accommodating the second coil spring 21 and the pair of second seat 22, are respectively formed at radially outward portions of the first and second output plates 43 and 44, corresponding to the second damper portion 3c. The first and second output plates 43 and 44 are provide in such a way that end surfaces of each of the fifth and sixth opening portions 43a in circumferential directions of the first and second output plates 43 and 44 contact/spaced away from the pair of second seat 22. The first output plate 43 is slidably press-fitted with the third thrust member 23 at the second hysteresis portion 3d, which is arranged at a radially more inward portion of the first output plate 43 than the second damper portion 3b. The second output plate 44 supports the second coned disc spring 25.

The hub 47, formed into a substantially cylindrical-shape, outputs the rotational torque inputted by the first and second output plates 43 and 44. A spline for connecting the hub 47 to the second rotational shaft 4 (see FIG. 2) is formed at an inner circumferential surface of the hub 47. The hub 47 is connected to the first and second output plates 43 and 44 at an outer circumferential surface of the hub 47 by means of welding, calking, and the like.

According to embodiment 2, the first and second output plates 43 and 44 are connected to the hub 47. Therefore, intertia of the hub 47 is structurally set to be large, and consequently, performance of absorbing noise and vibration may be improved. Further, the first damper portion 3a is configured to absorb a torsion generated by a relative rotation between the third opening portion 42a of the intermediate plate 42 and the first and second opening portions 37a and 38a of the first and second input plates 37 and 38 (the second damper portion 3c is configured to absorb a torsion generated by a relative rotation between the fourth opening portion 42b of the intermediate plate 42 and the fifth and sixth opening portions 43a and 44a of the first and second output plates 43 and 44). Therefore, a torsion angle may be increased and a torsional rigidity may be set at a relatively low level so as to absorb a high torque A modified example (embodiment 2-1) of the damper device 3 according to embodiment 2 will be described hereinafter with reference to the attached drawings.

Figure 8:
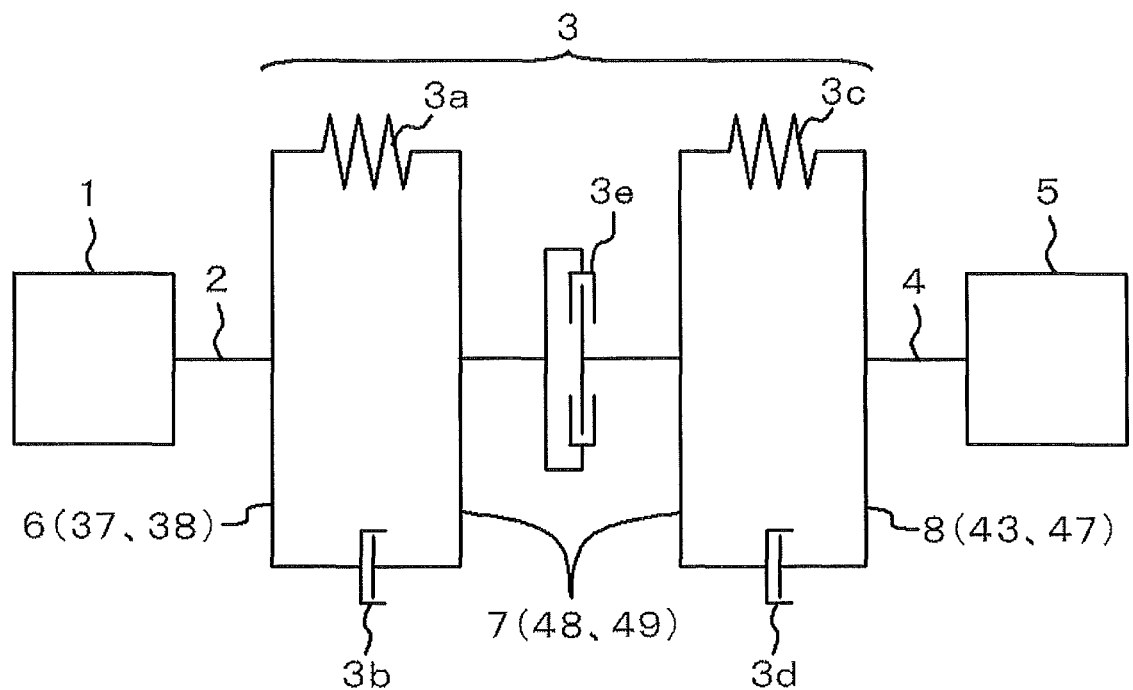
FIG. 8 is a schematic view (a skeleton diagram) illustrating the configuration in which the damper device according to the modified example (embodiment 2-1) of embodiment 2 is provided between the engine and the component having the large amount of inertia.

The damper device 3 according to embodiment 2-1 includes the limiter portion 3e (see FIG. 8). The limiter portion 3e is provided at a power transmission path between the first and second damper portions 3a and 3c so as to slide when the torsion generated between the first and second rotational shafts 2 and 4 reaches the level where the torsion is not absorbed by the first and second damper portions 3a and 3c and by the first and second hysteresis portions 3b and 3d. Other configurations of the damper device 3 according to embodiment 2-1 are similar to the damper device 3 according to embodiment 2 (see FIG. 6).

Figure 7:
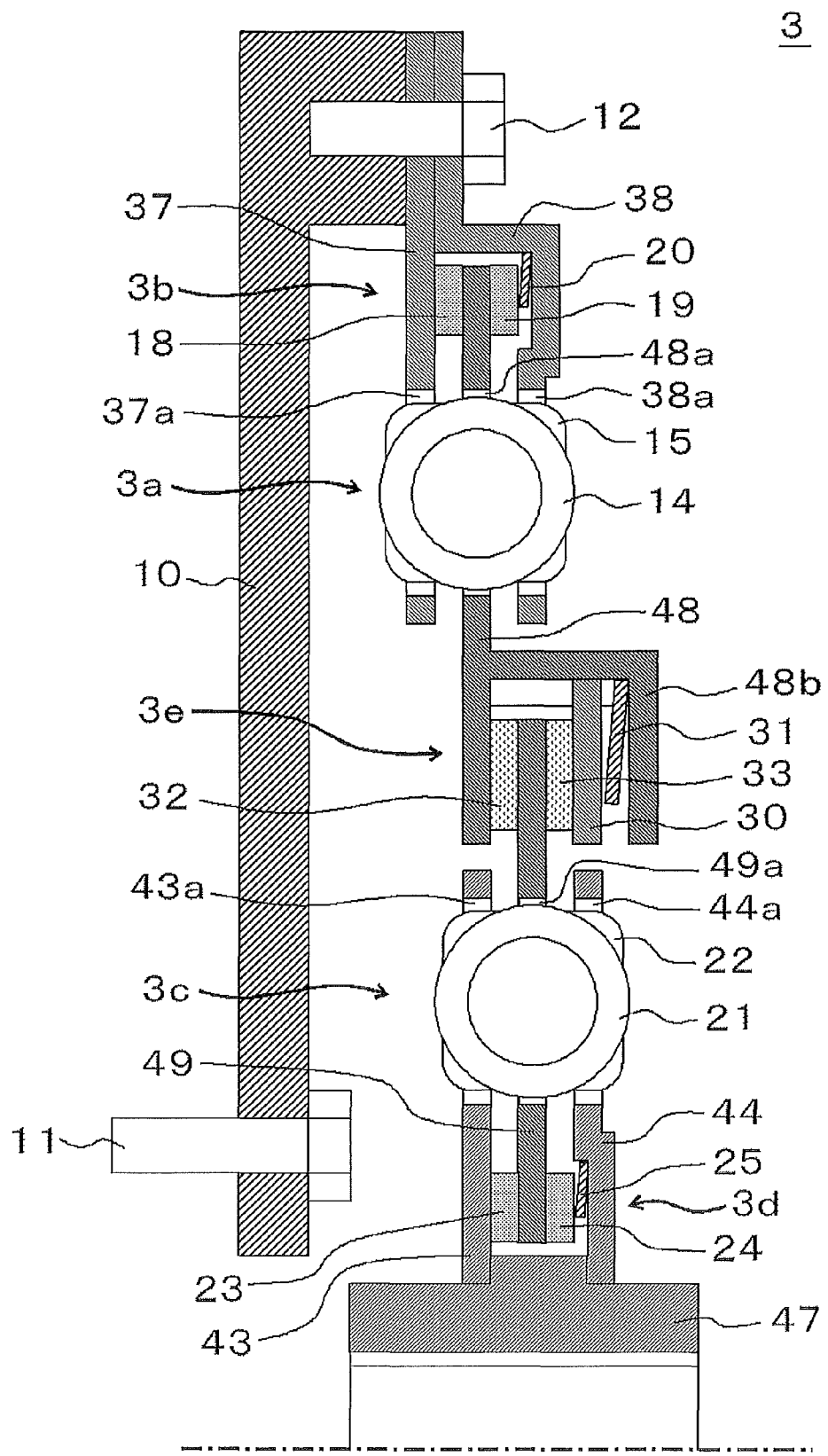
FIG. 7 is a cross-sectional view schematically illustrating the configuration of the damper device according to a modified example (embodiment 2-1) of the embodiment 2.

The damper device 3 includes the limiter portion 3e between the first and second damper portions 3a and 3c (see FIG. 7). The limiter portion 3e may slide with the approximately 1.2 to 3 times greater torque than the engine torque. The damper device 3 includes a first intermediate plate 48, the pressure plate 30, the third coned disc spring 31, the first and second friction materials 32 and 33 and a second intermediate plate 49, as components of the limiter portion 3e.

The pressure plate 30, the third coned disc spring 31, and the first and second friction materials 32 and 33 are similar to embodiment 1-1 (see FIG. 3).

The first intermediate plate 48, formed into a substantially circular-shape, outputs the rotational torque, inputted by the first damper portion 3a and the first hysteresis portion 3b, while inputting the rotational torque into the second damper portion 3c and the second hysteresis portion 3d via the limiter portion 3e and the second intermediate plate 49. The first intermediate plate 48 is arranged between the first and second input plates 37 and 38 so as to be spaced away from the first and second input plates 37 and 38. The first intermediate plate 48 is slidably sandwiched between the first and second thrust members 18 and 19 at the surfaces of the first hysteresis portion 3b, which is arranged at a radially outward portion of the first intermediate plate 48, the surfaces extending to be substantially orthogonal relative to the axial direction. A third opening portion 48a, for accommodating the first coil spring 14 and the pair of first seat 15, is formed a radially more inward portion of the first intermediate plate 48 than the first hysteresis portion 3b, corresponding to the first damper portion 3a. The first intermediate plate 48 is provided in such a way that end surfaces of the third opening portion 48a in the circumferential direction contact/spaced away from the pair of first seat 15. The first intermediate plate 48 includes a limiter plate 48b. The limiter plate 48b supports the pressure plate 30 and the third coned disc spring 31 at the limiter portion 3e, which is arranged at a radially more inward portion of the first intermediate plate 48 than the first damper portion 3a, so as to restrict relative rotation between the limiter plate 48b and each of the pressure plate 30 and the third coned disc spring 31, and so that the pressure plate 30 and the third coned disc spring 31 are movable in the axial direction. The first intermediate plate 48 is press-fitted with the third coned disc spring 31 at the limiter plate 48b and is slidably press-fitted with the first friction material 32 at the other side of the first intermediate plate 48 from the limiter plate 48b.

The second intermediate plate 49, formed into a substantially circular-shape, inputs the rotational torque, outputted from the first damper portion 3a and the first hysteresis portion 3b, into the second damper portion 3c and the second hysteresis portion 3d via the first intermediate plate 48 and the limiter portion 3e. A radially more outward portion of the second intermediate plate 49 than the second damper portion 3c is arranged between the first and second friction materials 32 and 33, and the first and second friction materials 32 and 33 are fixed at the second intermediate plate 49 by means of a rivet, and the like. A fourth opening portion 49a, for accommodating the second coil spring 21 and the pair of second seat 22, is formed a radially more inward portion of the second intermediate plate 49 than the limiter portion 3e, corresponding to the second damper portion 3c. The second intermediate plate 49 is provided in such a way that end surfaces of the fourth opening portion 49a in the circumferential direction contact/spaced away from the pair of second seat 22. The second intermediate plate 49 is slidably press-fitted with the third and fourth thrust members 23 and 24 at the surfaces of the second hysteresis portion 3d, which is arranged at a radially more inward portion of the second intermediate plate 49 than the second damper portion 3c, the surfaces extending to be substantially orthogonal relative to the axial direction.

According to embodiment 2-1, advantages similar to embodiment 2 may be obtained. In addition, the limiter portion 3e is provided. Therefore, an excessive torque is reduced, and as a result, a possibility of damaging the damper device 3 may be reduced. Further, the limiter portion 3e is arranged at the power transmission path between the first and second damper portions 3a and 3c, and therefore results in less space and less cost.

A modified example (embodiment 2-2) of the damper device 3 according to embodiment 2 will be described hereinafter with reference to the attached drawings.

Similarly to the damper device 3 shown in FIG. 4, the damper device 3 according to embodiment 2-2 includes the limiter portion 3e at the power transmission path between the first rotational shaft 2 and the first damper portion 3a. The limiter portion 3e slides when the torsion generated between the first and second rotational shafts 2 and 4 reaches the level where the torsion is not absorbed by the first and second damper portions 3a and 3c and the first and second hysteresis portions 3b and 3d. The limiter portion 3e may slide with the approximately 1.2 to 3 times greater torque than the engine torque. The damper device 3 according to embodiment 2-2 includes the limiter portion 3e, which is arranged at a radially more outward portion of the damper device 3 than the first damper portion 3a. Further, the damper device 3 according to embodiment 2-2 includes an intertia member 68 at a second output plate 67, which is connected to the hub 47 (see FIG. 9).

Figure 9:
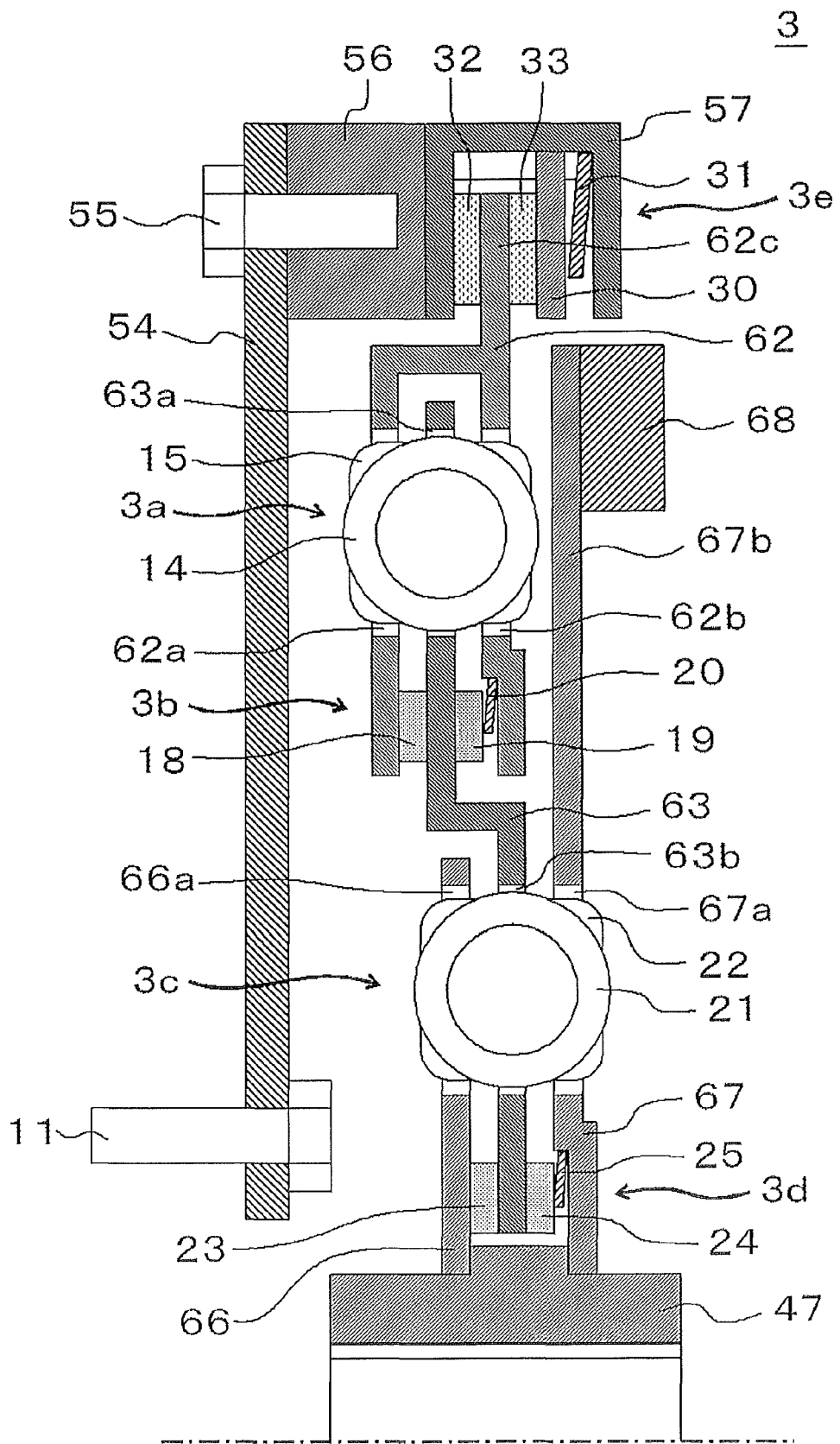
FIG. 9 a cross-sectional view schematically illustrating the configuration of the damper device according to a modified example (embodiment 2-2) of embodiment 2.

The damper device 3 according to the configuration shown in FIG. 9 includes an input plate 62, an intermediate plate 63, first and second output plates 66 and 67. The damper device 3 includes a plate 54 (a connecting plate), the first bolt 11, a second bolt 55, a cylindrical portion 56, a limiter plate 57, the pressure plate 30, the third coned disc spring 31, the first and second friction materials 32 and 33, the input plate 62, the first coil spring 14, the pair of first seat 15, the intermediate plate 63, the first and second thrust members 18 and 19, the first coned disc spring 20, the second coil spring 21, the pair of second seat 22, the third and fourth thrust members 23 and 24, the second coned disc spring 25, the first and second output plates 66 and 67, the hub 47 and the intertia member 68.

The first bolt 11, the first coil spring 14, the pair of first seat 15, the first and second thrust members 18 and 19, the first coned disc spring 20, the second coil spring 21, the pair of second seat 22, the third and fourth thrust members 23 and 24 and the second coned disc spring 25 are similar to embodiment 1 (see FIG. 1). Further, the pressure plate 30, the third coned disc spring 31 and the first and second friction materials 32 and 33 are similar to embodiment 1-1 (see FIG. 3). Furthermore, the hub 47 is similar to embodiment 2 (see FIG. 6).

The plate 54, formed into a substantially circular-shape, is fixed at, for example, the first rotational shaft 2 of the engine 1 (see FIG. 4) by means of the first bolt 11. The cylindrical portion 56 is fixed at a vicinity of an outer portion of the plate 54 in the radial direction by means of the second bolt 55.

The cylindrical portion 56, formed into a substantially cylindrical-shape, is fixed at the vicinity of the outer portion of the plate 54 in the radial direction. The cylindrical portion 56 is fixed at the plate 54 by means of the second bolt 55. The limiter plate 57 is fixed at a surface of the cylindrical portion 56, being more distant from the plate 54 than the cylindrical portion 56 in the axial direction, by means of a bolt and the like.

The limiter plate 57, formed into a substantially cylindrical-shape, is a component of the limiter portion 3e and is fixed at the cylindrical portion 56. The limiter plate 57 supports the pressure plate 30 and the third coned disc spring 31 so as to restrict relative rotation between the limiter plate 57 and each of the pressure plate 30 and the third coned disc spring 31, and so that the pressure plate 30 and the third coned disc spring 31 are movable in the axial direction. The limiter plate 57 is press-fitted with the third coned disc spring 31 at a first plate portion of the limiter plate 57, and is slidably press-fitted with the first friction material 32 at a second plate portion of the limiter plate 57, the second plate portion being formed so as to face the first plate portion thereof.

The input plate 62, formed into a substantially-circular shape, inputs a rotational torque, outputted from the limiter portion 3e, to the first damper portion 3a and the first hysteresis portion 3b. The input plate 62 includes a first radially outwardly extending portion 62c, which extends from a radially more outward portion of the input plate 62 than the first damper portion 3a, toward a portion of the input plate 62, sandwiched between the first and second friction materials 32 and 33. The first and second friction materials 32 and 33 are fixed at the first radially outwardly extending portion 62c by means of a rivet, and the like. A radially inward portion of the input plate 62 integrally includes a first plate portion and a second plate portion facing the first plate portion. The input plate 62 extends so as to interpose the intermediate plate 63 between the first and second plate portions of the radially inward portion of the input plate 62 in a manner where the input plate 62 is spaced away from the intermediate plate 63. The first and second opening portions 62a and 62b, for accommodating the first coil spring 14 and the pair of first seat 15, are formed at a radially more inward portion of the input plate 62 than the limiter portion 3e, corresponding to the first damper portion 3a. The input plate 62 is provided in such a way that end surfaces of each of the first and second opening portions 62a and 62b in the circumferential direction contact/ spaced away from the pair of first seat 15. The first plate portion of the radially inward portion of the input plate 62 is slidably press-fitted with the first thrust member 18 at the first hysteresis portion 3b, which is arranged at a radially more inward portion of the input plate 62 than the first damper portion 3a. The second plate portion of the radially inward portion of the input plate 62 supports the first coned disc spring 20.

The intermediate plate 63, formed into a substantially circular-shape, outputs the rotational torque, inputted by the first damper portion 3a and the first hysteresis portion 3b, while inputting the rotational torque into the second damper portion 3c and the second hysteresis portion 3d. The intermediate plate 63 is arranged between the first and second plate portions of the radially inward portion of the input plate 62 so as to be spaced away therefrom. A third opening portion 63a, for accommodating the first coil spring 14 and the pair of first seat 15, is formed at a radially outward portion of the intermediate plate 63, corresponding to the first damper portion 3a. The intermediate plate 63 is provided in such a way that end surfaces of the third opening portion 63a in the circumferential direction contact/spaced away from the pair of first seat 15. The intermediate plate 63 is slidably sandwiched between the first and second thrust members 18 and 19 at the surfaces of the first hysteresis portion 3b, which is arranged at a radially more inward portion of the intermediate plate 63 than the first damper portion 3a, the surfaces extending to be substantially orthogonal relative to the axial direction. A fourth opening portion 63b, for accommodating the second coil spring 21 and the pair of second seat 22, is formed at a radially more inward portion of the intermediate plate 63 than the first hysteresis portion 3b, corresponding to the second damper portion 3c. The intermediate plate 63 is provided in such a way that end surfaces of the fourth opening portion 63b in the circumferential direction contact/spaced away from the pair of second seat 22. The intermediate plate 63 is slidably sandwiched between the third and fourth thrust members 23 and 24 at the surfaces of the second hysteresis portion 3d, which is arranged at a radially more inward portion of the intermediate plate 63 than the second damper portion 3c, the surfaces extending to be substantially orthogonal relative to the axial direction.

The first and second output plates 66 and 67 output the rotational torque, inputted by the second damper portion 3c and the second hysteresis portion 3d. The first and second output plates 66 and 67 are connected to the hub 47 at inner circumferential surfaces of the first and second output plates 66 and 67 by means of welding, calking, and the like. The first output plate 66 is arranged between the intermediate plate 63 and the plate 54 so as to be spaced away from the intermediate plate 63. The second output plate 67 is arranged at a position more distant from the plate 54 than the intermediate plate 63 in the axial direction so as to be spaced away from the intermediate plate 63. Fifth and sixth opening portions 66a and 67a, for accommodating the second coil spring 21 and the pair of second seat 22, are respectively formed at radially outward portions of the first and second output plates 66 and 67, corresponding to the second damper portion 3c. The first and second output plates 66 and 67 are provided in such a way that end surfaces of each of the fifth and sixth opening portions 66a and 67a in circumferential directions contact/spaced away from the pair of second seat 22. The first output plate 66 is slidably press-fitted with the third thrust member 23 at the second hysteresis portion 3d, which is arranged at a radially more inward portion of the first output plate 66 than the second damper portion 3b. The second output plate 67 supports the second coned disc spring 25. The second output plate 67 includes a second radially outwardly extending portion 67b, which extends toward a radially outward portion of the damper device 3, so as not to contact the first damper portion 3a and the first hysteresis portion 3b. The inertia member 68 is fixed at an end portion of the second radially outwardly extending portion 67b.

The inertia member 68 functions as a weight. Inertia of the inertia member 68 may be equal to or more than 5% of a sum of inertia of the entire hub 47 and portions of the first and second output plates 66 and 67 at the output side (i.e. at a radially more inward of the damper device 3 than the second damper portion 3c).

According to embodiment 2-2, advantages similar to embodiment 2 may be obtained. In addition, the limiter portion 3e is provided. Therefore, an excessive torque is reduced, and as a result, a possibility of damaging the damper device 3 may be reduced. Further, the limiter portion 3e is arranged at the power transmission path between the first rotational shaft 2 (see FIG. 4), and the first damper portion 3a. Therefore, the limiter portion 3e is provided at a radially outward portion of the damper device 3, and as a result, a torque is easily set. Furthermore, the inertia member 68 is attached to the second output plate 67. Therefore, inertia of the hub 47, which is connected to the second output plate 67, is increased, and as a result, performance of absorbing the noise and vibration may be improved.

[Embodiment 3]

The damper device 3 according to embodiment 3 will be described hereinafter with reference to the attached drawings.

Figure 10:
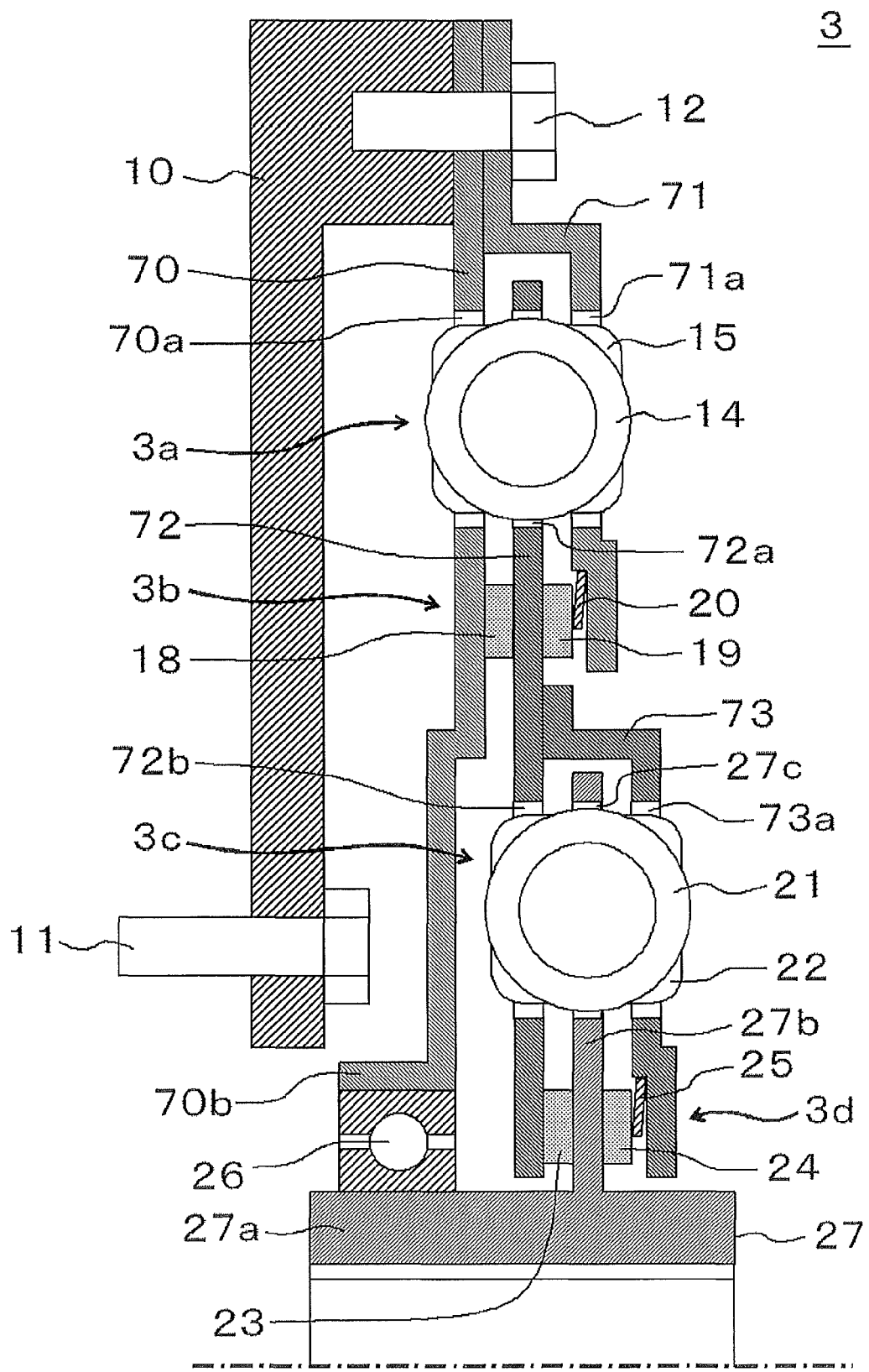
FIG. 10 is a cross-sectional view schematically illustrating the configuration of the damper device according to embodiment 3.

According to the configuration shown in FIG. 10, the damper device 3 according to embodiment 3 includes first and second input plates 70 and 71, first and second intermediate plates 72 and 73 and the output plate (the hub 27). The damper device 3 includes the first plate 10, the first and second bolts 11 and 12, the first and second input plates 70 and 71, the first coil spring 14, the pair of first seat 15, the first and second intermediate plates 72 and 73, the first and second thrust members 18 and 19, the first coned disc spring 20, the second coil spring 21, the pair of second seat 22, the third and fourth thrust members 23 and 24, the second coned disc spring 25, the bearing 26 and the hub 27.

The first plate 10, the first and second bolts 11 and 12, the first coil spring 14, the pair of first seat 15, the first and second thrust members 18 and 19, the first coned disc spring 20, the second coil spring 21, the pair of second seat 22, the third and fourth thrust members 23 and 24, the second coned disc spring 25, the bearing 26 and the hub 27 are similar to embodiment 1 (see FIG. 1). Further, the configuration of the damper device 3 according to embodiment 3 is similar to the configuration of the damper device 3 shown in FIG. 2.

The first input plate 70, formed into a substantially circular-shape, inputs the rotational torque to the first damper portion 3a and the first hysteresis portion 3b. The first input plate 70 is arranged between the first plate 10 and the second input plate 71, and is fixed at the first plate 10 together with the second input plate 71, in a vicinity of an outer circumferential end of the first input plate 70, by means of the second bolt 12. A first opening portion 70a, for accommodating the first coil spring 14 and the pair of first seat 15, is formed at a radially intermediate portion of the first input plate 70, corresponding to the first damper portion 3a. The first input plate 70 is provided in such a way that end surfaces of the first opening portion 70a in the circumferential direction contact/spaced away from the pair of first seat 15. The first input plate 70 is slidably press-fitted with the first thrust member 18 at the first hysteresis portion 3b (at the surface extending to be substantially orthogonal relative to the axial direction), which is arranged at a radially more inward portion of the first input plate 70 than the first damper portion 3a. The first input plate 70 includes a cylindrical portion 70b, which is formed at an inner circumferential end of the first input plate 70. The first input plate 70 is supported by the hub 27 via the bearing 26 at an inner circumference of the cylindrical portion 70c so as to be rotatable relative to the hub 27.

The second input plate 71, formed into a substantially circular-shape, inputs the rotational torque to the first damper portion 3a and the first hysteresis portion 3b. The second input plate 71 is arranged at a position more distant from the first plate 10 than the first input plate 70 in the axial direction, and is fixed at the first plate 10 together with the first input plate 70, in a vicinity of an outward end portion of the second input plate 71, by means of the second bolt 12. A second opening portion 71a, for accommodating the first coil spring 14 and the pair of first seat 15, is formed at a radially intermediate portion of the second input plate 71, corresponding to the first damper portion 3a. The second input plate 71 is provided in such a way that end surfaces of the second opening portion 71a in the circumferential direction contact/spaced away from the pair of first seat 15. The second input plate 71 supports the first coned disc spring 20 at the first hysteresis portion 3b (at the surface extending to be substantially orthogonal relative to the axial direction), which is arranged at a radially more inward portion of the second input plate 71 than the first damper portion 3a.

The first intermediate plate 72, formed into a substantially circular-shape, outputs the rotational torque, inputted by the first damper portion 3a and the first hysteresis portion 3b, while inputting the rotational torque into the second damper portion 3c and the second hysteresis portion 3d. The first intermediate plate 72 is arranged between the first and second input plates 70 and 71 so as to be spaced away from the first and second input plates 70 and 71. A third opening portion 72a, for accommodating the first coil spring 14 and the pair of first seat 15, is formed at a radially outward portion of the first intermediate plate 72, corresponding to the first damper portion 3a. The first intermediate plate 72 is provided in such a way that end surfaces of the third opening portion 72a in the circumferential direction contact/spaced away from the pair of first seat 15. The intermediate plate 72 is slidably sandwiched between the first and second thrust members 18 and 19 at the surfaces of the first hysteresis portion 3b, which is arranged at a radially more inward portion of the first intermediate plate 72 than the first damper portion 3a, the surfaces extending to be substantially orthogonal relative to the axial direction. The first intermediate plate 72 is connected to the second intermediate plate 73 by means of a rivet, and the like. The first intermediate plate 72 in combination with the second intermediate plate 73 is arranged so that the output plate 27b of the hub 27 is arranged between the first and second intermediate plates 72 and 73 to be spaced away therefrom. A fourth opening portion 72b, for accommodating the second coil spring 21 and the pair of second seat 22, is formed at a radially more inward of the first intermediate plate 72 than the first hysteresis portion 3b, corresponding to the second damper portion 3c. The first intermediate plate 72 is provided in such a way that end surfaces of the fourth opening portion 72b in the circumferential direction contact/spaced away from the corresponding pair of second seat 22. The first intermediate plate 72 is slidably press-fitted with the third thrust member 23 at the surface of the second hysteresis portion 3d, which is arranged at a radially more inward portion of the first intermediate plate 72 than the second damper portion 3b, the surface extending to be substantially orthogonal relative to the axial direction.

The second intermediate plate 73, formed into a substantially circular-shape, outputs the rotational torque, inputted by the first damper portion 3a and the first hysteresis portion 3b, via the first intermediate plate 72, while inputting the rotational torque into the second damper portion 3c and the second hysteresis portion 3d. The second intermediate plate 73 is connected to the first intermediate plate 72 by means of the rivet, and the like. The second intermediate plate 73 in combination with the first intermediate plate 72 is arranged so that the output plate 27b of the hub 27 is arranged between the first and second intermediate plates 72 and 73 to be spaced away therefrom. A fifth opening portion 73a, for accommodating the second coil spring 21 and the pair of second seat 22, is formed at a radially more inward portion of the second intermediate plate 73 than the first hysteresis portion 3b, corresponding to the second damper portion 3c. The second intermediate plate 73 is provided in such a way that end surfaces of the fifth opening portion 73a in the circumferential direction contact/spaced away from the pair of second seat 22. The second intermediate plate 73 supports the second coned disc spring 25 at the surface of the second hysteresis portion 3d, which is arranged at a radially more inward portion of the second intermediate plate 73 than the second damper portion 3c, the surface extending to be substantially orthogonal relative to the axial direction.

According to embodiment 3, similar to embodiment 1, the hub 27, serving as the output plate, includes the output plate portion 27b. Therefore, the inertia of the hub 27 is structurally set to be large, and consequently, performance of absorbing noise and vibration may be improved. Further, the first damper portion 3a is configured to absorb a torsion generated by a relative rotation between the third opening portion 72a of the first intermediate plate and the first and second opening portions 70a and 71a of the first and second input plates 70a and 71 (the second damper portion 3c is configured to absorb a torsion generated by a relative rotation between the sixth opening portion 27c of the hub 27 and the fourth and fifth opening portions 72b and 73a of the first and second intermediate plates 72 and 73). Therefore, a torsion angle may be increased and a torsional rigidity may be set at a relatively low level so as to absorb a high torque. Furthermore, the bearing 26 is provided between the first input plate 70 and the hub 27. Therefore, eccentricity of the first input plate 70 may be prevented.

A modified example (embodiment 3-1) of the damper device 3 according to embodiment 3 will be described hereinafter with reference to the attached drawings.

Similar to the damper device 3 shown in FIG. 8, the damper device 3 according to embodiment 3-1 includes the limiter portion 3e. The limiter portion 3e is provided at the power transmission path between the first and second damper portions 3a and 3c so as to slide when the torsion generated between the first and second rotational shafts 2 and 4 reaches the level where the torsion is not absorbed by the first and second damper portions 3a and 3c and the first and second hysteresis portions 3b and 3d.

Figure 11:
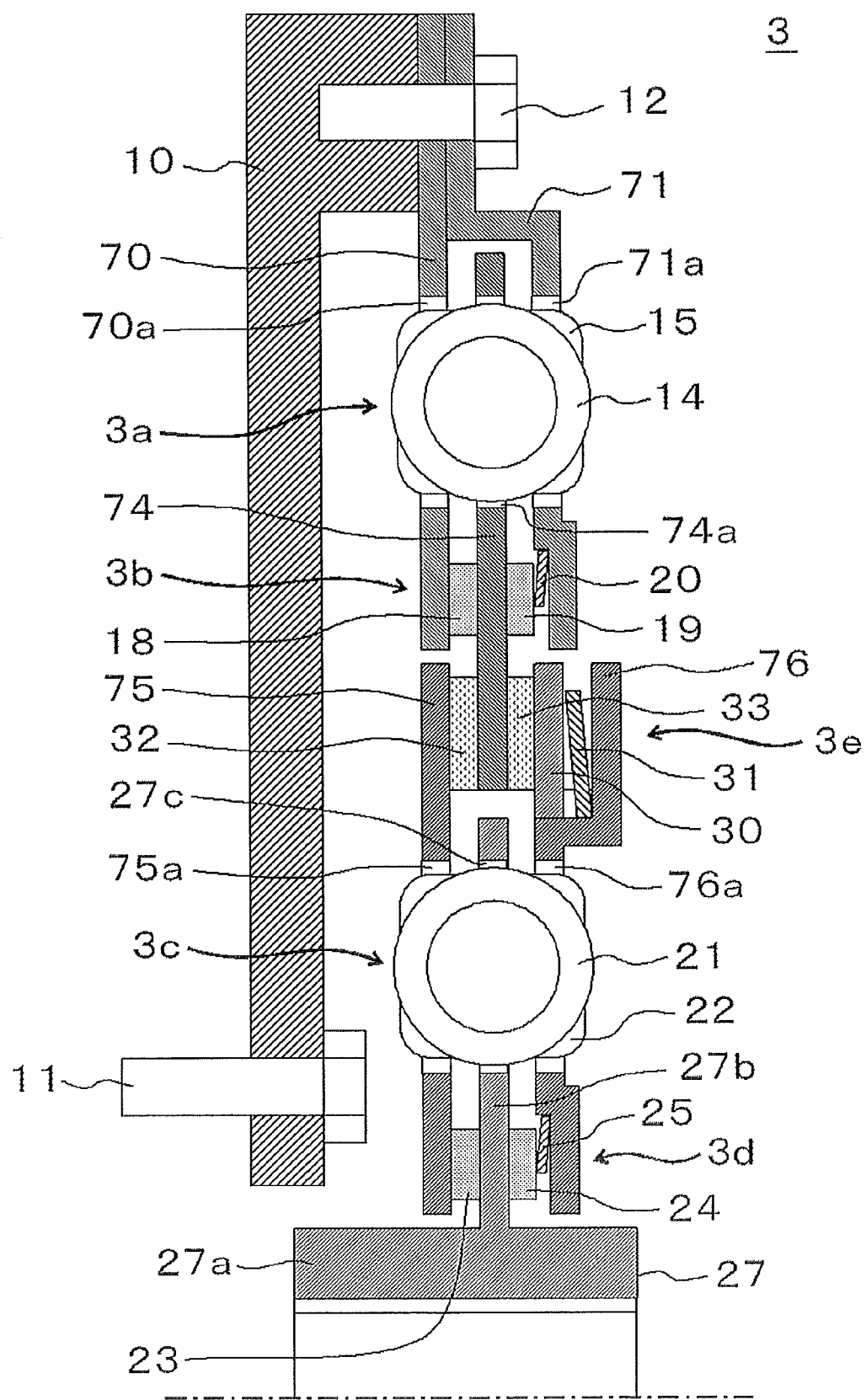
FIG. 11 is a cross-sectional view schematically illustrating the configuration of the damper device according to a modified example (embodiment 3-1) of embodiment 3.

The damper device 3 includes the limiter portion 3e between the first hysteresis portion 3b and the second damper portion 3c (see FIG. 11). The limiter portion 3e may slide with the approximately 1.2 to 3 times greater torque than the engine torque. The damper device 3 includes a first intermediate plate 74, the pressure plate 30, the third coned disc spring 31, the first and second friction materials 32 and 33 and second and third intermediate plates 75 and 76, as components of the limiter portion 3e.

The pressure plate 30, the third coned disc spring 31 and the first and second friction materials 32 and 33 are similar to embodiment 1-1 (see FIG. 3). Other configurations of the damper device 3 according to embodiment 3-1 are similar to the damper device 3 according to embodiment 3 (see FIG. 10).

The first intermediate plate 74, formed into a substantially circular-shape, outputs the rotational torque, inputted by the first damper portion 3a and the first hysteresis portion 3b, while inputting the rotational torque into the second damper portion 3c and the second hysteresis portion 3d via the limiter portion 3e and the second and third intermediate plates 75 and 76. The first intermediate plate 74 is arranged between the first and second input plates 70 and 71 so as to be spaced away from the first and second input plates 70 and 71. A third opening portion 74a, for accommodating the first coil spring 14 and the pair of first seat 15, is formed at a radially outward portion of the first intermediate plate 74, corresponding to the first damper portion 3a. The first intermediate plate 74 is provide in such a way that end surfaces of the third opening portion 74a in the circumferential direction contact/spaced away from the pair of first seat 15. The first intermediate plate 74 is slidably sandwiched between the first and second thrust members 18 and 19 at the surfaces of the first hysteresis portion 3b, which is arranged at a radially more inward portion of the first intermediate plate 74 than the first damper portion 3a, the surfaces extending to be substantially orthogonal relative to the axial direction. The first intermediate plate 74 is arranged between the first and second friction materials 32 and 33 at the limiter portion 3e, which is arranged at a radially more inward portion of the first intermediate plate 74 than the first hysteresis portion 3b. The first and second friction materials 32 and 33 are fixed to the first intermediate plate 74 by means of a rivet, and the like.

The second intermediate plate 75, formed into a substantially circular-shape, outputs the rotational torque, inputted by the first damper portion 3a and the first hysteresis portion 3b, via the first intermediate plate 74 and the limiter portion 3e, while inputting the rotational torque into the second damper portion 3c and the second hysteresis portion 3d. The second intermediate plate 75 is connected to the third intermediate plate 76 by means of a rivet, and the like. The second intermediate plate 75 in combination with the third intermediate plate 76 is arranged so that the output plate 27b of the hub 27 is arranged between the second and third intermediate plates 75 and 76 to be spaced away therefrom. The second intermediate plate 75 is slidably press-fitted with the first friction material 32 at the limiter portion 3e, which is arranged in a vicinity of a radially outward portion of the second intermediate plate 75. A fourth opening portion 75a, for accommodating the second coil spring 21 and the pair of second seat 22, is formed at a at a radially more inward portion of the second intermediate plate 75 than and the limiter portion 3e, corresponding to the second damper portion 3c. The second intermediate plate 75 is provided in such a way that end surfaces of the fourth opening portion 75a in the circumferential direction contact/spaced away from the pair of second seat 22. The second intermediate plate 75 is slidably press-fitted with the third thrust member 23 at the surface of the second hysteresis portion 3d, which is arranged at a radially more inward portion of the second intermediate plate 75 than the second damper portion 3b, the surface extending to be substantially orthogonal relative to the axial direction.

The third intermediate plate 76, formed into a substantially circular-shape, outputs the rotational torque, inputted by the first damper portion 3a and the first hysteresis portion 3b, via the first intermediate plate 74 and the limiter portion 3e, while inputting the rotational torque into the second damper portion 3c and the second hysteresis portion 3d. The third intermediate plate 76 is connected to the second intermediate plate 75 by means of the rivet, and the like. The second intermediate plate 75 in combination with the third intermediate plate 76 is arranged so that the output plate 27b of the hub 27 is arranged between the second and third intermediate plates 75 and 76 to be spaced away therefrom. The third intermediate plate 76 supports the pressure plate 30 and the third coned disc spring 31 at the limiter portion 3e, which is arranged in a vicinity of a radially outward portion of the third intermediate plate 76, so as to restrict relative rotation between the third intermediate plate 76 and each of the pressure plate 30 and the third coned disc spring 31, and so that the pressure plate 30 and the third coned disc spring 31 are movable in the axial direction. A fifth opening portion 76a, for accommodating the second coil spring 21 and the pair of second seat 22, is formed at a radially more inward portion of the third intermediate plate 76 than the limiter portion 3e, corresponding to the second damper portion 3c. The third intermediate plate 76 is provided in such a way that end surfaces of the fifth opening portion 76a in the circumferential direction contact/spaced away from the pair of second seat 22. The third intermediate plate 76 supports the second coned disc spring 25 at the second hysteresis portion 3b, which is arranged at a radially more inward portion of the third intermediate plate 76 than the second damper portion 3c.

According to embodiment 3-1, advantages similar to embodiment 3 may be obtained. In addition, the limiter portion 3e is provided. Therefore, an excessive torque is reduced, and as a result, a possibility of damaging the damper device 3 may be reduced. Further, the limiter portion 3e is arranged at the power transmission path between the first and second damper portions 3a and 3c, therefore requiring less space and less cost.

A modified example (embodiment 3-2) of the damper device 3 according to embodiment 3 will be described hereinafter with reference to the attached drawings.

Similarly to the damper device 3 shown in FIG. 4, the damper device 3 according to embodiment 3-2 includes the limiter portion 3e at the power transmission path between the first rotational shaft 2 and the first damper portion 3a. The limiter portion 3e slides when the torsion generated between the first and second rotational shafts 2 and 4 reaches the level where the torsion is not absorbed by the first and second damper portions 3a and 3c and the first and second hysteresis portions 3b and 3d. The limiter portion 3e may slide with the approximately 1.2 to 3 times greater torque than the engine torque. The damper device 3 according to embodiment 3-2 includes the limiter portion 3e, which is arranged at a radially more outward portion of the damper device 3 than the first damper portion 3a. Further, the damper device 3 according to embodiment 3-2 includes a guide 84, which supports an input plate 82 and an intermediate plate 83 so that each of the input plate 82 and the intermediate plate 83 is rotatable relative to the hub 27 (see FIG. 12).

Figure 12:
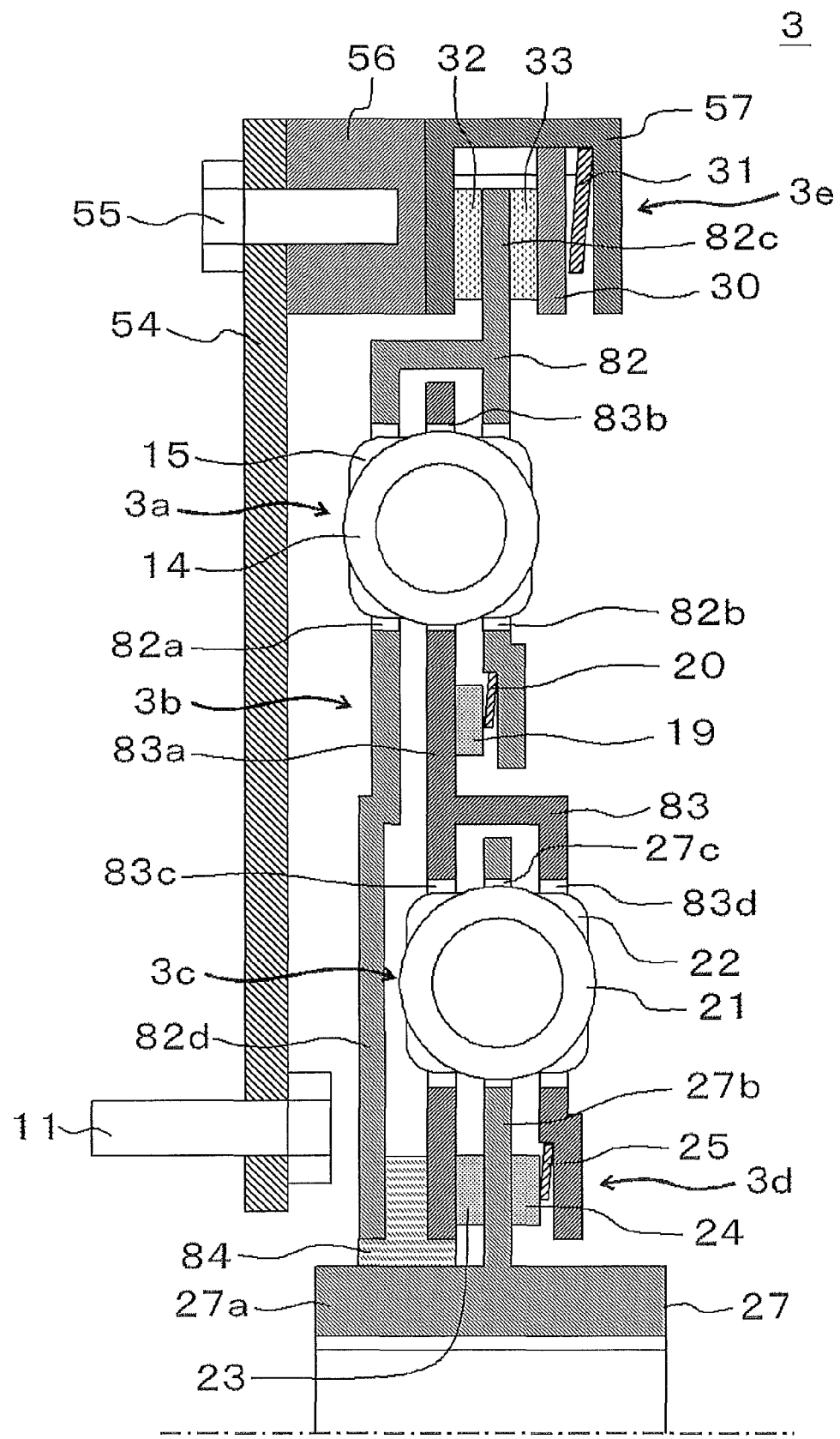
FIG. 12 is a cross-sectional view schematically illustrating the configuration of the damper device according to a modified example (embodiment 3-2) of embodiment 3.

The damper device 3 according to the configuration shown in FIG. 12 includes the input plate 82, the intermediate plate 83, and the output plate (the hub 27). The damper device 3 includes the plate 54, the first bolt 11, the second bolt 55, the cylindrical portion 56, the limiter plate 57, the pressure plate 30, the third coned disc spring 31, the first and second friction materials 32 and 33, the input plate 82, the first coil spring 14, the pair of first seat 15, the intermediate plate 83, the second thrust member 19, the first coned disc spring 20, the second coil spring 21, the pair of second seat 22, the third and fourth thrust members 23 and 24, the second coned disc spring 25, the hub 27 and the guide 84.

The first bolt 11, the first coil spring 14, the pair of first seat 15, the second thrust member 19, the first coned disc spring 20, the second coil spring 21, the pair of second seat 22, the third and fourth thrust members 23 and 24, the second coned disc spring 25 and the hub 27 are similar to embodiment 1 (see FIG. 1). Further, the pressure plate 30, the third coned disc spring 31 and the first and second friction materials 32 and 33 are similar to embodiment 1-1 (see FIG. 3). Furthermore, the plate 54, the second bolt 55, the cylindrical portion 56, and the limiter plate 57 are similar to embodiment 2-2 (see FIG. 9).

The input plate 82, formed into a substantially-circular shape, inputs a rotational torque, outputted from the limiter portion 3e, to the first damper portion 3a and the first hysteresis portion 3b. The input plate 82 includes a first radially outwardly extending portion 82c, which extends from a radially more outward portion of the input plate 82 than the first damper portion 3a, toward a portion of the input plate 82, sandwiched between the first and second friction materials 32 and 33. The first and second friction materials 32 and 33 are fixed at the first radially outwardly extending portion 82c by means of a rivet, and the like. An intermediate portion of the input plate 82 integrally includes a first plate portion and a second plate portion facing the first plate portion. The input plate 82 extends so as to interpose the intermediate plate 83 between the first and second plate portions of the intermediate portion of the input plate 82 in a manner where the input plate 82 is spaced away from the intermediate plate 83. The first and second opening portions 82a and 82b, for accommodating the first coil spring 14 and the pair of first seat 15, is at a radially more inward portion of the input plate 82 than the limiter portion 3e, corresponding to the first damper portion 3a. The input plate 82 is provided in such a way that end surfaces of each of the first and second opening portions 82a and 82b in the circumferential direction contact/spaced away from the pair of first seat 15. The second plate portion of the intermediate portion of the input plate 82 supports the first coned disc spring 20 at the first hysteresis portion 3b, which is arranged at a radially more inward portion of the input plate 82 than the first damper portion 3a. The input plate 82 includes a radially inwardly extending portion 82d, which extends to a vicinity of the hub portion 27a of the hub 27. The input plate 84 is supported by the hub 27 via the guide 84 at a radially inward end portion of the radially inwardly extending portion 84d so as to be rotatable relative to the hub 27. A surface of the radially inwardly extending portion 84d, the surface extending to be substantially orthogonal relative to the axial direction, is slidably press-fitted with the guide 84, and thereby forming the first hysteresis portion 3b.

The intermediate plate 83, formed into a substantially circular-shape, outputs the rotational torque, inputted by the first damper portion 3a and the first hysteresis portion 3b, while inputting the rotational torque into the second damper portion 3c and the second hysteresis portion 3d. The intermediate plate 83 includes the second radially outwardly extending portion 83a. The second radially outwardly extending portion 83a of intermediate plate 83 is arranged between the first and second plate portions of the intermediate portion of the input plate 82 so as to be spaced away therefrom. A third opening portion 83a, for accommodating the first coil spring 14 and the pair of first seat 15, is formed at a radially outward portion of the intermediate plate 83, corresponding to the first damper portion 3a. The intermediate plate 83 is provided in such a way that end surfaces of the third opening portion 83a in the circumferential direction contact/spaced away from the pair of first seat 15. The intermediate plate 83 is slidably sandwiched between the second thrust member 19 and the guide 84 at the surface of the first hysteresis portion 3b, which is arranged at a radially more inward portion of the intermediate plate 83 than the first damper portion 3a, the surface extending to be substantially orthogonal relative to the axial direction. A radially inward portion of the intermediate plate integrally includes a first plate portion and a second plate portion facing the first plate portion. The intermediate plate 83 extends so as to interpose the output plate 27b between the first and second plate portions of the radially inward portion of the intermediate plate 83 in a manner where the intermediate plate 83 is spaced away from the output plate 27b. Fourth and fifth opening portions 83c and 83d, for accommodating the second coil spring 21 and the pair of second seat 22, are formed at a radially more inward portion of the intermediate plate 83 than the first hysteresis portion 3b, corresponding to the second damper portion 3c. The intermediate plate 83 is provided in such a way that end surfaces of each of the fourth and fifth opening portions 83c and 83d in the circumferential direction contact/spaced away from the pair of second seat 22. The first plate portion of the radially inward portion of the intermediate plate 83 is slidably press-fitted with the third thrust member 23 at the second hysteresis portion 3d, which is arranged at a radially more inward portion of the intermediate plate 83 than the second damper portion 3c. The second plate portion of the radially inward portion of the intermediate plate 83 supports the second coned disc spring 25 at the second hysteresis portion 3d in the axial direction. The intermediate plate 83 is supported by the hub 27 via the guide 84 at an inner circumferential end portion of the intermediate plate 83 so as to be rotatable relative to the hub 27. A surface of the first plate portion of the intermediate plate 83 is press-fitted with the third thrust member 23 at a radially inward end portion of the intermediate plate 83, and an axially opposite surface of the first plate portion of the intermediate plate 83 is slidably press-fitted with the guide 84 at a radially inward end portion of the intermediate plate 83, the surfaces extending to be substantially orthogonal relative to the axial direction, thereby forming the second hysteresis portion 3d.

The intermediate plate 83 is slidably press-fitted with the guide 84 at a surface of the first plate portion of the radially inward end portion of the intermediate plate 83

The guide 84 supports the input plate 82 and the intermediate plate 83 at the inner circumferential end portions of the input plate 82 and the intermediate plate 83 so that each of the input plate 82 and the intermediate plate 83 is rotatable relative to the hub 27. The guide 84 is also arranged between the input plate 82 and the intermediate plate 83 in the axial direction, so that input plate 82 and the intermediate plate 83 are slidably press-fitted with the guide 84, and thereby forming the second hysteresis portion 3d. The guide 84 may be made of resin.

According to embodiment 3-2, advantages similar to embodiment 3 may be obtained. In addition, the limiter portion 3e is provided. Therefore, an excessive torque is reduced, and as a result, a possibility of damaging the damper device 3 may be reduced. Further, the limiter portion 3e is arranged at the power transmission path between the first rotational shaft 2 (see FIG. 4), and the first damper portion 3a. Therefore, the limiter portion 3e is provided at a radially outward portion of the damper device 3, and as a result, a torque is easily set. Still further, the guide 84 includes a guiding function (a bearing function) and a hysteresis function, therefore requiring less space and less cost. Furthermore, the input plate 82 and the intermediate plate 83 are rotatably supported by the hub 27 via the guide 84 relative to the hub 27. Therefore, eccentricity of the input plate 82 and the intermediate plate 83 may be prevented.

A modified example (embodiment 3-3) of the damper device 3 according to embodiment 3 will be described hereinafter with reference to the attached drawings.

Figure 13A:
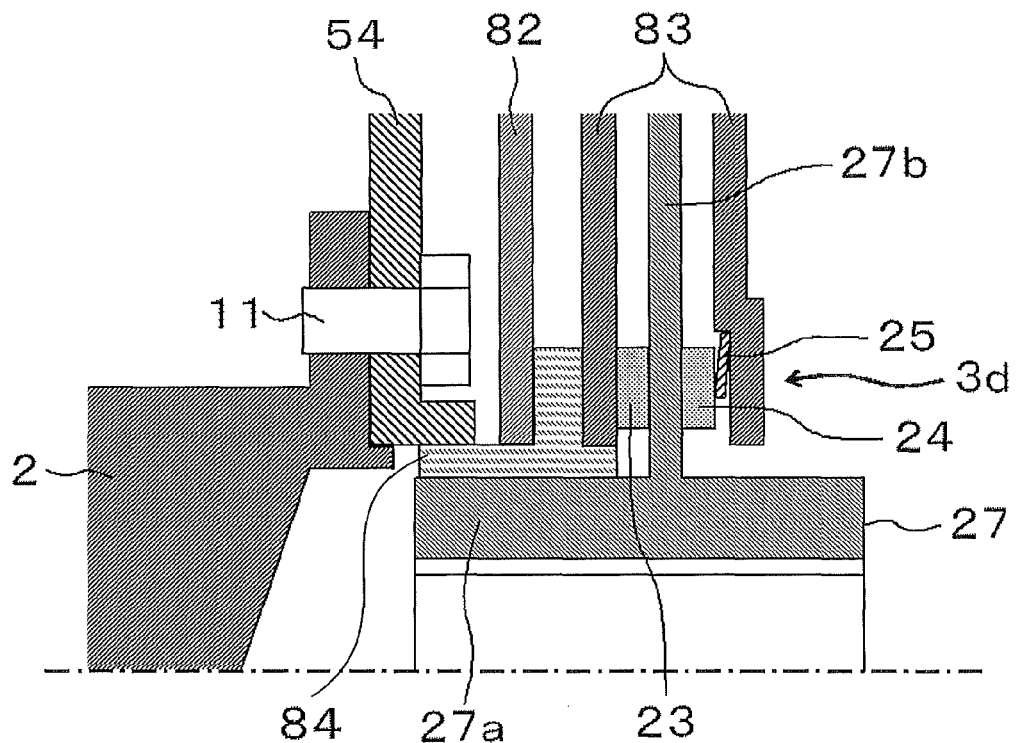
FIG. 13A is a first cross-sectional view schematically illustrating the configuration of the damper device according to a modified example (embodiment 3-3) of embodiment 3.
Figure 13B:
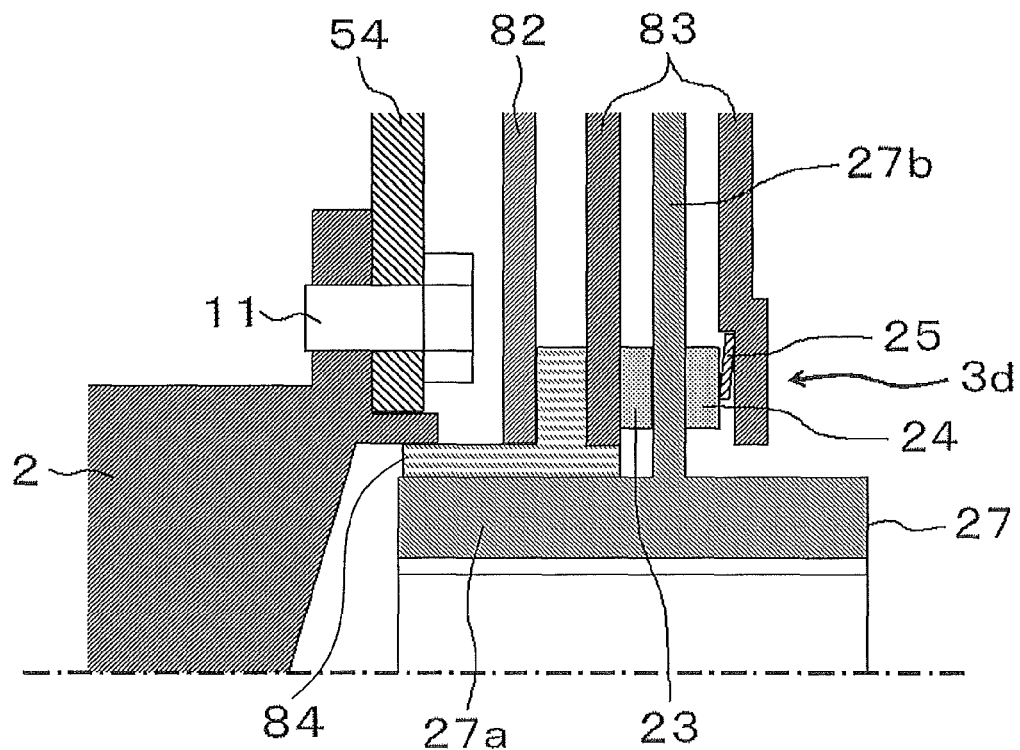
FIG. 13B is a second cross-sectional view schematically illustrating the configuration of the damper device according to the modified example (embodiment 3-3) of embodiment 3.

Similar to embodiment 3-2 (see FIG. 12), the damper device 3 according to embodiment 3-3 includes the guide 84, which rotatably supports the input plate 82 and the intermediate plate 83 relative to the hub 27. Further, as illustrated in FIG. 13A, the guide 84 may also rotatably support the plate 54 (the first plate 10 shown in FIG. 10, a flywheel of an engine, and the like) relative to the hub 27. Furthermore, as illustrated in FIG. 13B, the guide 84 may also rotatably support the first rotational shaft 2 relative to the hub 27. Other configurations of the damper device 3 according to embodiment 3-3 are similar to embodiment 3-2 (see FIG. 12).

According to embodiment 3-3, advantages similar to embodiment 3-2 may be obtained. In addition, the guide 84 rotatably supports the plate 54 or the first rotational shaft 2 relative to the hub 27. Therefore, positions of a central axis of the damper device 3 and the first rotational shaft 2 may be easily matched and a cost of manufacturing the damper device 3 is reduced, compared to a conventional manner where knock opening portions are processed and knock pins are respectively inserted into the knock opening portions. In the conventional manner, positions of a central axis of a damper and a rotational shaft may be matched (may be prevented from being displaced) in a manner where knock pins are inserted into a flywheel (for example, corresponding to the first plate 10 shown in FIG. 1) and a flywheel attachment member (for example, corresponding to the input plate 13 shown in FIG. 1). Further, the guide 84 rotatably supports the plate 54 or the first rotational shaft 2 relative to the hub 27. Therefore, in a configuration where the limiter portion 3e is provided, eccentricity of the limiter portion 3e in the radial direction may be prevented. Furthermore, the guide 84 directly supports the first rotational shaft 2. Therefore, an accuracy in preventing displacement between the first rotational shaft 2 and an axis of the hub 27 may be improved.

A modified example (embodiment 3-4) of the damper device 3 according to embodiment 3 will be described hereinafter with reference to the attached drawings.

Similarly to the damper device 3 shown in FIG. 4, the damper device 3 according to embodiment 3-4 includes the limiter portion 3e at the power transmission path between the first rotational shaft 2 and the first damper portion 3a. The limiter portion 3e slides when the torsion generated between the first and second rotational shafts 2 and 4 reaches the level where the torsion is not absorbed by the first and second damper portions 3a and 3c and the first and second hysteresis portions 3b and 3d. The limiter portion 3e may slide with the approximately 1.2 to 3 times greater torque than the engine torque. The damper device 3 according to embodiment 3-4 includes the limiter portion 3e, which is arranged at a radially more outward portion of the damper device 3 than the first damper portion 3a. Further, the damper device 3 according to embodiment 3-4 includes a guide 86, which rotatably supports the input plate 82, the intermediate plate 83 and a limiter plate 85 relative to the hub 27 (see FIG. 14).

Figure 14:
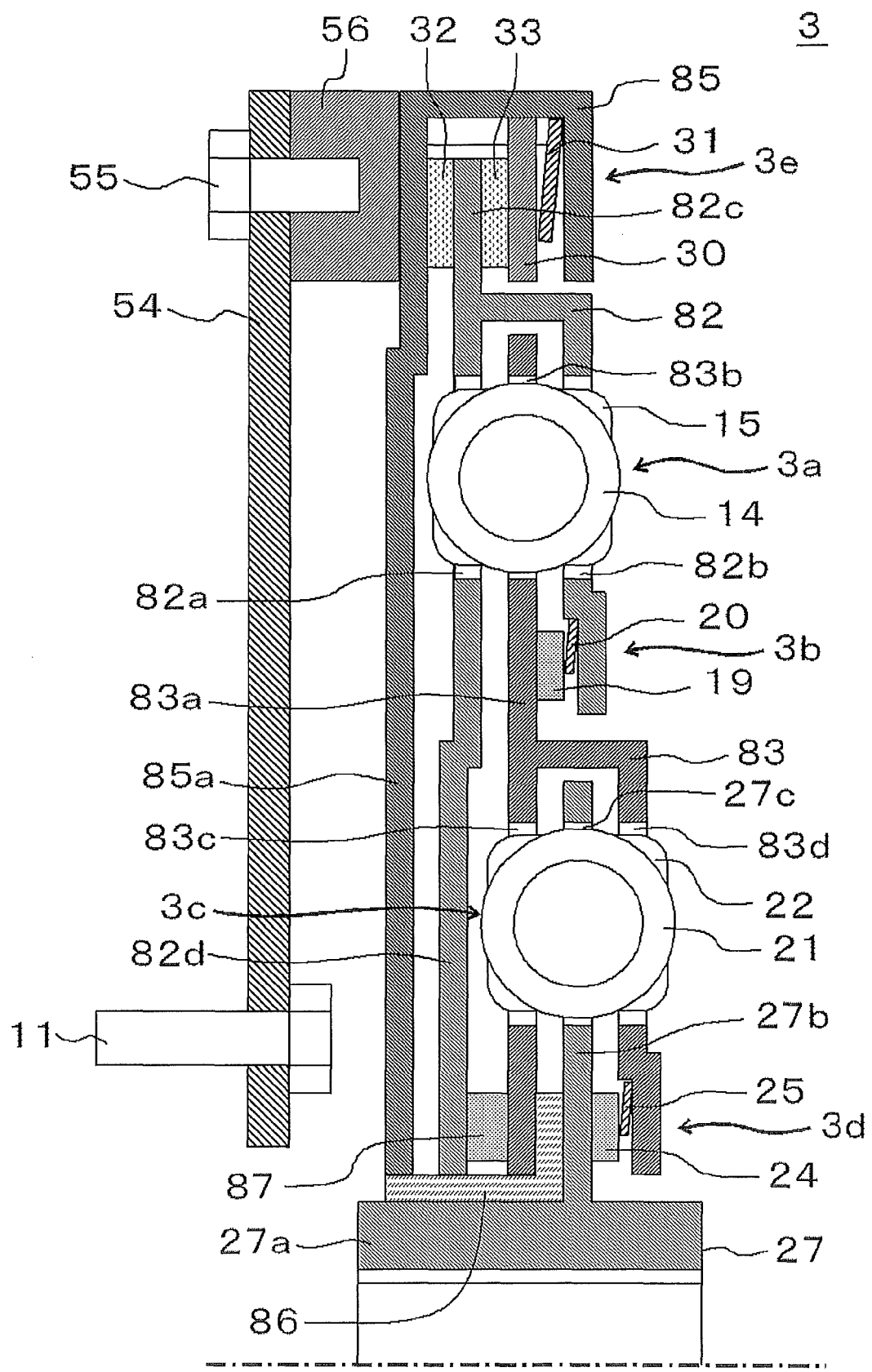
FIG. 14 is a cross-sectional view schematically illustrating the configuration of the damper device according to a modified example (embodiment 3-4) of embodiment 3.

The damper device 3 according to the configuration shown in FIG. 14 includes the input plate 82, the intermediate plate 83, and the output plate (the hub 27). The damper device 3 includes the plate 54, the first bolt 11, the second bolt 55, the cylindrical portion 56, the limiter plate 85, the pressure plate 30, the third coned disc spring 31, the first and second friction materials 32 and 33, the input plate 82, the first coil spring 14, the pair of first seat 15, the intermediate plate 83, the second thrust member 19, the first coned disc spring 20, the second coil spring 21, the pair of second seat 22, the fourth thrust member 24, the second coned disc spring 25, the hub 27, the guide 84 and a fifth thrust member 87.

The first bolt 11, the first coil spring 14, the pair of first seat 15, the second thrust member 19, the first coned disc spring 20, the second coil spring 21, the pair of second seat 22, the fourth thrust member 24, the second coned disc spring 25 and the hub 27 are similar to embodiment 1 (see FIG. 1). Further, the pressure plate 30, the third coned disc spring 31 and the first and second friction materials 32 and 33 are similar to embodiment 1-1 (see FIG. 3). Still further, the plate 54, the second bolt 55 and the cylindrical portion 56 are similar to embodiment 2-2 (see FIG. 9). Furthermore, the input plate 82 and the intermediate plate 83 are similar to embodiment 3-2 (see FIG. 12).

The limiter plate 85, formed into a substantially cylindrical-shape, is a component of the limiter portion 3e and is fixed at the cylindrical portion 56. The limiter plate 85 supports the pressure plate 30 and the third coned disc spring 31 so as to restrict relative rotation between the limiter plate 85 and each of the pressure plate 30 and the third coned disc spring 31, and so that the pressure plate 30 and the third coned disc spring 31 are movable in the axial direction. The limiter plate 85 is press-fitted with the third coned disc spring 31. The limiter plate 85 is press-fitted with the third coned disc spring 31 at a first plate portion of the limiter plate 85, and is slidably press-fitted with the first friction material 32 at a second plate portion of the limiter plate 85, the second plate portion being formed so as to face the first plate portion thereof. The limiter plate 85 includes a radially inwardly extending portion 85a, which extends to a vicinity of the hub portion 27a of the hub 27. The limiter plate 85 is supported by the hub 27 via the guide 86 at an inner circumferential end portion of the radially inwardly extending portion 85a so as to be rotatable relative to the hub 27.

The guide 86 supports the input plate 82, the intermediate plate 83 and the limiter plate 85 at the inner circumferential end portions of the input plate 82, the intermediate plate 83 and the limiter plate 85 so that each of the input plate 82, the intermediate plate 83 and the limiter plate 85 is rotatable relative to the hub 27. The guide 86 is also arranged between the intermediate plate 83 and the output plate 27b of the hub 27 in the axial direction, so that the intermediate plate 83 and the output plate 27b are slidably press-fitted with the guide 86, and thereby forming the second hysteresis portion 3d. The guide 86 may be made of resin.

The fifth thrust member 87 is a component of the first hysteresis portion 3b, and is a substantially circular-shaped friction material arranged between the input plate 82 and the first intermediate plate 83. The fifth thrust member 87 is slidably press-fitted with the input plate 82 and with the first intermediate plate 87.

According to embodiment 3-4, advantages similar to embodiment 3-2 may be obtained. In addition, each of the limiter plate 85, the input plate 82 and the intermediate plate 83 is rotatably supported by the hub 27 via the guide 86. Therefore, eccentricity of the limiter plate 85, the input plate 82 and the intermediate plate 83 may be prevented.

A modified example (embodiment 3-5) of the damper device 3 according to embodiment 3 will be described hereinafter with reference to the attached drawings.

Figure 15A:
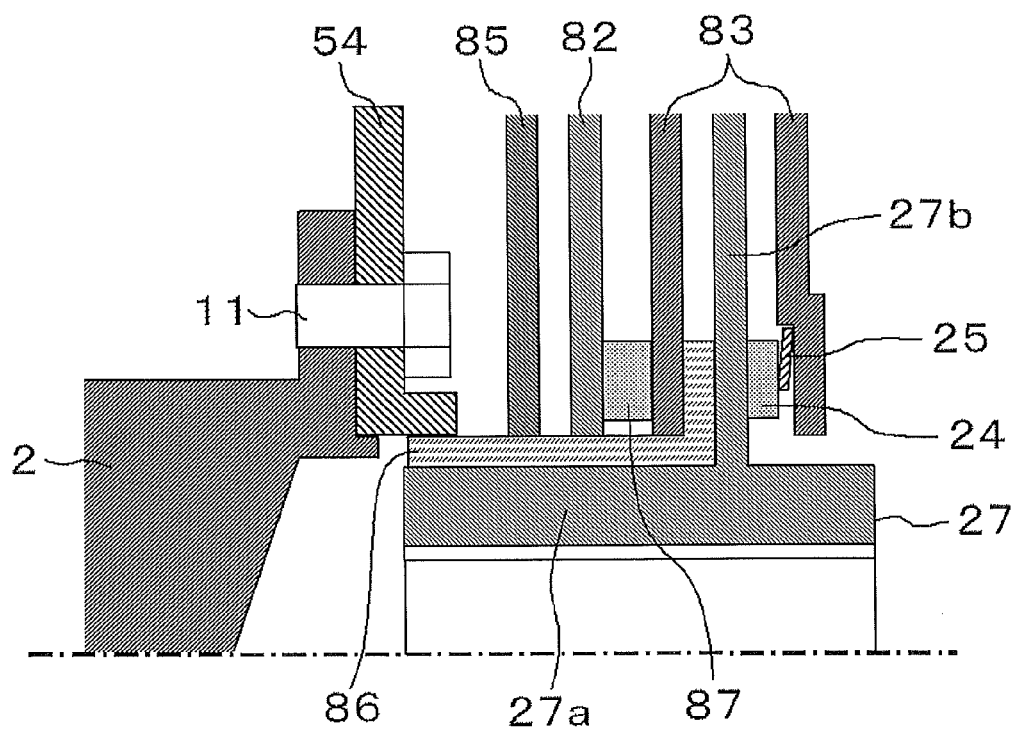
FIG. 15A is a first cross-sectional view schematically illustrating the configuration of the damper device according to a modified example (embodiment 3-5) of embodiment 3.
Figure 15B:
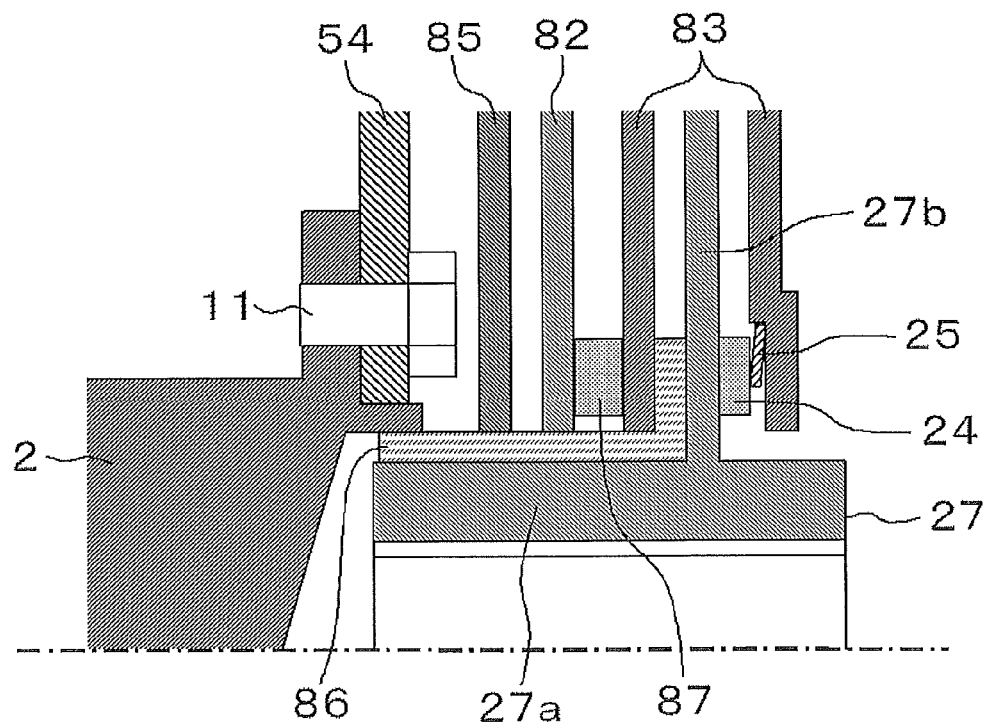
FIG. 15B is a second cross-sectional view schematically illustrating the configuration of the damper device according to the modified example (embodiment 3-5) of embodiment 3.

Similar to embodiment 3-4 (see FIG. 14), the damper device 3 according to embodiment 3-5 includes the guide 86, which rotatably supports the input plate 82, the intermediate plate 83 and the limiter plate 85 relative to the hub 27. Further, as illustrated in FIG. 15A, the guide 86 may also rotatably support the plate 54 (the first plate 10 shown in FIG. 10, a flywheel of an engine, and the like) relative to the hub 27. Furthermore, as illustrated in FIG. 15B, the guide 86 may also rotatably support the first rotational shaft 2 relative to the hub 27. Other configurations of the damper device 3 according to embodiment 3-5 are similar to embodiment 3-4 (see FIG. 14).

According to embodiment 3-5, advantages similar to embodiment 3-4 may be obtained. In addition, the guide 86 rotatably supports the plate 54 or the first rotational shaft 2 relative to the hub 27. Therefore, positions of a central axis of the damper device 3 and the first rotational shaft 2 may be easily matched and a cost of manufacturing the damper device 3 is reduced, compared to a conventional manner where knock opening portions are processed and knock pins are respectively inserted into the knock opening portions. Further, the guide 86 rotatably supports the plate 54 or the first rotational shaft 2 relative to the hub 27. Therefore, in a configuration where the limiter portion 3e is provided, eccentricity of the limiter portion 3e may be prevented in the radial direction. Furthermore, the guide 86 directly supports the first rotational shaft 2. Therefore, accuracy in preventing displacement between the first rotational shaft 2 and an axis of the hub 27 may be improved.

[Embodiment 4]

The damper device 3 according to embodiment 4 will be described hereinafter with reference to the attached drawings.

Figure 16:
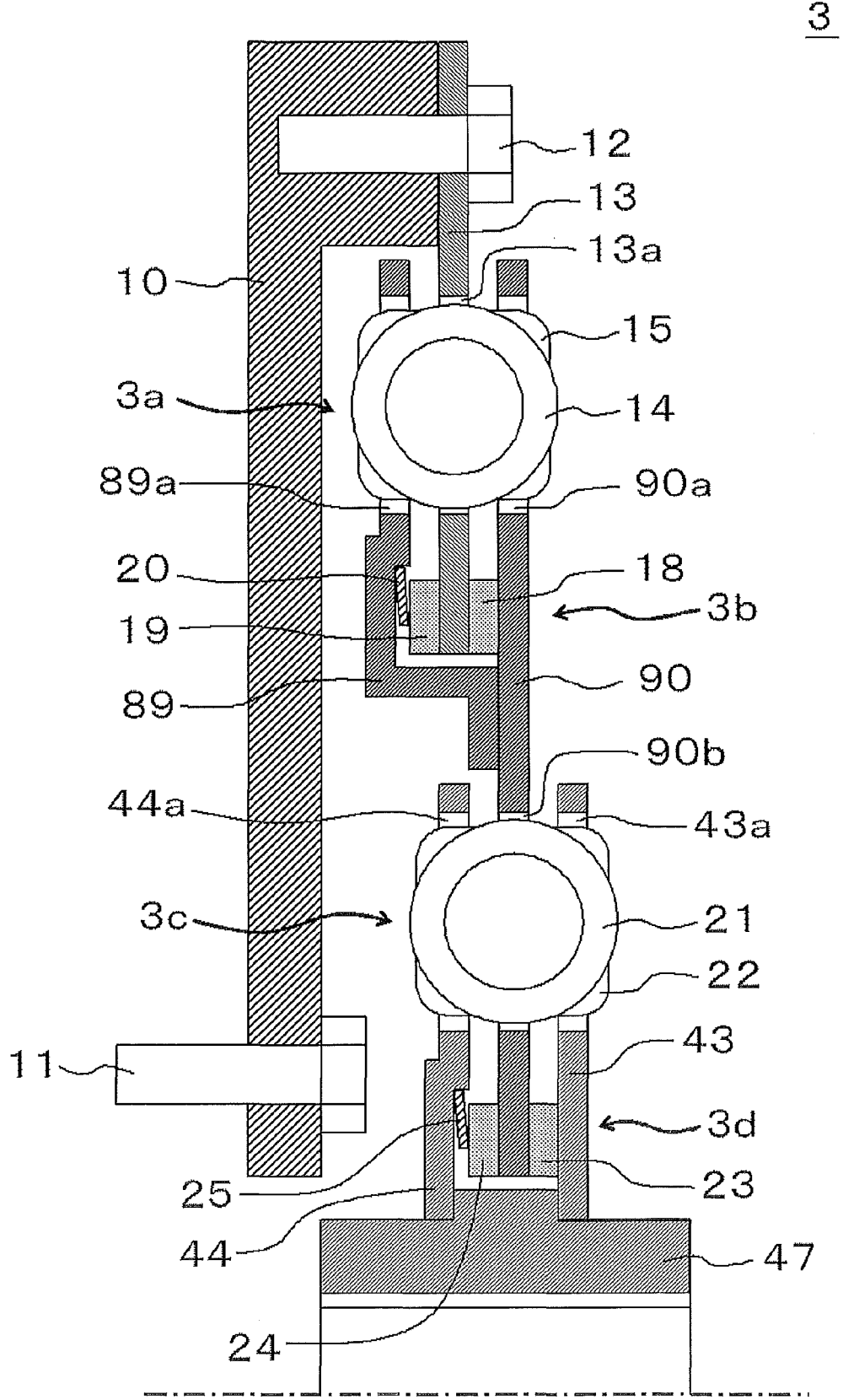
FIG. 16 is a cross-sectional view schematically illustrating the configuration of the damper device according to embodiment 4.

According to the configuration shown in FIG. 16, the damper device 3 according to embodiment 4 includes the input plate 13, first and second intermediate plates 89 and 90 and the first and second output plates 43 and 44. The damper device 3 includes the first plate 10, the first and second bolts 11 and 12, the input plate 13, the first coil spring 14, the pair of first seat 15, the first and second intermediate plates 89 and 90, the first and second thrust members 18 and 19, the first coned disc spring 20, the second coil spring 21, the pair of second seat 22, the third and fourth thrust members 23 and 24, the second coned disc spring 25, the first and second output plates 43 and 44 and the hub 47.

The first plate 10, the first and second bolts 11 and 12, the input plate 13, the first coil spring 14, the pair of first seat 15, the first and second thrust members 18 and 19, the first coned disc spring 20, the second coil spring 21, the pair of second seat 22, the third and fourth thrust members 23 and 24 and the second coned disc spring 25 are similar to embodiment 1 (see FIG. 1). Further, the first and second output plates 43 and 44 and the hub 47 are similar to embodiment 2 (see FIG. 6). Further, the configuration of the damper device 3 according to embodiment 3 is similar to the configuration of the damper device 3 shown in FIG. 2.

The first intermediate plate 89, formed into a substantially circular-shape, outputs the rotational torque, inputted by the first damper portion 3a and the first hysteresis portion 3b, while inputting the rotational torque into the second damper portion 3c and the second hysteresis portion 3d via the second intermediate plate 90. The first intermediate plate 89 is connected to the second intermediate plate 90 by means of a rivet, and the like. The first intermediate plate 89 in combination with the second intermediate plate 90 is arranged so that the input plate 13 is arranged between the first and second intermediate plates 89 and 90 to be spaced away therefrom. A second opening portion 89a, for accommodating the first coil spring 14 and the pair of first seat 15, is formed at a radially outward portion of the first intermediate plate 89, corresponding to the first damper portion 3a. The first intermediate plate 89 is provided in such a way that end surfaces of the second opening portion 89a in the circumferential direction contact/spaced away from the pair of first seat 15. The intermediate plate 89 supports the first coned disc spring 20 at the first hysteresis portion 3b, which is arranged at a radially more inward portion of the first intermediate plate 89 than the first damper portion 3a.

The second intermediate plate 90, formed into a substantially circular-shape, outputs the rotational torque, inputted by the first damper portion 3a and the first hysteresis portion 3b, while inputting the rotational torque into the second damper portion 3c and the second hysteresis portion 3d. The second intermediate plate 90 is connected to the first intermediate plate 89 by means of the rivet, and the like. The second intermediate plate 90 in combination with the first intermediate plate 89 is arranged so that the input plate 13 is arranged between the first and second intermediate plates 89 and 90 to be spaced away therefrom. A third opening portion 90a, for accommodating the first coil spring 14 and the pair of first seat 15, is formed at a radially more outward portion of the second intermediate plate 90, corresponding to the first damper portion 3a. The second intermediate plate 90 is provided in such a way that end surfaces of the third opening portion 90a in the circumferential direction contact/spaced away from the pair of first seat 15. The second intermediate plate 90 is slidably press-fitted with the first thrust member 18 at the first hysteresis portion 3b, which is arranged at a radially more inward portion of the second intermediate plate 90 than the first damper portion 3a. The second intermediate plate 90 is arranged between the first and second output plates 43 and 44 so as to be spaced away from the first and second output plates 43 and 44. A fourth opening portion 90b, for accommodating the second coil spring 21 and the pair of second seat 22, is formed at a radially more inward portion of the second intermediate plate 90 and the first hysteresis portion 3b, corresponding to the second damper portion 3c. The second intermediate plate 90 is provided in such a way that end surfaces of the fourth opening portion 90b in the circumferential direction contact/spaced away from the pair of second seat 22. The second intermediate plate 90 is slidably sandwiched between the third and fourth thrust members 23 and 24 at the surfaces of the second hysteresis portion 3d, which is arranged at a radially more inward portion of the second intermediate plate 90 than the second damper portion 3c, the surfaces extending to be substantially orthogonal relative to the axial direction.

According to embodiment 4, the first and second output plates 43 and 44 are connected to the hub 47. Therefore, the inertia of the hub 47 is structurally set to be large, and consequently, performance of absorbing noise and vibration may be improved. Further, the first damper portion 3a is configured to absorb a torsion generated by a relative rotation between the first opening portion 13a of the input plate and the second and third opening portions 89a and 90a of the first and second intermediate plates 89 and 90 (the second damper portion 3c is configured to absorb a torsion generated by a relative rotation between the fourth opening portion 90b of the second intermediate plate 90 and the fifth and sixth opening portions 43a and 44a of the first and second output plates 43 and 44). Therefore, a torsion angle may be increased and a torsional rigidity may be set at a relatively low level so as to absorb a high torque.

A modified example (embodiment 4-1) of the damper device 3 according to embodiment 4 will be described hereinafter with reference to the attached drawings.

The damper device 3 according to embodiment 4-1 includes the limiter portion 3e at the power transmission path between the second damper portion 3c and the second rotational shaft 4 (see FIG. 18). The limiter portion 3e slides when the torsion generated between the first and second rotational shafts 2 and 4 reaches the level where the torsion is not absorbed by the first and second damper portions 3a and 3c and the first and second hysteresis portions 3b and 3d. Further, the first intermediate plate 89 and an output plate 91 are supported by a hub 97 via a guide 98 so as to be rotatable relative to the hub 97 (see FIG. 17). The limiter portion 3e is provided at a power transmission path between the output plate 91 and a plate portion 97b of the hub 97. The limiter portion 3e is arranged at a position corresponding to the first damper portion 3a in the radial direction (or at a radially outward portion of the damper device 3). Other configurations of the damper device 3 according to embodiment 4-1 are similar to the damper device 3 according to embodiment 4 (see FIG. 16).

Figure 17:
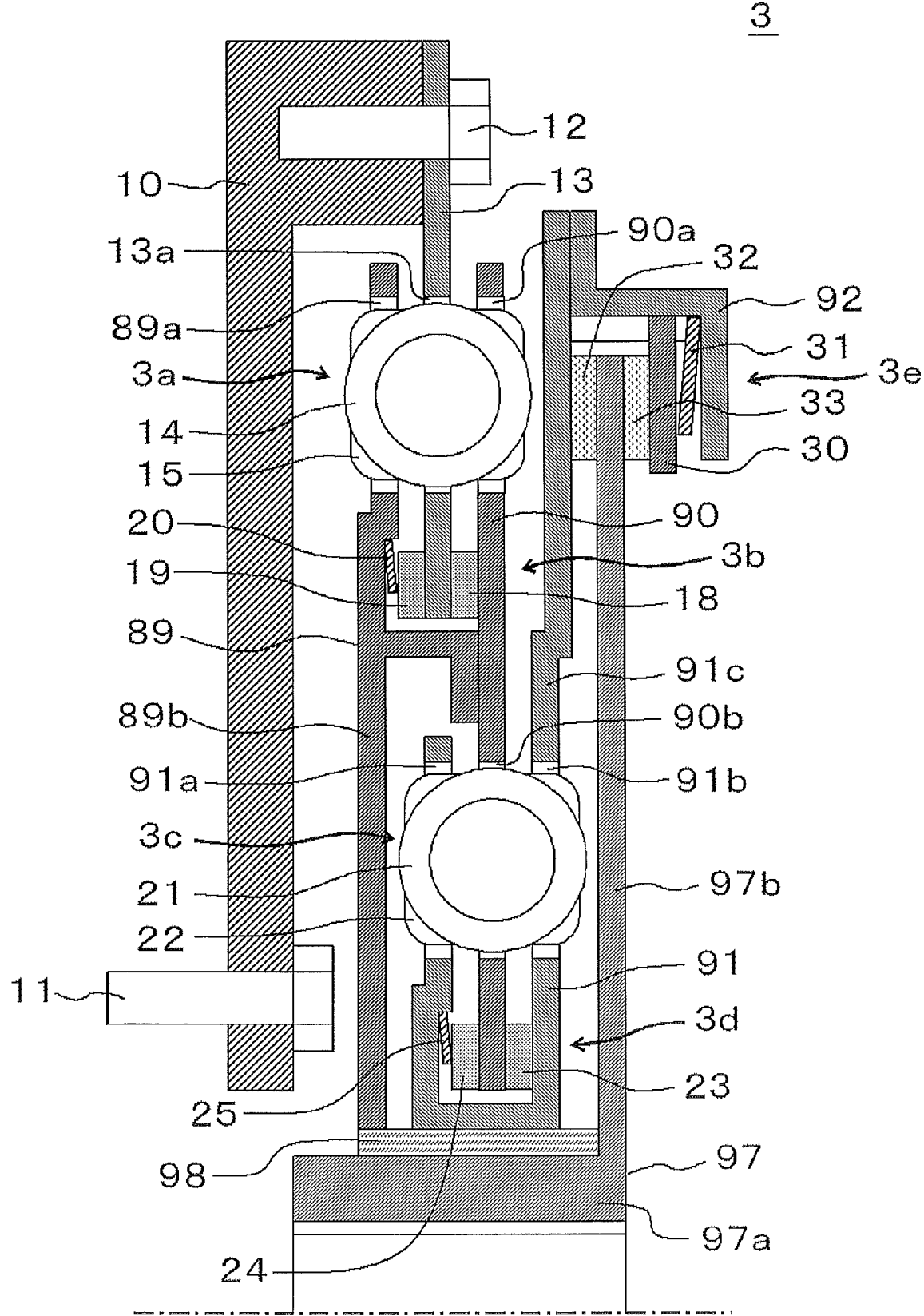
FIG. 17 is a cross-sectional view schematically illustrating the configuration of the damper device according to a modified example (embodiment 4-1) of embodiment 4.

The damper device 3 according to the configuration shown in FIG. 17 includes the input plate 13, the first and second intermediate plates 89 and 90, and the output plate 91. The damper device 3 includes the first plate 10, the first and second bolts 11 and 12, the input plate 13, the first coil spring 14, the pair of first seat 15, the first and second intermediate plates 89 and 90, the first and second thrust members 18 and 19, the first coned disc spring 20, the second coil spring 21, the pair of second seat 22, the third and fourth thrust members 23 and 24, the second coned disc spring 25, the output plate 91, a limiter plate 92, the pressure plate 30, the third coned disc spring 31, the first and second friction materials 32 and 33, the hub 97 and the guide 98.

The first and second bolts 11 and 12, the input plate 13, the first coil spring 14, the pair of first seat 15, the first and second thrust members 18 and 19, the first coned disc spring 20, the second coil spring 21, the pair of second seat 22, the third and fourth thrust members 23 and 24, the second coned disc spring 25 are similar to embodiment 1 (see FIG. 1). Further, the pressure plate 30, the third coned disc spring 31 and the first and second friction materials 32 and 33 are similar to embodiment 1-1 (see FIG. 3). Furthermore, the second intermediate plate 90 is similar to embodiment 4 (see FIG. 16).

The first intermediate plate 89 includes a radially inwardly extending portion 89b, which extends to a vicinity of a hub portion 97a of the hub 97. The first intermediate plate 89 is supported by the hub 97 via the guide 98 at a radially inward end portion of the radially inwardly extending portion 89b so as to be rotatable relative to the hub 97. Other configurations of the first intermediate plate 89 according to embodiment 4-1 are similar to the first intermediate plate 89 (see FIG. 16) according to embodiment 4.

The output plate 91 outputs the rotational torque, inputted by the second damper portion 3c and the second hysteresis portion 3d. The output plate 91 is supported by the hub portion 97a of the hub 97 via the guide 98 at an inner circumferential end surface of the output plate 91 so as to be rotatable relative to the hub portion 97a of the hub 97. An outer circumferential portion of the output plate 91 integrally includes a first plate portion and a second plate portion facing the first plate portion. The output plate 91 extends so as to interpose the second intermediate plate 90 between the first and second plate portions of the outer circumferential portion of the output plate 91 in a manner where the output plate 91 is spaced away from the second intermediate plate 90. Fifth and sixth opening portions 91a and 91b, for accommodating the second coil spring 21 and the pair of second seat 22, is formed at a radially outward portion of the output plate 91, corresponding to the second damper portion 3c. The output plate 91 is provided in such a way that end surfaces of each of the fifth and sixth opening portions 91a and 91b in the circumferential direction contact/spaced away from the pair of second seat 22. The first plate portion of the radially inward portion of the output plate 91 is slidably press-fitted with the third thrust member 23 at the second hysteresis portion 3d, which is arranged at a radially more inward portion of the output plate 91 than the second damper portion 3b. The second plate portion of the radially inward portion of the output plate 91 supports the second coned disc spring 25. The output plate 91 includes a radially outwardly extending portion 91c, which extends toward a radially outward portion of the damper device 3 so as not to contact the first damper portion 3a and the first hysteresis portion 3b. The output plate 91 is connected to the limiter plate 92 in a vicinity of an end portion of the radially outwardly extending portion 91c by means of a rivet, and the like. The output plate 91 is press-fitted with the first friction material 32 at the limiter portion 3e.

The limiter plate 92, formed into a substantially cylindrical-shape, is a component of the limiter portion 3e, and is connected to the vicinity of the end portion of the radially outwardly extending portion 91c of the output plate 91 by means of a rivet, and the like. The limiter plate 92 in combination with the output plate 91 is arranged so that the plate portion 97b of the hub 97 is arranged between the limiter plate 92 and the output plate 91 to be spaced away from the plate portion 97b of the hub 97. The limiter plate 92 supports the pressure plate 30 and the third coned disc spring 31 so as to restrict relative rotation between the limiter plate 92 and each of the pressure plate 30 and the third coned disc spring 31, and so that the pressure plate 30 and the third coned disc spring 31 are movable in the axial direction. The limiter plate 92 is press-fitted with the third coned disc spring 31.

The hub 97 includes the plate portion 97b extending from a predetermined portion of an outer circumference of the hub portion 97a. A spline for being connected to the second rotational shaft 4 (see FIG. 18) is formed at an inner circumferential surface of the hub portion 97a. The hub portion 97a supports the first intermediate plate 89 and the output plate 91 via the guide 98 so that each of the first intermediate plate 89 and the output plate 91 is rotatable relative to the hub 97. The plate portion 97b extends to a portion of the limiter 3e between the first and second friction materials 32 and 33, the limiter 3e being arranged in a vicinity of an outer circumference of the plate portion 97b. The first and second friction materials 32 and 33 are connected to the plate portion 97b of the hub 97 by means of a rivet, and the like.

The guide 98 supports the first intermediate plate 89 and the output plate 91 at the inner circumferential end portions of the first intermediate plate 89 and the output plate 91 so that each of the first intermediate plate 89 and the output plate 91 is rotatable relative to the hub 97. The guide 98 may be made of resin.

According to embodiment 4-1, advantages similar to embodiment 4 will be obtained. In addition, the limiter portion 3e is arranged at the power transmission path between the second damper portion $3_7$ and the second rotational shaft 4 (see FIG. 18). Therefore, inertia of components arranged at an output side (i.e. at a position radially more outward of the damper device 3 than the second damper portion 3c) is increased and consequently, performance of absorbing noise and vibration may be further improved. Further, the limiter portion 3e is arranged at a position corresponding to the first damper portion 3a (or at a radially outward position of the damper device 3). Therefore a torque is easily set. Furthermore, the first intermediate plate 89 and the output plate 91 are supported by the hub 97 via the guide 98 so as to be rotatable relative to the hub 97. Therefore, eccentricity of the first intermediate plate 89 and the output plate 91 may be prevented, and therefore requiring less space and less cost.

[Embodiment 5]

The damper device 3 according to embodiment 5 will be described hereinafter with reference to the attached drawings.

Figure 19:
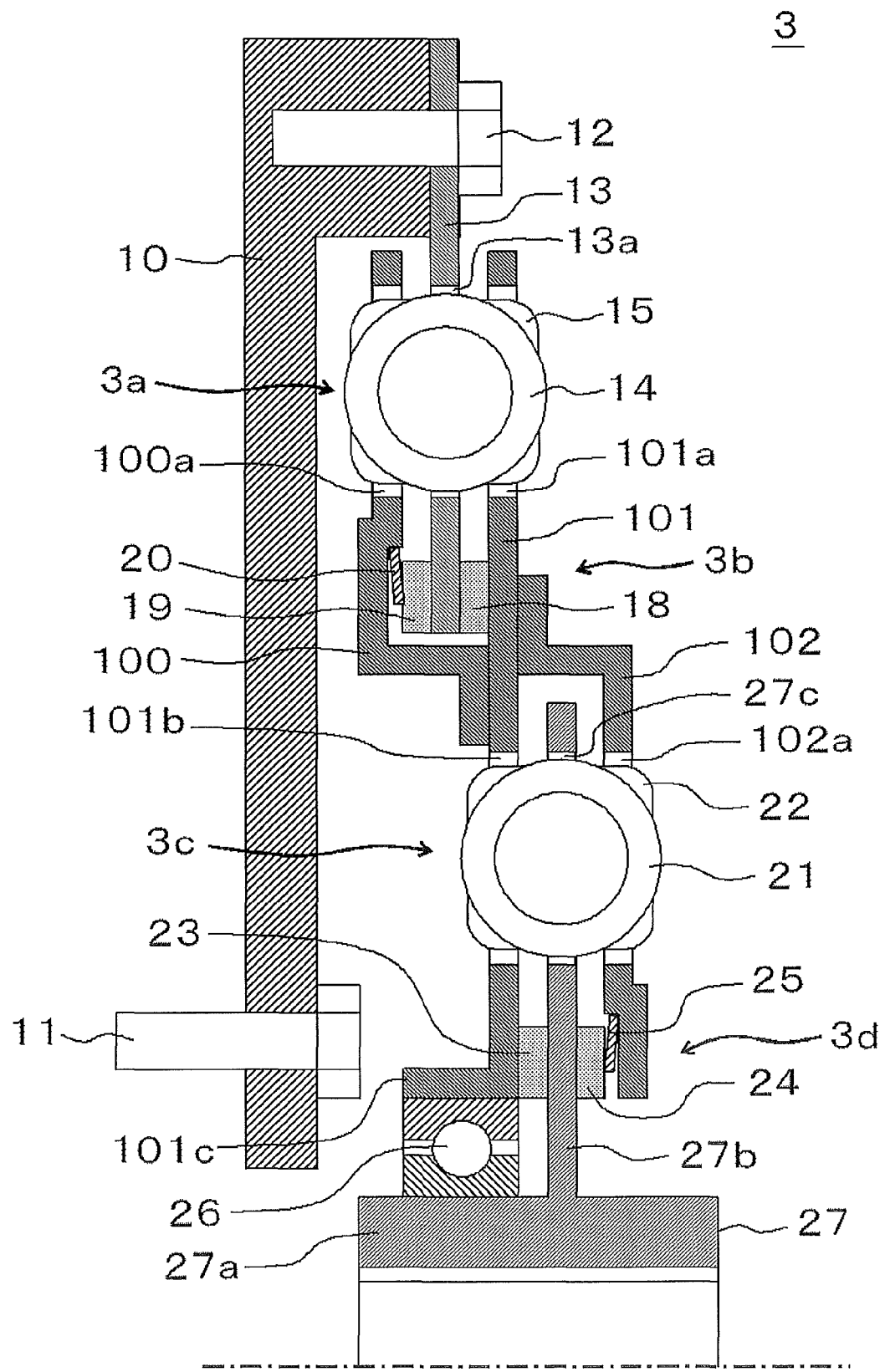
FIG. 19 is a cross-sectional view schematically illustrating the configuration of the damper device according to embodiment 5.

According to the configuration shown in FIG. 19, the damper device 3 according to embodiment 5 includes the input plate 13, first, second and third intermediate plates 100, 101 and 102 and the output plate (the hub 27). The damper device 3 includes the first plate 10, the first and second bolts 11 and 12, the input plate 13, the first coil spring 14, the pair of first seat 15, the first, second and third intermediate plates 100, 101 and 102, the first and second thrust members 18 and 19, the first coned disc spring 20, the second coil spring 21, the pair of second seat 22, the third and fourth thrust members 23 and 24, the second coned disc spring 25, the bearing 26 and the hub 27.

The first plate 10, the first and second bolts 11 and 12, the input plate 13, the first coil spring 14, the pair of first seat 15, the first and second thrust members 18 and 19, the first coned disc spring 20, the second coil spring 21, the pair of second seat 22, the third and fourth thrust members 23 and 24, the second coned disc spring 25, the bearing 26 and the hub 27 are similar to embodiment 1 (see FIG. 1). Further, the configuration of the damper device 3 according to embodiment 5 is similar to the configuration of the damper device 3 shown in FIG. 2.

The first intermediate plate 100, formed into a substantially circular-shape, outputs the rotational torque, inputted by the first damper portion 3a and the first hysteresis portion 3b, while inputting the rotational torque into the second damper portion 3c and the second hysteresis portion 3d via the second and third intermediate plates 101 and 102. The first intermediate plate 100 is connected to the second intermediate plate 101 by means of a rivet, and the like. The first intermediate plate 100 in combination with the second intermediate plate 101 is arranged so that the input plate 13 is arranged between the first and second intermediate plates 100 and 101 to be spaced away therefrom. A second opening portion 100a, for accommodating the first coil spring 14 and the pair of first seat 15, is formed at a radially more outward portion of the first intermediate plate 100, corresponding to the first damper portion 3a. The first intermediate plate 100 is provided in such a way that end surfaces of the second opening portion 100a in the circumferential direction contact/spaced away from the corresponding pair of first seat 15. The intermediate plate 100 supports the first coned disc spring 20 at a radially more inward portion of the first intermediate plate 100 than the first damper portion 3a.

The second intermediate plate 101, formed into a substantially circular-shape, outputs the rotational torque, inputted by the first damper portion 3a and the first hysteresis portion 3b, while inputting the rotational torque into the second damper portion 3c and the second hysteresis portion 3d. The second intermediate plate 101 is connected to the first intermediate plate 100 by means of the rivet, and the like. The second intermediate plate 101 in combination with the first intermediate plate 101 is arranged so that the input plate 13 is arranged between the first and second intermediate plates 100 and 101 to be spaced away therefrom. A third opening portion 101a, for accommodating the first coil spring 14 and the pair of first seat 15, is formed at a radially more outward portion of the second intermediate plate 101, corresponding to the first damper portion 3a. The second intermediate plate 101 is provided in such a way that end surfaces of the third opening portion 101a in the circumferential direction contact/spaced away from the pair of first seat 15. The second intermediate plate 101 is slidably press-fitted with the first thrust member 18 at the first hysteresis portion 3b, which is arranged at a radially more inward portion of the second intermediate plate 101 than the first damper portion 3a. The second intermediate plate 101 is connected to the third intermediate plate 102 by means of the rivet, and the like. The second intermediate plate 101 in combination with the third intermediate plate 102 is arranged so that the output plate 27b of the hub 27 is arranged between the second and third intermediate plates 101 and 102 to be spaced away therefrom. A fourth opening portion 101b, for accommodating the second coil spring 21 and the pair of second seat 22, is formed at a radially more inward portion of the second intermediate plate 101 than the first hysteresis portion 3b, corresponding to the second damper portion 3c. The second intermediate plate 101 is provided in such a way that end surfaces of the fourth opening portion 101b in the circumferential direction contact/spaced away from the pair of second seat 22. The second intermediate plate 101 is slidably press-fitted with the third thrust member 23 at the surfaces of the second hysteresis portion 3d, which is arranged at a radially more inward portion of the second intermediate plate 101 than the second damper portion 3c, the surfaces extending to be substantially orthogonal relative to the axial direction. The second intermediate plate 101 includes a cylindrical portion 101c, which is formed at an inner circumferential end of the second intermediate plate 101. The second intermediate plate 101 is supported by the hub 27 via the bearing 26 at an inner circumference of the cylindrical portion 101c so as to be rotatable relative to the hub 27.

The third intermediate plate 102, formed into a substantially circular-shape, outputs the rotational torque, inputted by the first damper portion 3a and the first hysteresis portion 3b, via the second intermediate plate 101, while inputting the rotational torque into the second damper portion 3c and the second hysteresis portion 3d. The third intermediate plate 102 is connected to the second intermediate plate 101 by means of a rivet, and the like. The third intermediate plate 102 in combination with the second intermediate plate 101 is arranged so that the output plate 27b of the hub 27 is arranged between the second and third intermediate plates 101 and 102 to be spaced away therefrom. A fifth opening portion 102a, for accommodating the second coil spring 21 and the pair of second seat 22, is formed at a radially more inward portion of the third intermediate plate 102 than the first hysteresis portion 3b, corresponding to the second damper portion 3c. The third intermediate plate 102 is provided in such a way that end surfaces of the fifth opening portion 102a in the circumferential direction contact/spaced away from the pair of second seat 22. The intermediate plate 102 supports the second coned disc spring 25 at the first hysteresis portion 3b, which is arranged at a radially more inward portion of the third intermediate plate 102 than the second damper portion 3c.

According to embodiment 5, advantages similar to embodiment 1 may be obtained. Further, the bearing 26 is provided between the first intermediate plate 100 and the hub 27. Therefore, eccentricity of the first intermediate plate 100 may be prevented.

[Sixth Embodiment]

The damper device 3 according to embodiment 6 will be described hereinafter with reference to the attached drawings.

Figure 20:
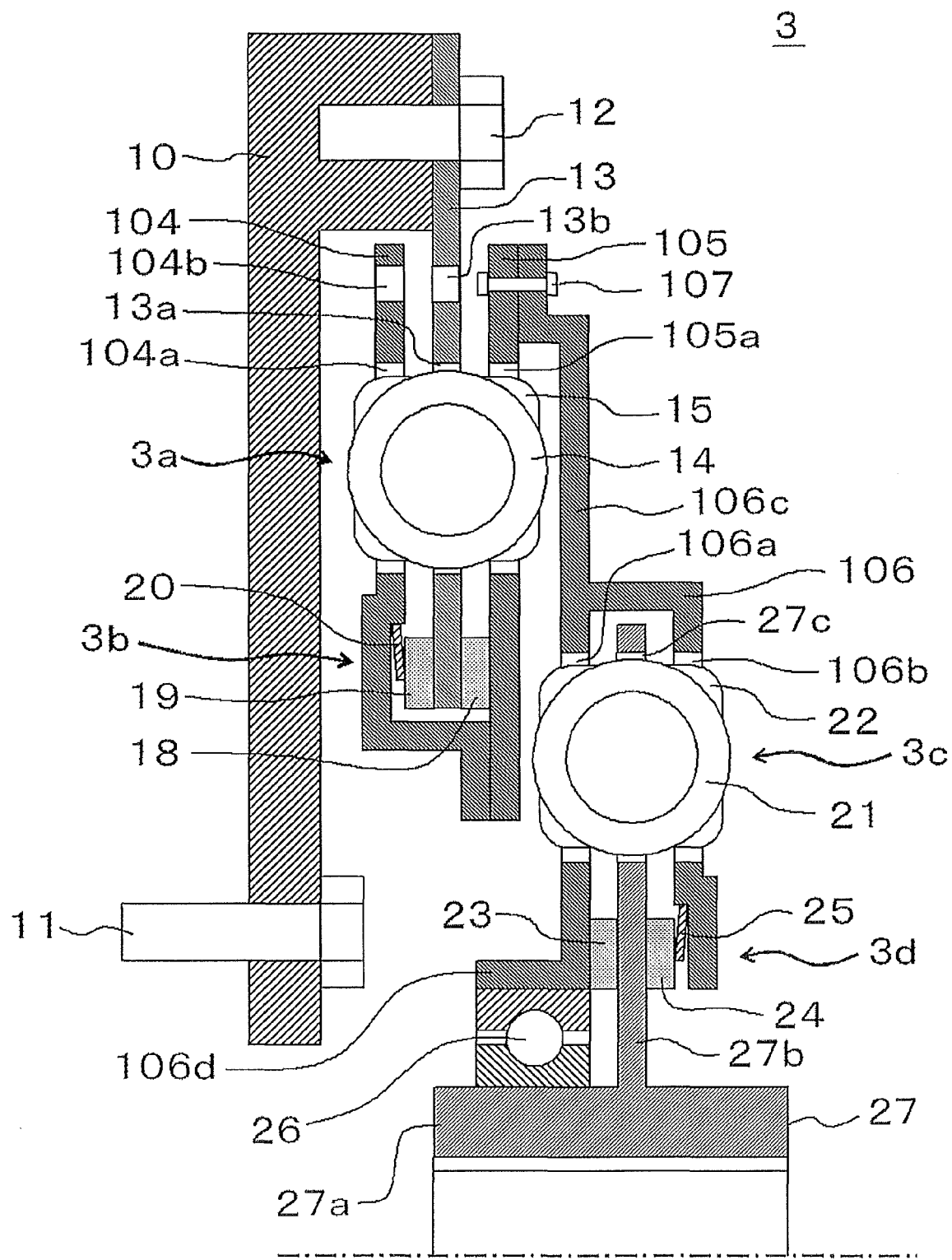
FIG. 20 is a cross-sectional view schematically illustrating the configuration of the damper device according to embodiment 6.

According to the configuration shown in FIG. 20, the damper device 3 according to embodiment 6 includes the input plate 13, first, second and third intermediate plates 104, 105 and 106 and the output plate (the hub 27). The first damper portion 3a and the second damper portion 3c are arranged so as to be displaced from each other in the axial direction.

The damper device 3 includes the first plate 10, the first and second bolts 11 and 12, the input plate 13, the first coil spring 14, the pair of first seat 15, the first, second and third intermediate plates 104, 105 and 106, the first and second thrust members 18 and 19, the first coned disc spring 20, the second coil spring 21, the pair of second seat 22, the third and fourth thrust members 23 and 24, the second coned disc spring 25, the bearing 26 and the hub 27.

The first plate 10, the first and second bolts 11 and 12, the input plate 13, the first coil spring 14, the pair of first seat 15, the first and second thrust members 18 and 19, the first coned disc spring 20, the second coil spring 21, the pair of second seat 22, the third and fourth thrust members 23 and 24, the second coned disc spring 25, the bearing 26 and the hub 27 are similar to embodiment 1 (see FIG. 1). Further, the configuration of the damper device 3 according to embodiment 5 is similar to the configuration of the damper device 3 shown in FIG. 2.

Figure 21:
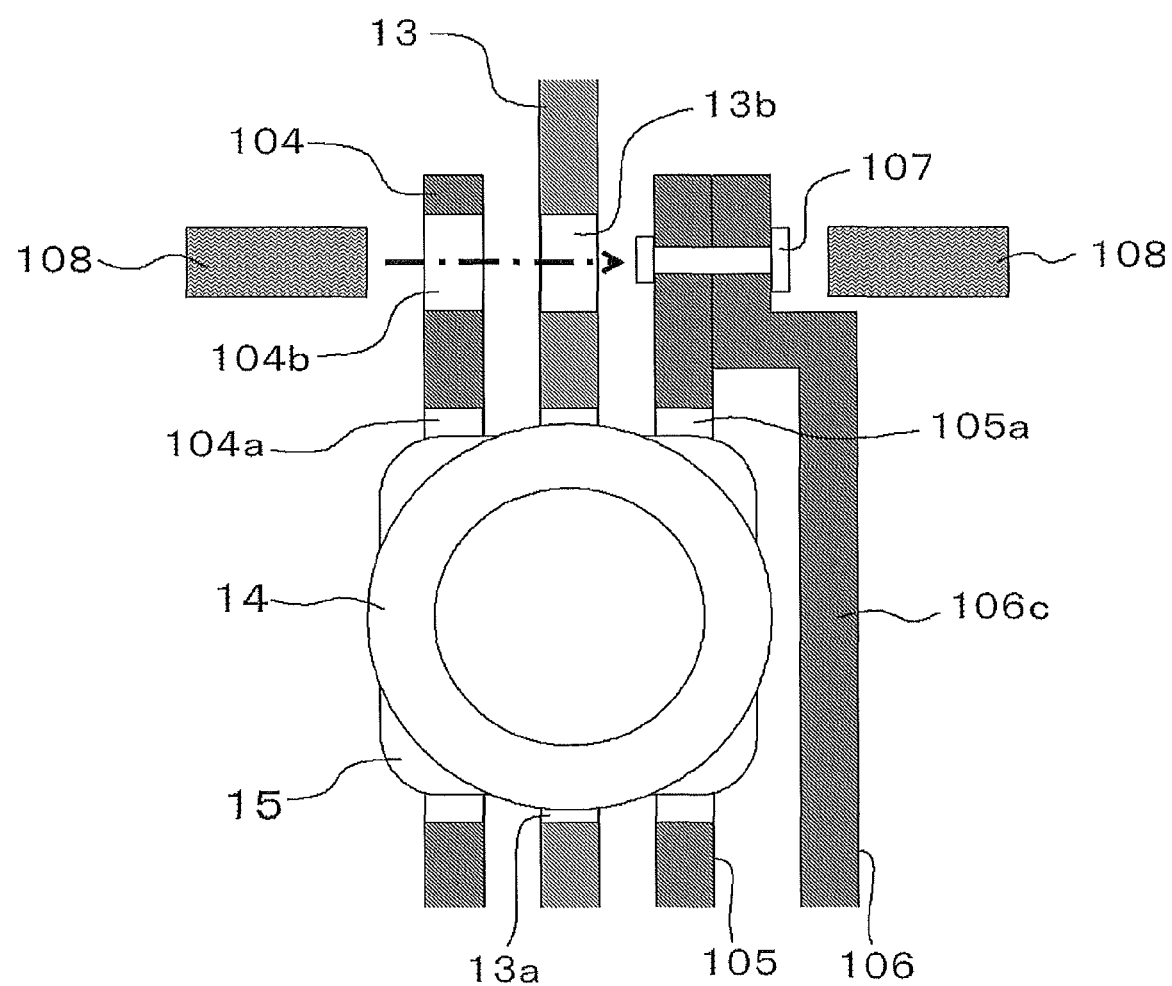
FIG. 21 is an enlarged cross-sectional view schematically illustrating the configuration of a portion surrounding a rivet of the damper device according embodiment 6.

A first hole 13b (or a cutout) (an opening portion), for allowing a punch 108 to be inserted thereto, is formed at a portion of the input plate 13, corresponding to a rivet 107 in the axial direction (see FIG. 21). Other configurations of the input plate 13 are similar to the input plate 13 according to embodiment 1 (see FIG. 1).

The first intermediate plate 104, formed into a substantially circular-shape, outputs the rotational torque, inputted by the first damper portion 3a and the first hysteresis portion 3b, while inputting the rotational torque into the second damper portion 3c and the second hysteresis portion 3d via the second and third intermediate plates 105 and 106. The first intermediate plate 104 is connected to the second intermediate plate 105 by means of a rivet, and the like. The first intermediate plate 104 in combination with the second intermediate plate 105 is arranged so that the input plate 13 is arranged between the first and second intermediate plates 104 and 105 to be spaced away therefrom. A second hole 104b (or a cutout) (an opening portion) is formed at a portion of the first intermediate plate 104, corresponding to the rivet 107 in the axial direction (see FIG. 21). A second opening portion 104a, for accommodating the first coil spring 14 and the pair of first seat 15, is formed at a radially more inward portion of the first intermediate plate 104 than the second hole 104b, corresponding to the first damper portion 3a. The first intermediate plate 104 is provided in such a way that end surfaces of the second opening portion 104a in the circumferential direction contact/spaced away from the pair of first seat 15. The first intermediate plate 104 supports the first coned disc spring 20 at the first hysteresis portion 3b, which is arranged at a radially more inward portion of the first intermediate plate 104 than the first damper portion 3a.

The second intermediate plate 105, formed into a substantially circular-shape, outputs the rotational torque, inputted by the first damper portion 3a and the first hysteresis portion 3b, while inputting the rotational torque into the second damper portion 3c and the second hysteresis portion 3d via the third intermediate plate 106. The second intermediate plate 105 is connected to the first intermediate plate 104 by means of the rivet, and the like. The second intermediate plate 104 in combination with the first intermediate plate 105 is arranged so that the input plate 13 is arranged between the first and second intermediate plates 104 and 105 to be spaced away therefrom. A radially outward portion of the second intermediate plate is connected to a radially outwardly extending portion 106c of the third intermediate plate 106 by means of the rivet 107. A third opening portion 105a, for accommodating the first coil spring 14 and the pair of first seat 15, is formed at a radially more inward portion of the second intermediate plate 105 than the rivet 107, corresponding to the first damper portion 3a. The second intermediate plate 105 is provided in such a way that end surfaces of the third opening portion 105a in the circumferential direction contact/spaced away from the pair of first seat 15. The second intermediate plate 105 is slidably press-fitted with the first thrust member 18 at the second hysteresis portion 3d, which is arranged at a radially more inward portion of the second intermediate plate 105 than the first damper portion 3a.

The third intermediate plate 106, formed into a substantially circular-shape, outputs the rotational torque, inputted by the first damper portion 3a and the first hysteresis portion 3b, via the second intermediate plate 105, while inputting the rotational torque into the second damper portion 3c and the second hysteresis portion 3d. The third intermediate plate 106 includes the radially outwardly extending portion 106c, which extends toward a radially outward portion of the third intermediate plate 106. A radially outward end portion of the radially outwardly extending portion 106c is connected to the second intermediate plate 105 by means of the rivet 107. A radially inward portion of the third intermediate plate 106 integrally includes a first plate portion and a second plate portion facing the first plate portion. The third intermediate plate 106 extends so as to interpose the output plate 27b of the hub 27 between the first and second plate portions of the radially inward portion of the third intermediate plate 106 in a manner where the third intermediate plate 106 is spaced away from the output plate 27b. Fourth and fifth opening portions 106a and 106b, for accommodating the second coil spring 21 and the pair of second seat 22, are formed at portions of the third intermediate plate 106, corresponding to the second damper portion 3c, which is displaced from the first damper portion 3a in the axial direction. The third intermediate plate 106 is provided in such a way that end surfaces of each of the fourth and fifth opening portions 106a and 106b in the circumferential direction contact/spaced away from the pair of second seat 22. The first plate portion of the radially inward portion of the third intermediate plate 106 is slidably press-fitted with the third thrust member 23 at the second hysteresis portion 3d, which is arranged at a radially more inward portion of the third intermediate plate 106 than the second damper portion 3c. The second plate portion of the radially inward portion of the third intermediate plate 106 supports the second coned disc spring 25. The third intermediate plate 106 includes a cylindrical portion 106d, which is formed at an inner circumferential end of the third intermediate plate 106. The third intermediate plate 106 is supported by the hub 27 via the bearing 26 at an inner circumference of the cylindrical portion 106d so as to be rotatable relative to the hub 27.

The rivet 107 caulks and fixes the second and third intermediate plates 105 and 106. When the rivet 107 caulks and fixes the second and third intermediate plates 105 and 106, the punch 108 is inserted into the second and first holes 104b and 13b of the first intermediate plate 104 and the input plate 13, in a state where the input plate 13 is removed from the input plate 13 (see FIG. 21).

According to embodiment 6, advantages similar to embodiment 1 may be obtained. Further, the bearing 26 is provided between the third intermediate plate 106 and the hub 27. Therefore, eccentricity of the third intermediate plate 106 may be prevented. Furthermore, the first damper portion 3a and the second damper portion 3c are displaced from each other in the axial direction, therefore, requiring less space in the radial direction.

A modified example (embodiment 6-1) of the damper device 3 according to embodiment 6 will be described hereinafter with reference to the attached drawings Similar to the damper device 3 shown in FIG. 4, the damper device 3 according to embodiment 6-1 includes the limiter portion 3e. The limiter portion 3e is provided at the power transmission path between the first rotational shaft 2 and the first damper portion 3a so as to slide when the torsion generated between the first and second rotational shafts 2 and 4 reaches the level where the torsion is not absorbed by the first and second damper portions 3a and 3c and the first and second hysteresis portions 3b and 3d. Other configurations of the damper device 3 according to embodiment 6-1 are similar to embodiment 6 (see FIG. 21).

Figure 22:
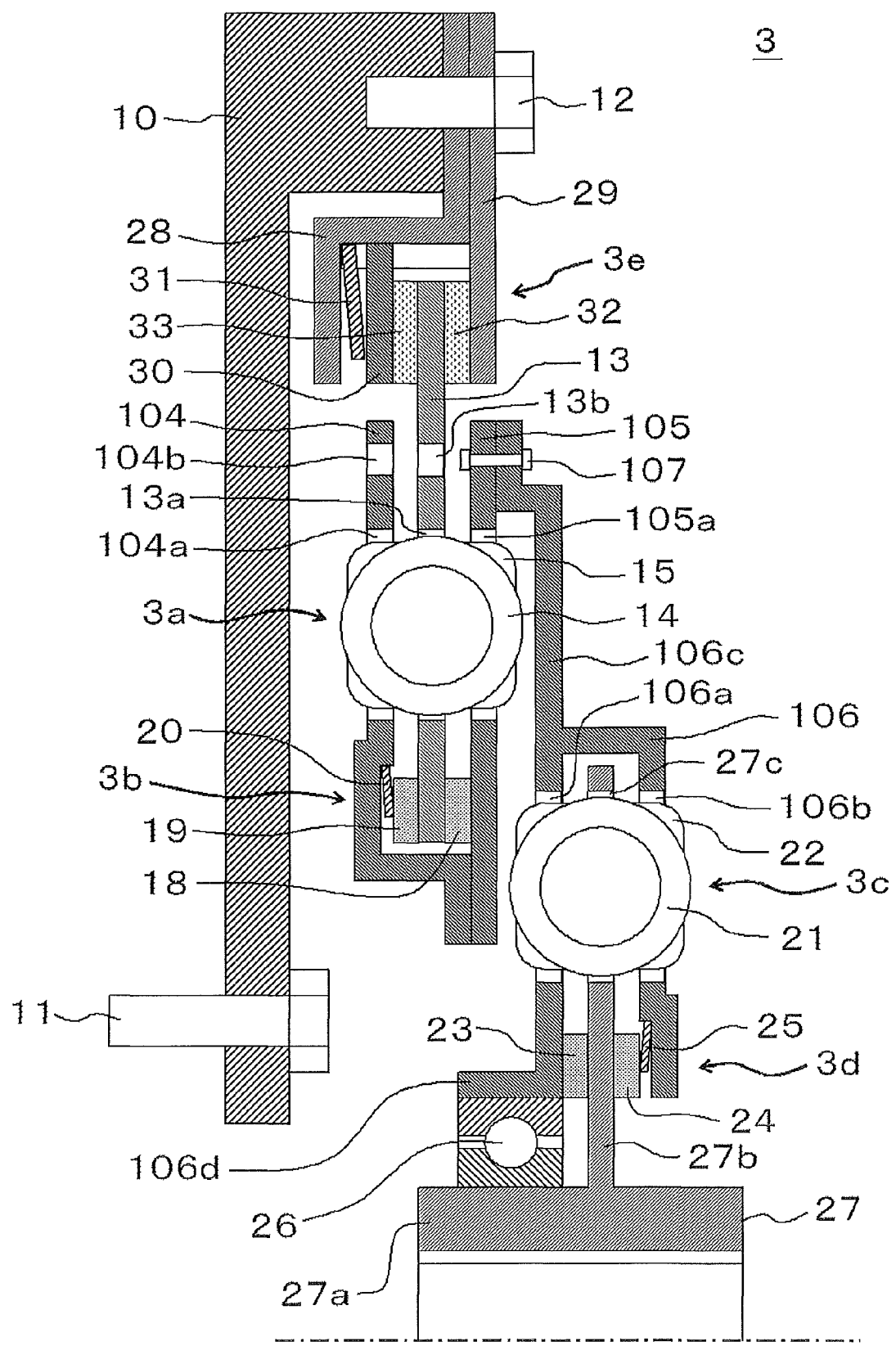
FIG. 22 is a cross-sectional view schematically illustrating the configuration of the damper device according to a modified example (embodiment 6-1) of embodiment 6.

The damper device 3 includes the limiter portion 3e at a radially more outward portion of the damper device 3 than the first damper portion 3a (see FIG. 22). The limiter portion 3e may slide with the approximately 1.2 to 3 times greater torque than the engine torque. The damper device 3 includes the second and third plates 28 and 29, the pressure plate 30, the third coned disc spring 31, the first and second friction materials 32 and 33 and the input plate 13, as components of the limiter portion 3e. The second and third plates 28 and 29, the pressure plate 30, the third coned disc spring 31 and the first and second friction materials 32 and 33 are similar to embodiment 1-1 (see FIG. 3).

Unlike the configuration of the damper device 3 shown in FIG. 22, a radially more outward portion of the input plate 13 than the first damper portion 3a is not fixed at the first plate 10. According to embodiment 6-1, a radially more outward portion of the input plate 13 than the first damper portion 3a is arranged between the first and second friction materials 32 and 33, and the first and second friction materials 32 and 33 are fixed at the input plate 13 by means of a rivet, and the like. Other configurations of the input plate 13 according to embodiment 6-1 are similar to embodiment 6 (see FIG. 21).

According to embodiment 6-1, advantages similar to embodiment 6 may be obtained. In addition, the limiter portion 3e is provided. Therefore, an excessive torque is reduced, and as a result, a possibility of damaging the damper device 3 may be reduced. Further, the limiter portion 3e is arranged at the power transmission path between the first rotational shaft 2 (see FIG. 4) and the first damper portion 3a. Therefore, the limiter portion 3e is arranged in a vicinity of a radially outward portion of the damper device 3, and as a result, a torque is easily set.

A modified example (embodiment 6-2) of the damper device 3 according to embodiment 6 will be described hereinafter with reference to the attached drawings.

Similarly to the damper device 3 shown in FIG. 8, the damper device 3 according to embodiment 6-2 includes the limiter portion 3e at the power transmission path between the first and second damper portions 3a and 3c. The limiter portion 3e slides when the torsion generated between the first and second rotational shafts 2 and 4 reaches the level where the torsion is not absorbed by the first and second damper portions 3a and 3c and the first and second hysteresis portions 3b and 3d.

Figure 23:
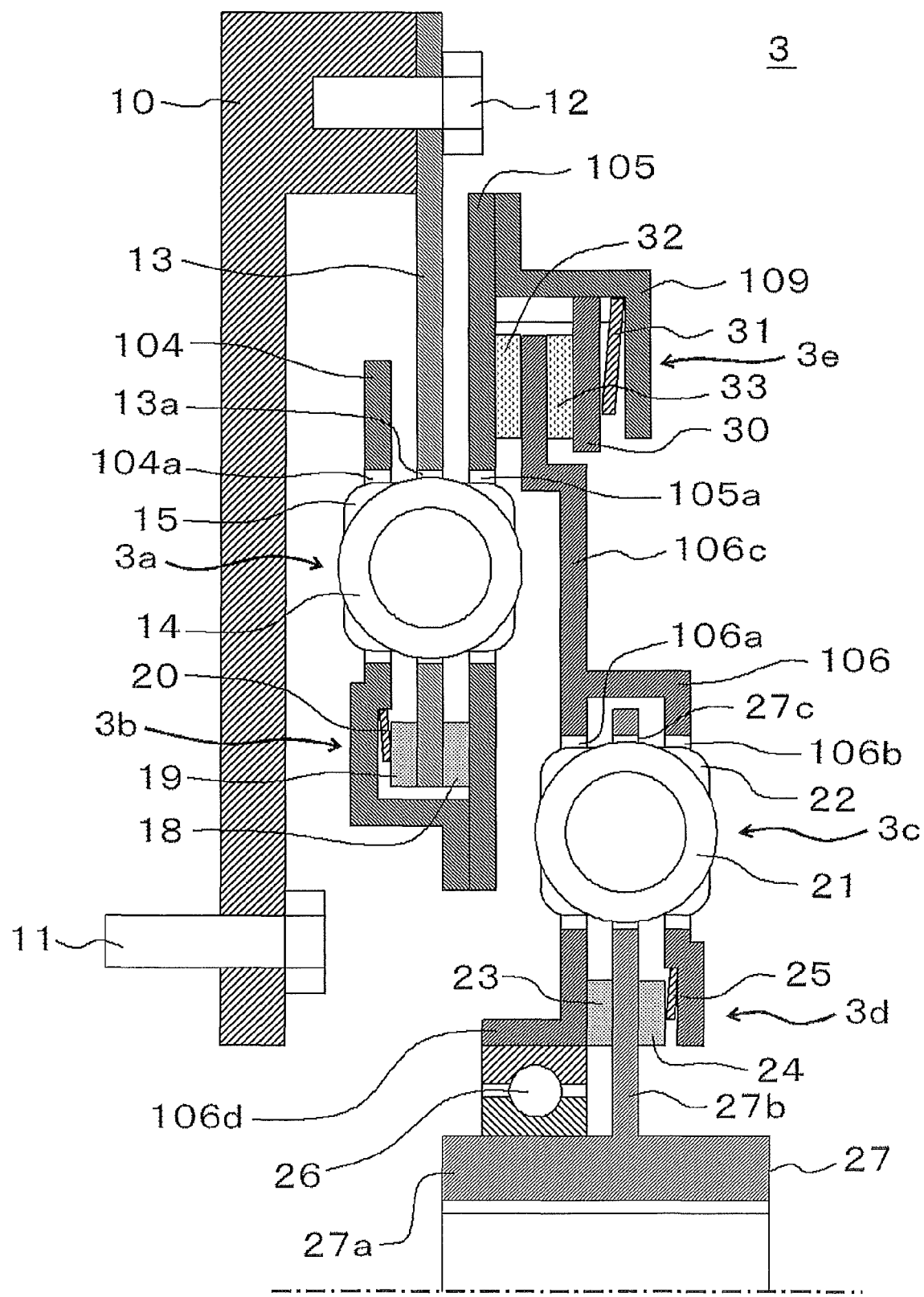
FIG. 23 is a cross-sectional view schematically illustrating the configuration of the damper device according to a modified example (embodiment 6-2) of embodiment 6.

The damper device 3 includes the limiter portion 3e, which is arranged at a radially more outward portion of the damper device 3 than the first damper portion 3a (see FIG. 23). The limiter portion 3e may slide with the approximately 1.2 to 3 times greater torque than the engine torque. The damper device 3 according to embodiment 6-2 includes the second intermediate plate 105, a limiter plate 109, the pressure plate 30, the third coned disc spring 31, the first and second friction materials 32 and 33 and the third intermediate plate 106, as components of the limiter portion 3e.

The pressure plate 30, the third coned disc spring 31 and the first and second friction materials 32 and 33 are similar to embodiment 1-1 (see FIG. 3). Other configurations of the damper device 3 are similar to embodiment 6 (see FIG. 20).

The second intermediate plate 105, formed into a substantially circular-shape, is a component of the limiter portion 3e, and is connected to the limiter plate 109 at a radially outward portion of the second intermediate plate 105 by means of a rivet, and the like. Other configurations of the second intermediate plate 105 according to embodiment 6-2 are similar to the second intermediate plate 105 according to embodiment 6 (see FIG. 20).

The limiter plate 109, formed into a substantially cylindrical-shape, is a component of the limiter portion 3e, and is connected to a vicinity of radially outward portion of the second intermediate plate 105 by means of a rivet, and the like. The limiter plate 109 in combination with the second intermediate plate 105 is arranged so that the radially outwardly extending portion 106c of the third intermediate plate 106 is arranged between the limiter plate 109 and the second intermediate plate 105 to be spaced away therefrom. The limiter plate 109 supports the pressure plate 30 and the third coned disc spring 31 so as to restrict relative rotation between the limiter plate 109 and each of the pressure plate 30 and the third coned disc spring 31, and so that the pressure plate 30 and the third coned disc spring 31 are movable in the axial direction. The limiter plate 109 is press-fitted with the third coned disc spring 31.

The third intermediate plate 106, formed into a substantially circular-shape, outputs the rotational torque, inputted by the first damper portion 3a and the first hysteresis portion 3b, via the second intermediate plate 105 and the limiter portion 3e, while inputting the rotational torque into the second damper portion 3c and the second hysteresis portion 3d. The third intermediate plate 106 includes the radially outwardly extending portion 106c, which extends toward a portion of the third intermediate plate 106 between the first and second friction materials 32 and 33. The first and second friction materials 32 and 33 are fixed at the second intermediate plate 106 by means of a rivet, and the like. Other configurations of the third intermediate plate 106 are similar to the second intermediate plate 106 according to the embodiment 6 (see FIG. 2).

According to embodiment 6-2, advantages similar to embodiment 6 may be obtained. In addition, the limiter portion 3e is provided. Therefore, an excessive torque is reduced, and as a result, a possibility of damaging the damper device 3 may be reduced. Further, the limiter portion 3e is arranged at the power transmission path between the first and second damper portions 3a and 3c, therefore requiring less space and less cost.

A modified example (embodiment 6-3) of the damper device 3 according to embodiment 6 will be described hereinafter with reference to the attached drawings.

Similar to the damper device 3 shown in FIG. 18, the damper device 3 according to embodiment 6-3 includes the limiter portion 3e at the power transmission path between the second damper portion 3c and the second rotational shaft 4. The limiter portion 3e slides when the torsion generated between the first and second rotational shafts 2 and 4 reaches the level where the torsion is not absorbed by the first and second damper portions 3a and 3c and the first and second hysteresis portions 3b and 3d. Further, the input plate 13 and a second intermediate plate 112 are supported by the hub 47 via a guide 118 so as to be rotatable relative to the hub 47 (see FIG. 24). Further, the limiter portion 3e is provided at a power transmission path between an output plate 116 and the hub 47. Other configurations of the damper device 3 according to embodiment 6-3 are similar to the damper device 3 according to embodiment 6 (see FIG. 20).

Figure 24:
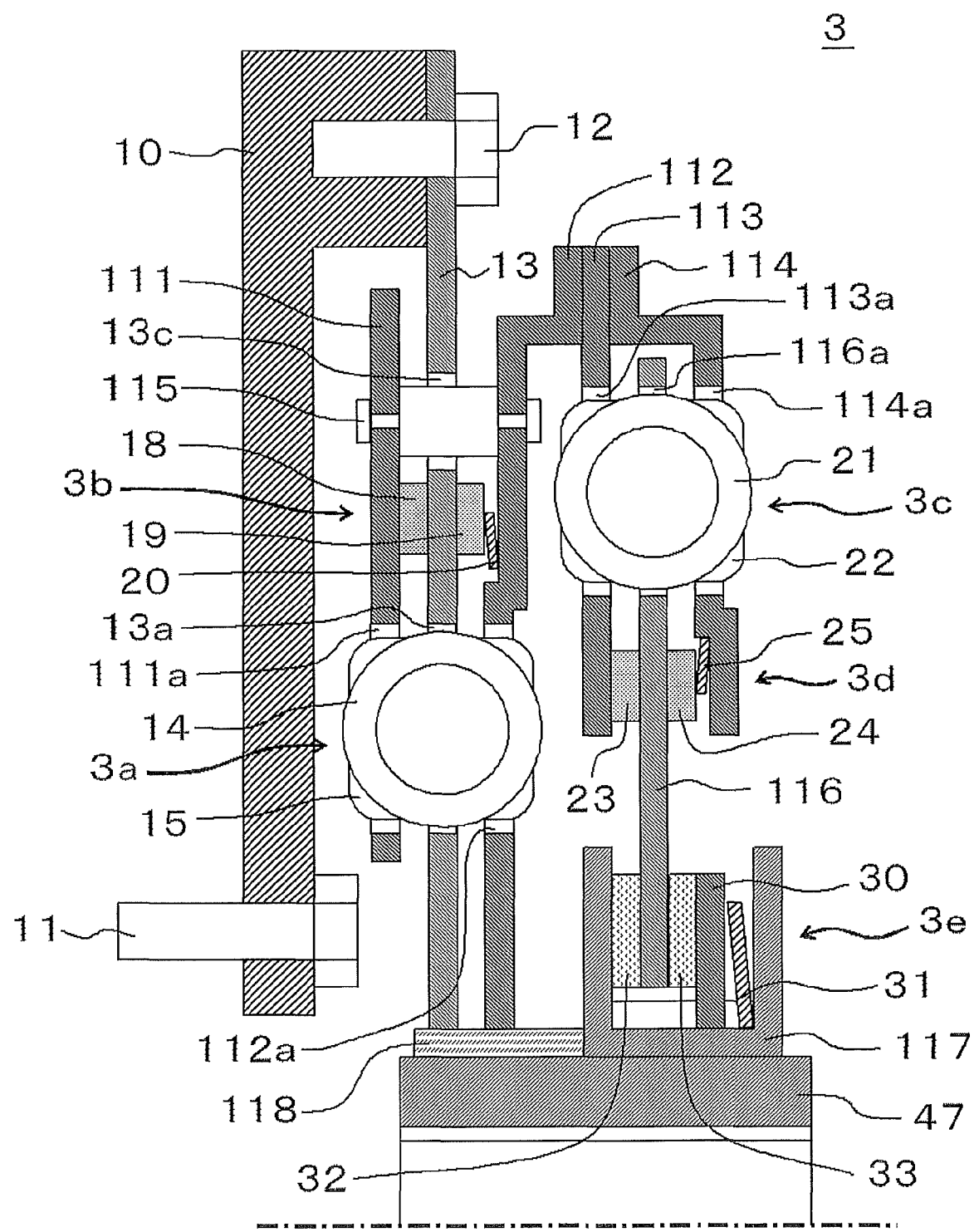
FIG. 24 is a cross-sectional view schematically illustrating the configuration of the damper device according to a modified example (embodiment 6-3) of embodiment 6.
Figure 25:
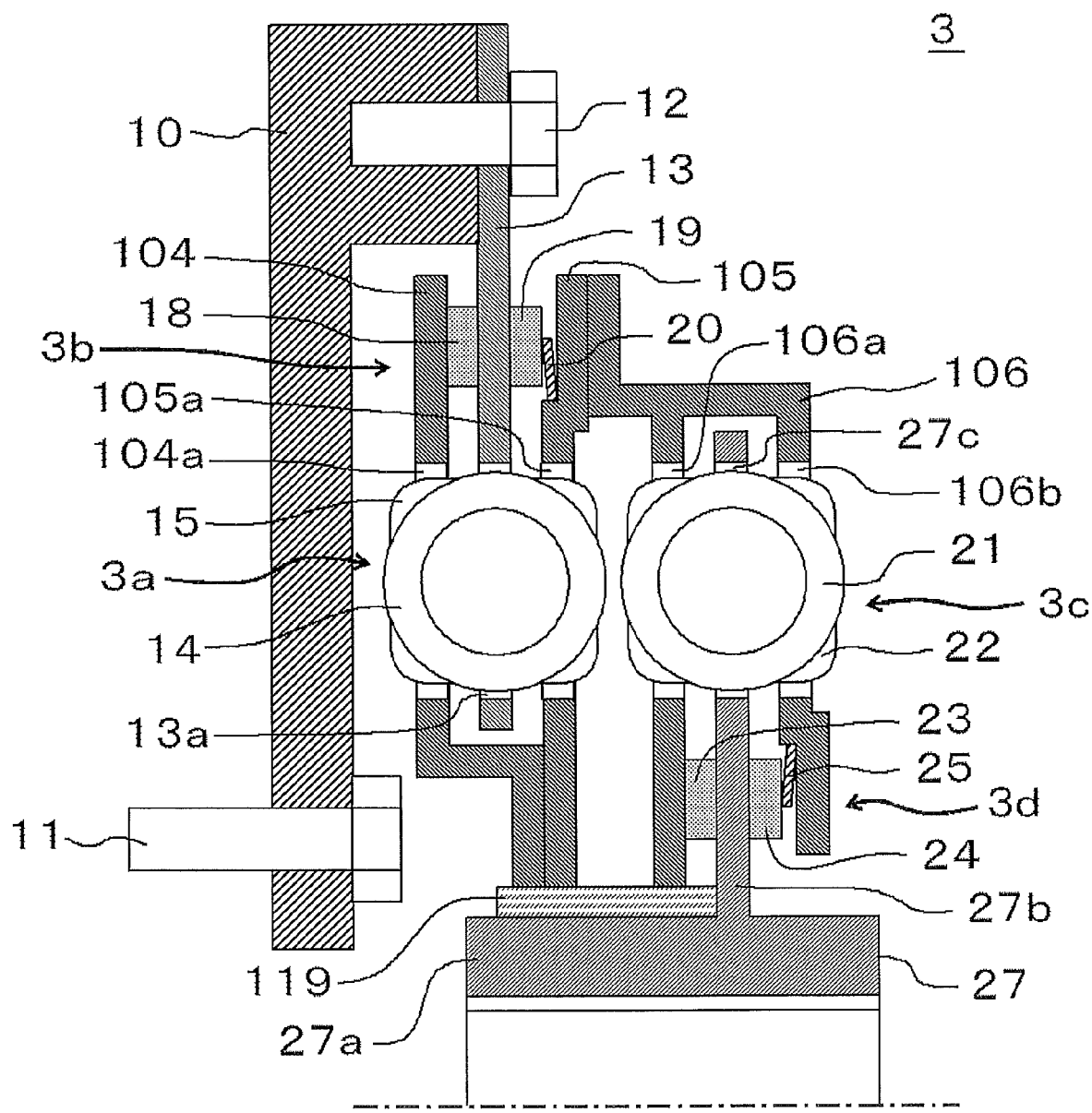
FIG. 25 is a cross-sectional view schematically illustrating the configuration of the damper device according to a modified example (embodiment 6-4) of embodiment 6.

The damper device 3 according to the configuration shown in FIG. 24 includes the input plate 13, first, second, third and fourth intermediate plates 111, 112, 113 and 114, and an output plate 116. The damper device 3 includes the first plate 10, the first and second bolts 11 and 12, the input plate 13, the first coil spring 14, the pair of first seat 15, the first, second, third and fourth intermediate plates 111, 112, 113 and 114, a rivet 115, the first and second thrust members 18 and 19, the first coned disc spring 20, the second coil spring 21, the pair of second seat 22, the third and fourth thrust members 23 and 24, the second coned disc spring 25, the output plate 116, a limiter plate 117, the pressure plate 30, the third coned disc spring 31, the first and second friction materials 32 and 33, the hub 47 and a guide 118.

The first plate 10, the first and second bolts 11 and 12, the first coil spring 14, the pair of first seat 15, the first and second thrust members 18 and 19, the first coned disc spring 20, the second coil spring 21, the pair of second seat 22, the third and fourth thrust members 23 and 24, the second coned disc spring 25 are similar to embodiment 1 (see FIG. 1). Further, the pressure plate 30, the third coned disc spring 31 and the first and second friction materials 32 and 33 are similar to embodiment 1-1 (see FIG. 3). Furthermore, the hub 47 is similar to embodiment 2 (see FIG. 6).

The input plate 13 includes a hole 13c, through which a shaft portion of the rivet 115 is inserted (see FIG. 24). The hole 13c is formed so that the shaft portion of the rivet 115 is movable for a predetermined distance in circumferential directions of the first and second intermediate plates 111 and 112 when the first and second intermediate plates 111 and 112 are rotated relative to each other. The input plate 13 is supported by the hub 47 via the guide 118 at an inner circumferential end of the input plate 13 so as to be rotatable relative to the hub 47. Other configurations of the input plate 13 are similar to the input plate 13 according to embodiment 1 (see FIG. 1).

The first intermediate plate 111, formed into a substantially circular-shape, outputs the rotational torque, inputted by the first damper portion 3a and the first hysteresis portion 3b, while inputting the rotational torque into the second damper portion 3c and the second hysteresis portion 3d via the second, third and fourth intermediate plates 112, 113 and 114. The first intermediate plate 111 is connected to the second intermediate plate 112 by means of the rivet 115. The first intermediate plate 111 in combination with the second intermediate plate 112 is arranged so that the input plate 13 is arranged between the first and second intermediate plates 111 and 112 to be spaced away therefrom. The intermediate plate 111 is slidably press-fitted with the first thrust member 18 at the first hysteresis portion 3b, which is arranged at a radially more inward portion of the first intermediate plate 111 than the rivet 115. A second opening portion 111a, for accommodating the first coil spring 14 and the pair of first seat 15, is formed at a radially more inward portion of the first intermediate plate 111 than the first hysteresis portion 3b, corresponding to the first damper portion 3a. The first intermediate plate 111 is provided in such a way that end surfaces of the second opening portion 111a in the circumferential direction contact/spaced away from the pair of first seat 15.

The second intermediate plate 112, formed into a substantially circular-shape, outputs the rotational torque, inputted by the first damper portion 3a and the first hysteresis portion 3b, while inputting the rotational torque into the second damper portion 3c and the second hysteresis portion 3d via the third and fourth intermediate plates 113 and 114. The second intermediate plate 112 is connected to the first intermediate plate 111 by means of the rivet 115. The second intermediate plate 112 in combination with the first intermediate plate 111 is arranged so that the input plate 13 is arranged between the first and second intermediate plates 111 and 112 to be spaced away therefrom. A radially outward portion of the second intermediate plate 112 is connected to the third and fourth intermediate plates 113 and 114 by means of a rivet, and the like. The second intermediate plate 112 supports the first coned disc spring 20 at the first hysteresis portion 3b, which is arranged at a radially more inward portion of the second intermediate plate 112 than the rivet 115. A third opening portion 112a, for accommodating the first coil spring 14 and the pair of first seat 15, is formed at a radially more inward portion of the second intermediate plate 112 than the first damper portion 3a, corresponding to the first damper portion 3a. The second intermediate plate 112 is provided in such a way that end surfaces of the third opening portion 112a in the circumferential direction contact/spaced away from the pair of first seat 15. The second intermediate plate 112 is supported by the hub 47 via the guide 118 at an inner circumferential end portion of the second intermediate plate 112 so as to be rotatable relative to the hub 47.

The third intermediate plate 113, formed into a substantially circular-shape, outputs the rotational torque, inputted by the first damper portion 3a and the first hysteresis portion 3b, via the second intermediate plate 112, while inputting the rotational torque into the second damper portion 3c and the second hysteresis portion 3d. The third intermediate plate 113 together with the fourth intermediate plate 114 is connected to the second intermediate plate 112, in a vicinity of a radially outward end of the third intermediate plate 113, by means of a rivet, and the like. The third intermediate plate 113 in combination with the fourth intermediate plate 114 is arranged so that the output plate 116 is arranged between the third and fourth intermediate plates 113 and 114 so as to be spaced away therefrom. A fourth opening portion 113a, for accommodating the second coil spring 21 and the pair of second seat 22, is formed at portions of the third intermediate plate 113, corresponding to the second damper portion 3c, which is displaced from the first damper portion 3a in the axial direction. The third intermediate plate 113 is provided in such a way that end surfaces of the fourth opening portion 113a in the circumferential direction contact/spaced away from the pair of second seat 22. The third intermediate plate 113 is slidably press-fitted with the third thrust member 23 at the second hysteresis portion 3d, which is arranged at a radially more inward portion of the third intermediate plate 113 than the second damper portion 3c.

The fourth intermediate plate 114, formed into a substantially circular-shape, outputs the rotational torque, inputted by the first damper portion 3a and the first hysteresis portion 3b, via the second and third intermediate plates 112 and 113, while inputting the rotational torque into the second damper portion 3c and the second hysteresis portion 3d. The fourth intermediate plate 114 together with the third intermediate plate 113 is connected to the second intermediate plate 112 in a vicinity of radially outward end of the fourth intermediate plate 114 by means of the rivet, and the like. The fourth intermediate plate 114 in combination with the third intermediate plate 113 is arranged so that the output plate 116 is arranged between the third and fourth intermediate plates 113 and 114 so as to be spaced away therefrom. A fifth opening portion 114a, for accommodating the second coil spring 21 and the pair of second seat 22, is formed at portions of the fourth intermediate plate 114, corresponding to the second damper portion 3c, which is displaced from the first damper portion 3a in the axial direction. The fourth intermediate plate 114 is provided in such a way that end surfaces of the fifth opening portion 114a in the circumferential direction contact/spaced away from the pair of second seat 22. The fourth intermediate plate 114 supports the second coned disc spring 25 at the second hysteresis portion 3d, which is arranged at a radially more inward portion of the fourth intermediate plate 113 than the second damper portion 3c.

The rivet 115 caulks and fixes the first and second intermediate plates 111 and 112. The rivet 115 is configured so that a diameter of the shaft portion thereof, which is arranged between the first and second intermediate plates 111 and 112, is set to be larger than a diameter of caulk portions thereof, which are respectively formed at the end portions of the rivet 115. The shaft portion of the rivet 115 is inserted through the hole 13c of the input plate 13 so as to be movable in the circumferential direction within a distance defined by the hole 13c.

The output plate 116 outputs a rotational torque inputted by the second damper portion 3c and the second hysteresis portion 3d. The output plate 116 is arranged between the third and fourth intermediate plates 113 and 114 to be spaced away therefrom. The sixth opening portion 116a, for accommodating the second coil spring 21 and the pair of second seat 22, is formed at a radially outward portion of the output plate 116, corresponding to the second damper portion 3b. The output plate 116 is provided in such a way that end surfaces of the sixth opening portion 116a in the circumferential direction contact/spaced away from the pair of second seat 22. The output plate 116 is slidably sandwiched between the third and fourth thrust members 23 and 24 at surfaces of the second hysteresis portion 3d, which is arranged at a radially more inward portion of the output plate 116 than the second damper portion 3b, the surfaces extending to be substantially orthogonal relative to the axial direction. The output plate 116 is arranged between the first and second friction materials 32 and 33, at the portion of the output plate 116 corresponding to the limiter portion 3e, which is arranged at a radially more outward portion of the output plate 116 than second hysteresis portion 3d, and the first and second friction materials 32 and 33 are fixed at the output plate 116 by means of a rivet, and the like.

The limiter plate 117, formed into a substantially cylindrical-shape, is a component of the limiter portion 3e, and is connected to the hub 47. The limiter plate 117 supports the pressure plate 30 and the third coned disc spring 31 so as to restrict relative rotation between the limiter plate 117 and each of the pressure plate 30 and the third coned disc spring 31, and so that the pressure plate 30 and the third coned disc spring 31 are movable in the axial direction. A first surface of the limiter plate 117 is press-fitted with the third coned disc spring 31, and a second surface of the limiter plate 117 facing the first surface thereof is slidably press-fitted with the first friction material 32.

The guide 118 supports the input plate 13 and the second intermediate plate 112 at radially inward end portions of the input plate 13 and the second intermediate plate 112 so as to be rotatable relative to the hub 47.

According to embodiment 6-3, advantages similar to embodiment 6 will be obtained. In addition, the limiter portion 3e is arranged at the power transmission path between the second damper portion 3e and the second rotational shaft 4 (see FIG. 18). Therefore, inertia of components arranged at an output side (i.e. at a position radially more outward of the damper device 3 than the second damper portion 3c) is increased and consequently, performance of absorbing noise and vibration may be further improved. Further, the input plate 13 and the second intermediate plate 112 are supported by the hub 47 via the guide 118 so as to be rotatable relative to the hub 47. Therefore, eccentricity of the input plate 13 and the second intermediate plate 112 may be prevented, and therefore requiring less space and less cost.

A modified example (embodiment 6-4) of the damper device 3 according to embodiment 6 will be described hereinafter with reference to the attached drawings.

The damper device 3 according to embodiment 6-4 is configured so that the first damper portion 3a and the second damper portion 3c are displaced in the axial direction and aligned in the axial direction. Further, the first, second and third intermediate plates 104, 105 and 106 are supported by the hub 27 via a guide 119 at radially inward portions of the first, second and third intermediate plates 104, 105 and 106 so as to be rotatable relative to the hub 27. Other configurations of the damper device 3 are similar to embodiment 6 (see FIG. 20).

According to embodiment 6-4, advantages similar to embodiment 6 may be obtained. Further, the first damper portion 3a and the second damper portion 3c are displaced in the axial direction and aligned in the axial direction, therefore, requiring less space in the radial direction. Furthermore, the first, second and third intermediate plates 104, 105 and 106 are supported by the hub 27 via the guide 119 so as to be rotatable relative to the hub 27. Therefore, eccentricity of the first, second and third intermediate plates 104, 105 and 106 may be prevented, thereby requiring less space and less cost.

[Embodiment 7]

The damper device 3 according to embodiment 7 will be described hereinafter with reference to the attached drawings.

Figure 26:
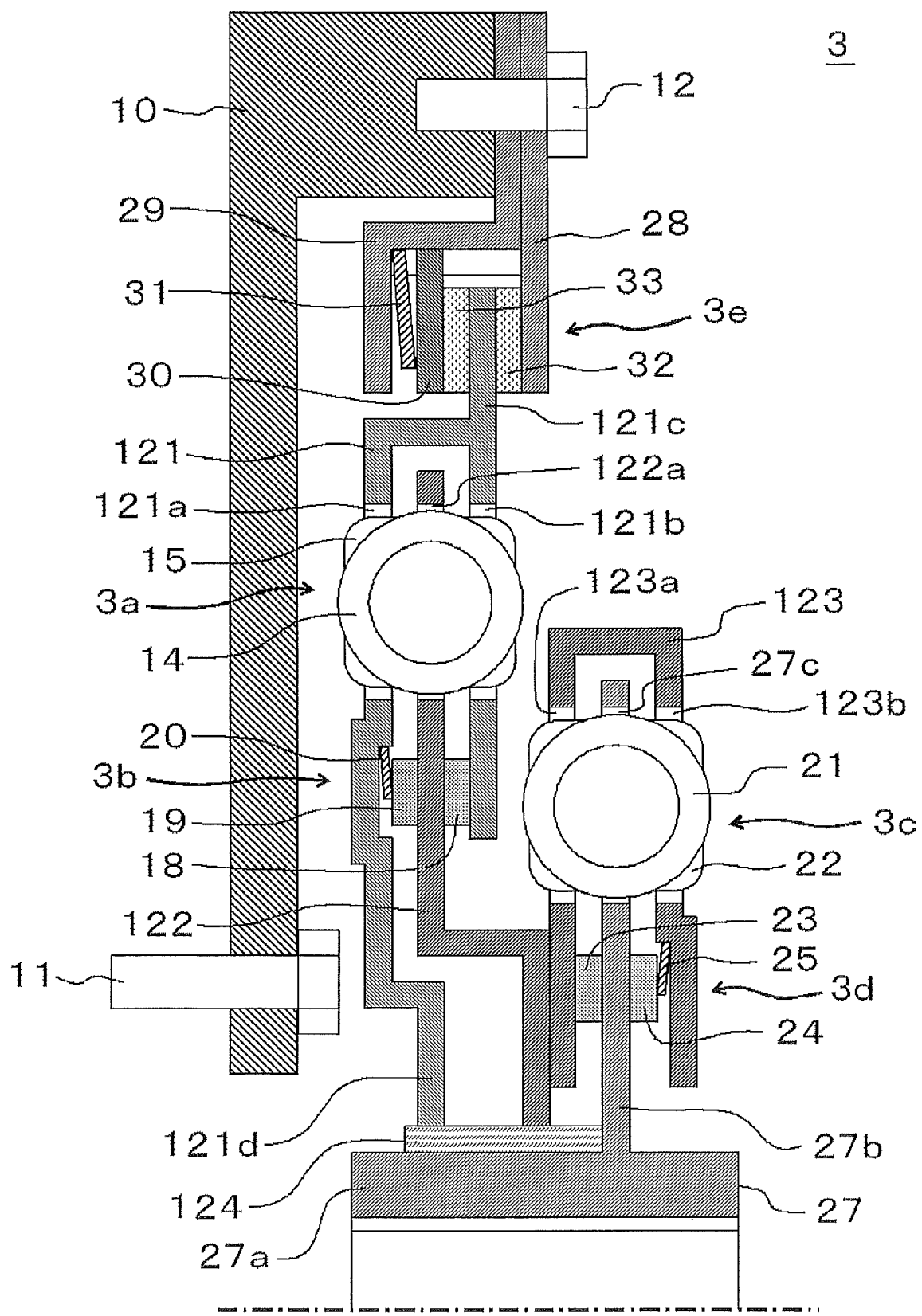
FIG. 26 is a cross-sectional view schematically illustrating the configuration of the damper device according to embodiment 7.

According to the configuration shown in FIG. 26, the damper device 3 according to embodiment 7 includes an input plate 121, first and second intermediate plates 122 and 123 and the output plate (the hub 27). The limier portion 3e is arranged at a radially more outward portion of the damper device 3 than the first damper portion 3a. The first damper portion 3a and the second damper portion 3c are arranged so as to be displaced from each other in the axial direction.

The damper device 3 includes the first plate 10, the first and second bolts 11 and 12, the second and third plates 28 and 29, the pressure plate 30, the third coned disc spring 31, the first and second friction materials 32 and 33, the input plate 121, the first coil spring 14, the pair of first seat 15, the first and second intermediate plates 122 and 123, the first and second thrust members 18 and 19, the first coned disc spring 20, the second coil spring 21, the pair of second seat 22, the third and fourth thrust members 23 and 24, the second coned disc spring 25, the hub 27 and the guide 124.

The first plate 10, the first and second bolts 11 and 12, the first coil spring 14, the pair of first seat 15, the first and second thrust members 18 and 19, the first coned disc spring 20, the second coil spring 21, the pair of second seat 22, the third and fourth thrust members 23 and 24, the second coned disc spring 25 and the hub 27 are similar to embodiment 1 (see FIG. 1). Further, the second and third plates 28 and 29, the pressure plate 30, the third coned disc spring 31 and the first and second friction materials 32 and 33 are similar to embodiment 1-1 (see FIG. 3). The configuration of the damper device 3 according to embodiment 7 is similar to the configuration of the damper device 3 shown in FIG. 4.

The input plate 121, formed into a substantially-circular shape, inputs a rotational torque, outputted from the limiter portion 3e, to the first damper portion 3a and the first hysteresis portion 3b. The input plate 121 includes a radially outwardly extending portion 121c, which extends from a radially more outward portion of the input plate 121 than the first damper portion 3a, toward a portion of the input plate 121, sandwiched between the first and second friction materials 32 and 33. The first and second friction materials 32 and 33 are fixed at the radially outwardly extending portion 121c by means of a rivet, and the like. A radially intermediate portion of the input plate 121 integrally includes a first plate portion and a second plate portion facing the first plate portion. The input plate 121 extends so as to interpose the first intermediate plate 122 between the first and second plate portions of the intermediate portion of the input plate 121 in a manner where the input plate 121 is spaced away from the first intermediate plate 122. First and second opening portions 121a and 121b, for accommodating the first coil spring 14 and the pair of first seat 15, are formed at a radially more inward portion of the input plate 121 than the limiter portion 3e, corresponding to the first damper portion 3a. The input plate 121 is provided in such a way that end surfaces of each of the first and second opening portions 121a and 121b in the circumferential direction contact/spaced away from the pair of first seat 15. The first plate portion of the radially intermediate portion of the input plate 121 is slidably press-fitted with the first thrust member 18 at the first hysteresis portion 3b, which is arranged at a radially more inward portion of the input plate 121 than the first damper portion 3a. The second plate portion of the radially intermediate portion of the input plate 121 supports the first coned disc spring 20. The input plate 121 includes a radially inwardly extending portion 121d, which extends to a vicinity of a hub portion 27a of the hub 27. The input plate 121 is supported by the hub 27 via the guide 124 at an inner circumference of the radially inwardly extending portion 121d so as to be rotatable relative to the hub 27.

The first intermediate plate 122, formed into a substantially circular-shape, outputs the rotational torque, inputted by the first damper portion 3a and the first hysteresis portion 3b, while inputting the rotational torque into the second damper portion 3c and the second hysteresis portion 3d via the second intermediate plate 123. The first intermediate plate 122 is arranged between the first and second plate portions of the radially intermediate portion of the input plate 121 so as to be spaced away therefrom. A third opening portion 122a, for accommodating the first coil spring 14 and the pair of first seat 15, is formed at a radially outward portion of the first intermediate plate 122, corresponding to the first damper portion 3a. The first intermediate plate 122 is provided in such a way that end surfaces of the second opening portion 122a in the circumferential direction contact/spaced away from the pair of first seat 15. The first intermediate plate 122 is slidably sandwiched between the first and second thrust members 18 and 19 at surfaces of the first hysteresis portion 3b, which is arranged at a radially more inward portion of the first intermediate plate 122 than the first damper portion 3a, the surfaces extending to be substantially orthogonal relative to the axial direction. The first intermediate plate 122 is connected to the second intermediate plate 123 at a position displaced in the axial direction, by means of a rivet, and the like. The first intermediate plate 122 is supported by the hub 27 via the guide 124 at an inward end portion of the first intermediate plate 122 so as to be rotatable relative to the hub 27.

The second intermediate plate 123, formed into a substantially-circular shape, outputs a rotational torque, inputted by the first damper portion 3a and the first hysteresis portion 3b, via the first intermediate plate 122, while inputting the rotational torque into the second damper portion 3a and the second hysteresis portion 3d. The second intermediate plate 123 integrally includes a first plate portion and a second plate portion facing the first plate portion. The second intermediate plate 123 extends so as to interpose the output plate 27b of the hub 27 between the first and second plate portions of the second intermediate plate 123 in a manner where the second intermediate plate 123 is spaced away from the output plate 27b of the hub 27. Fourth and fifth opening portions 123a and 123b, for accommodating the second coil spring 21 and the pair of second seat 22, are formed at a portion of the second intermediate plate 123, corresponding to the second damper portion 3c, which is displaced from the first damper portion 3a in the axial direction. The intermediate plate 123 is provided in such a way that end surfaces of each of the first and second opening portions 123a and 123b in the circumferential direction contact/spaced away from the pair of second seat 22. The first plate portion of the second intermediate plate 123 is slidably press-fitted with the third thrust member 23 at the second hysteresis portion 3c, which is arranged at a radially more inward portion of the first intermediate plate 123 than the second damper portion 3c. The second plate portion of the second intermediate plate 123 supports the second coned disc spring 25.

The guide 124 supports the input plate 121 and the first intermediate plate 122 at the radially inwardly extending portion 121d of the input plate 121 and at a radially inward end portion of the second intermediate plate 112 so as to be rotatable relative to the hub 27.

According to embodiment 6-4, advantages similar to embodiment 6 will be obtained. In addition, the limiter portion 3e is provided. Therefore, an excessive torque is reduced and as a result, a possibility of damaging the damper device 3 may be reduced. Further, the limiter portion 3e is arranged at the power transmission path between the first rotational shaft 2 (see FIG. 4) and the first damper portion 3a. Therefore, the limiter portion 3e is arranged at a radially outward position of the damper device 3, and as a result, a torque is easily set. Furthermore, the first intermediate plate 121 and the second intermediate plate 122 are supported by the hub 27 via the guide 124 so as to be rotatable relative to the hub 27. Therefore, eccentricity of the first intermediate plate 121 and the second intermediate plate 122 may be prevented, and therefore requiring less space and less cost.

[Embodiment 8]

The damper device 3 according to embodiment 8 will be described hereinafter with reference to the attached drawings.

Figure 27:
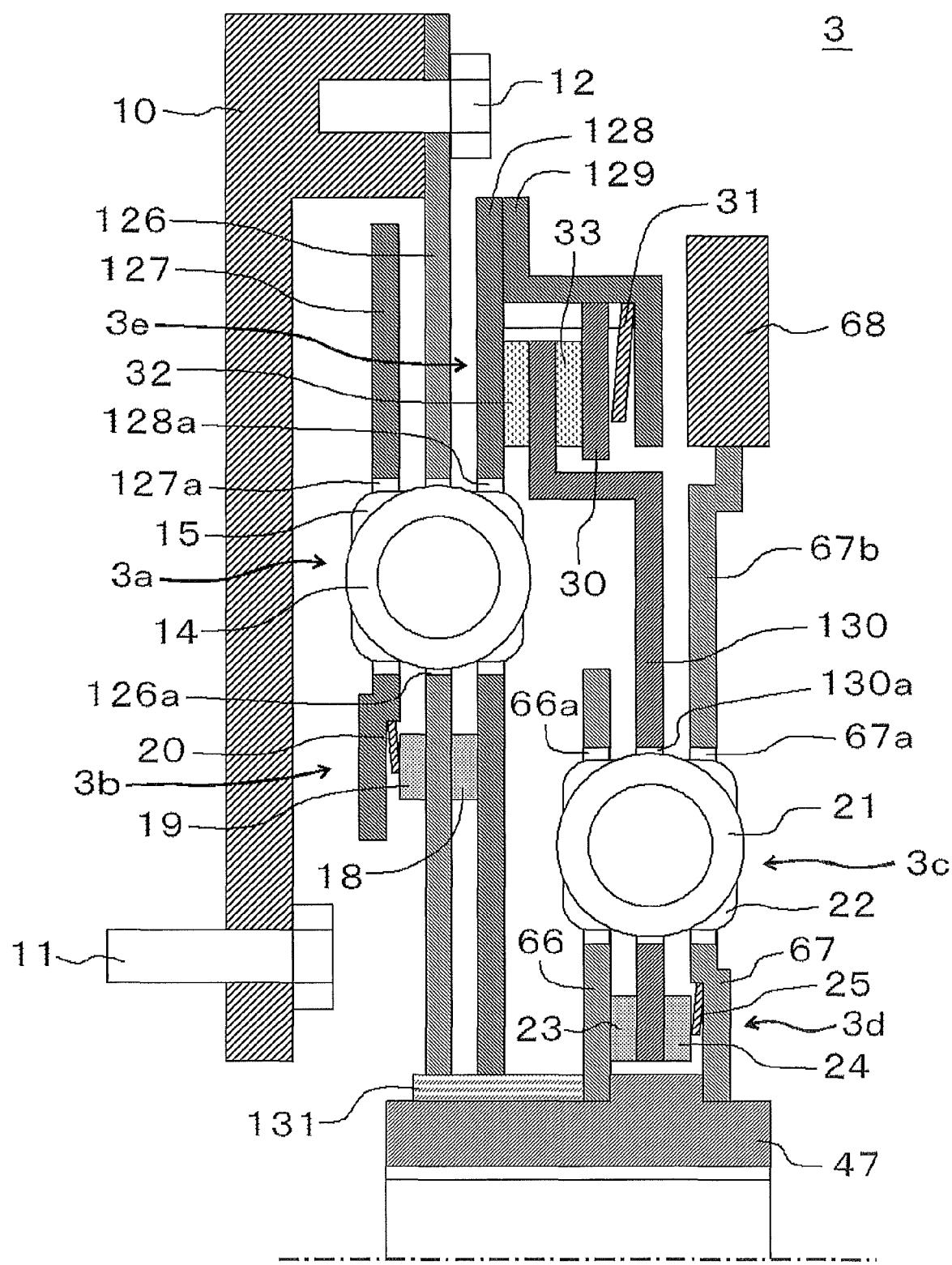
FIG. 27 is a cross-sectional view schematically illustrating the configuration of the damper device according to embodiment 8.

According to the configuration shown in FIG. 27, the damper device 3 according to embodiment 8 includes an input plate 126, first, second and third intermediate plates 127, 128 and 130 and the first and second output plates 66 and 67. The limiter portion 3e is arranged at a radially more outward portion of the damper device 3 than the first damper portion 3a. The first and second damper portions 3a and 3c are arranged so as to be displaced from each other in the axial direction.

The damper device 3 includes the first plate 10, the first and second bolts 11 and 12, the input plate 126, the first coil spring 14, the pair of first seat 15, the first, second and third intermediate plates 127, 128 and 130, a limiter plate 129, the pressure plate 30, the third coned disc spring 31, the first and second friction materials 32 and 33, the first and second thrust members 18 and 19, the first coned disc spring 20, the second coil spring 21, the pair of second seat 22, the third and fourth thrust members 23 and 24, the second coned disc spring 25, the first and second output plates 66 and 67, the inertia member 68, the hub 47 and a guide 131.

The first plate 10, the first and second bolts 11 and 12, the first coil spring 14, the pair of first seat 15, the first and second thrust members 18 and 19, the first coned disc spring 20, the second coil spring 21, the pair of second seat 22, the third and fourth thrust members 23 and 24, the second coned disc spring 25 are similar to embodiment 1 (see FIG. 1). Further, the pressure plate 30, the third coned disc spring 31 and the first and second friction materials 32 and 33 are similar to embodiment 1-1 (see FIG. 3). Still further, the hub 47 is similar to embodiment 2 (see FIG. 6). Furthermore, the first and second output plates 66 and 67 and the inertia member 68 are similar to embodiment 2-2 (see FIG. 9). The configuration of the damper device 3 according to embodiment 8 is similar to the configuration of the damper device 3 shown in FIG. 8.

The input plate 126, formed into a substantially-circular shape, inputs a rotational torque to the first damper portion 3a and the first hysteresis portion 3b. The input plate 13 is fixed at the first plate 10, in a vicinity of a radially outward end portion of the input plate 13, by means of the second bolt 12. The input plate 13 is arranged between the first and second intermediate plates 127 and 128 to be spaced away therefrom. A first opening portion 126a, for accommodating the first coil spring 14 and the pair of first seat 15, is formed at a radially intermediate portion of the input plate 126, corresponding to the first damper portion 3a. The second intermediate plate 127 is provided in such a way that end surfaces of the first opening portion 126a in the circumferential direction contact/spaced away from the corresponding pair of first seat 15. The input plate 126 is slidably sandwiched between the first and second thrust members 18 and 19 at the first hysteresis portion 3b, which is arranged at a radially inward portion of the first plate 126 than the first damper portion 3a. The input plate 126 is supported by the hub 47 via the guide 131 at a radially inward end portion of the input plate 126 so as to be rotatable relative to the hub 47.

The first intermediate plate 127, formed into a substantially circular-shape, outputs the rotational torque, inputted by the first damper portion 3a and the first hysteresis portion 3b, while inputting the rotational torque into the second damper portion 3c and the second hysteresis portion 3d via the second intermediate plate 128, the limiter portion 3e and the third intermediate plate 130. The first intermediate plate 127 is connected to the second intermediate plate 128 by means of a rivet, and the like. The first intermediate plate 127 in combination with the second intermediate plate 128 is arranged so that the input plate 126 is arranged between the first and second intermediate plates 127 and 128 to be spaced away therefrom. A second hole 127*a*, for accommodating the first coil spring 14 and the pair of first seat 15, is formed at a portion of the first intermediate plate 127, corresponding to the first damper portion 3*a*. The first intermediate plate 127 is provided in such a way that end surfaces of the second opening portion 127*a* in the circumferential direction contact/spaced away from the pair of first seat 15. The first intermediate plate 127 supports the first coned disc spring 20 at the first hysteresis portion 3*b*, which is arranged at a radially more inward portion of the first intermediate plate 127 than the first damper portion 3*a*.

The second intermediate plate 128, formed into a substantially circular-shape, outputs the rotational torque, inputted by the first damper portion 3*a* and the first hysteresis portion 3*b*, while inputting the rotational torque into the second damper portion 3*c* and the second hysteresis portion 3*d* via the limiter portion 3*e* and the third intermediate plate 130. The second intermediate plate 128 is connected to the first intermediate plate 127 by means of the rivet, and the like. The second intermediate plate 128 in combination with the first intermediate plate 126 is arranged so that the input plate 126 is arranged between the first and second intermediate plates 127 and 128 to be spaced away therefrom. The second intermediate plate 128 is connected to the limiter plate 129 in a vicinity of a radially outward end of the second intermediate plate 128, by means of a rivet, and the like. The second intermediate plate 128 is press-fitted with the first friction material 32 at the limiter portion 3*e*. A third opening portion 128*a*, for accommodating the first coil spring 14 and the pair of first seat 15, is formed at a radially more inward portion of the second intermediate plate 128 than the limiter portion 3*e*, corresponding to the first damper portion 3*a*. The second intermediate plate 128 is provided in such a way that end surfaces of the third opening portion 128*a* in the circumferential direction contact/spaced away from the pair of first seat 15. The second intermediate plate 128 is slidably press-fitted with the first thrust member 18 at the second hysteresis portion 3*d*, which is arranged at a radially more inward portion of the second intermediate plate 128 than the first damper portion 3*a*. The second intermediate plate 128 is supported by the hub 47 via the guide 131 at a radially inward end portion of the second intermediate plate 128 so as to be rotatable relative to the hub 47.

The limiter plate 129, formed into a substantially cylindrical-shape, is a component of the limiter portion 3*e*, and is connected to a vicinity of radially outward portion of the second intermediate plate 128 by means of a rivet, and the like. The limiter plate 129 in combination with the second intermediate plate 128 is arranged so that the third intermediate plate 130 is arranged between the limiter plate 129 and the second intermediate plate 128 to be spaced away therefrom. The limiter plate 129 supports the pressure plate 30 and the third coned disc spring 31 so as to restrict relative rotation between the limiter plate 129 and each of the pressure plate 30 and the third coned disc spring 31, and so that the pressure plate 30 and the third coned disc spring 31 are movable in the axial direction. The limiter plate 129 is press-fitted with the third coned disc spring 31.

The third intermediate plate 130, formed into a substantially circular-shape, inputs the rotational torque, outputted from the first damper portion 3*a* and the first hysteresis portion 3*b*, into the second damper portion 3*c* and the second hysteresis portion 3*d* via the second intermediate plate 128 and the limiter portion 3*e*. A radially more outward portion of the third intermediate plate 130 than the second damper portion 3*c* is sandwiched between the first and second friction materials 32 and 33. The first and second friction materials 32 and 33 are fixed at the third intermediate plate 130 by means of a rivet, and the like. A fourth opening portion 130*a*, for accommodating the second coil spring 21 and the pair of second seat 22, is formed at a radially more inward portion of the third intermediate plate 130 than the limiter portion 3*e*, corresponding to the second damper portion 3*c*. The third intermediate plate 130 is provided in such a way that end surfaces of the fourth opening portion 130*a* in the circumferential direction contact/spaced away from the pair of second seat. The third intermediate plate 130 is slidably sandwiched with the third and fourth thrust members 23 and 24 at the surfaces of the second hysteresis portion 3*d*, which is arranged at a radially more inward portion of the third intermediate plate 130 than the first damper portion 3*a*, the surfaces extending to be substantially orthogonal relative to the axial direction.

The guide 131 supports the input plate 126 and the second intermediate plate 128 at radially inward end portions of the input plate 126 and the second intermediate plate 128 so as to be rotatable relative to the hub 47.

According to embodiment 8, advantages similar to embodiment 1 may be obtained. In addition, the limiter portion 3*e* is provided. Therefore, an excessive torque is reduced, and as a result, a possibility of damaging the damper device 3 may be reduced. Further, the limiter portion 3*e* is arranged at the power transmission path between the first and second damper portions 3*a* and 3*c*, therefore requiring less space and less cost. Still further, the inertia member 68 is attached to the second output plate 67. Therefore, inertia of the hub 47, which is connected to the second output plate 67, is increased, and as a result, performance of absorbing the noise and vibration may be improved. Furthermore, the input plate 126 and the second intermediate plate 128 are supported by the hub 47 via the guide 131 so as to be rotatable relative to the hub 47. Therefore, eccentricity of the input plate 126 and the second intermediate plate 128 may be prevented, and therefore requiring less space and less cost.

According to embodiments 1, 1-1, 1-2, 2, 2-1, 2-2, 3, 3-1, 3-2, 3-3, 3-4, 3-5, 4, 4-1, 5, 6, 6-1, 6-2, 6-3, 6-4, 7, 8, the first and second hysteresis portions 3*b* and 3*d* include different hysteresis torque values, respectively.

According to embodiments 1-1, 1-2, 2-1, 2-2, 3-1, 3-2, 3-3, 3-4, 3-5, 4-1, 6-1, 6-2, 6-3, 4, 8, the damper device 3 further includes the limiter portion 3*e* sliding when a torsion reaches a level where the torsion is not absorbed by the first and second damper portions 3*a* and 3*c* and the first and second hysteresis portions 3*b* and 3*d* in the power transmission path.

According to embodiments 1-1, 1-2, 2-2, 3-2, 3-3, 3-4, 3-5, 6-1, 7, the limiter portion 3*e* is arranged to be closer to the input side than the first damper portion 3*a* closest to the input side among the plurality of first and second damper portions 3*a* and 3*c* and the first hysteresis portion closest to the input side among the plurality of first and second hysteresis portions 3*b* and 3*d*, in the power transmission path.

According to embodiments 2-1, 3-1, 6-2, 8, the limiter portion 3*e* is arranged in the power transmission path between the first damper portion 3*a* closest to the input side and the second damper portion 3*c* closest to the output side and between the first hysteresis portion 3*b* closest to the input side and the second hysteresis portion 3*d* closest to the output side.

According to embodiments 2-1, 3-1, 6-2, 8, the limiter portion 3e is provided at each of the intermediate plate 48, 49, 75, 76, 105, 106, 128 and 130.

According to embodiments 4-1, 6-3, the limiter portion 3e is arranged to be closer to the output side than the second damper portion 3c closest to the output side among the plurality of first and second damper portions 3a and 3c and the second hysteresis portion 3b closest to the output side among the plurality of first and second hysteresis portions 3b and 3d, in the power transmission path.

According to embodiments 4-1, the limiter portion 3e is arranged at a position radially corresponding to the first damper portion 3a, arranged at the radially most outward position among the plurality of first and second damper portions 3a and 3c, or at a radially more outward position than first the damper portion 3a, arranged at the radially most outward position among the plurality of first and second damper portions 3a and 3c.

According to embodiments 1, 1-1, 1-2, 2, 2-1, 2-2, 3, 3-1, 3-2, 3-3, 3-4, 3-5, 4, 4-1, 5, 6, 6-1, 6-2, 6-3, 6-4, 7, 8, the damper device 3 further includes the first and second coil springs 14 and 21 whose compressed direction extends along the circumferential direction at the first and second damper portions 3a and 3c.

According to embodiments 1, 1-1, 1-2, 3, 3-2, 3-3, 3-4, 3-5, 4-1, 5, 6, 6-1, 6-2, 6-3, 6-4, 7, 8, the damper device 3 further includes the first rotational shaft 2 outputting the rotational torque of the engine 1 to an outside of the engine 1, the hub 27, 47 and 97 connected to the second rotational shaft 4 at the outer circumference thereof and arranged to be closer to the output side than the second damper portion 3b closest to the output side among the plurality of first and second damper portions 3a and 3c and the second hysteresis portion 3d closest to the output side among the plurality of first and second hysteresis portions 3b and 3d, in the power transmission path, and the guide 26, 84, 86, 98, 118, 119, 124 and 131 guiding one of the first rotational shaft 2, the plate 10 and 54 connected to the first rotational shaft 2, the input plate 13, 70, 71, 82, 121 and 126, the intermediate plate 16, 83, 101, 106, 112, 123 and 128 and 130 and the output plate 27, 66 and 91 so as to be rotatable relative to the hub 27, 47 and 97.

According to embodiments 3-2, 3-3, 3-4, 3-5, 4-1, 6-3, 6-4, 7, 8, the guide 84, 86, 98, 118, 119, 124 and 131 commonly guides two or more of the first rotational shaft 2, the plate 10 and 54 connected to the first rotational shaft 2, the input plate 13, 82, 121 and 126, the intermediate plate 83, 89, 104, 105, 106, 112, 122, 123 and 128 and the output plate 27, 66, 91 and 97.

According to embodiments 3-2, 3-3, 3-4, 3-5, the guide 84, 86, 98, 118, 119, 124 and 131 is arranged between two of the input plate 13, 82, 121 and 126, the intermediate plate 83, 89, 104, 105, 106, 112, 122, 123 and 128 and the output plate 27, 66, 91 and 97, while functioning as a component of one of the first and second hysteresis portions 3b and 3d.

According to embodiments 2-2, 4-1, 8, the output plate 66, 67, 91 and 97 includes a portion extending radially more outwardly than a rotational torque receiving portion of the second damper portion 3c closest to the output side among the plurality of first and second damper portions 3a and 3c and a rotational torque receiving portion of the first hysteresis portion 3b closest to the output side among the plurality of first and second hysteresis portions 3b and 3d.

According to embodiments 2-2, 8, the inertia member 68 attached to the output plate 67.

According to embodiments 6, 6-1, 6-2, 6-3, 6-4, 7, 8, at least two of the first and second damper portions 3a and 3c are arranged at positions displaced from each other in an axial direction.

According to embodiments 6, 6-1, 6-3, a plurality of plates of one of the input plate, the intermediate plate 105, 106, 111 and 112 and the output plate is riveted by means of the rivet 107 and 115 and at least one of the input plate 13, the intermediate plate 104 and the output plate includes the hole 13b and 104b at a position corresponding to the rivet 107 and 115 in the axial direction.

According to embodiments 1, 1-1, 1-2, 2, 2-1, 2-2, 3, 3-1, 3-2, 3-3, 3-4, 3-5, 4, 4-1, 5, 6, 6-1, 6-2, 6-3, 6-4, 7, 8, the plurality of the damper portions 3a and 3c includes the first damper portion and the second damper portion, the maximum torsion torque of the first damper portion is set to be equal to or more than the engine torque and the maximum torsion torque of the second damper portion is set to be more than half of the engine torque.

According to embodiments 1, 1-1, 1-2, 2, 2-1, 2-2, 3, 3-1, 3-2, 3-3, 3-4, 3-5, 4, 4-1, 5, 6, 6-1, 6-2, 6-3, 6-4, 7, 8, one of the first and second damper portions 3a and 3c includes the coil spring (the first coil spring 14 or the second coil spring 21) and the pair of resin-made seat (the first seat 15 or the second seat 22), and one of the resin-made seat (the first seat 15 or the second seat 22) is arranged at one end portion of the coil spring (the first coil spring 14 or the second coil spring 21) and the other of the resin-made seat (the first seat 15 or the second seat 22) is arranged at the other end portion of the coil spring (the first coil spring 14 or the second coil spring 21).

According to embodiments 1-2, the first and second damper portions 3a and 3c and the first and second hysteresis portions 3b and 3d are covered by the second and third plates 28 and 29, the first and second seal 34 and 35 and the hub 27 and lubricated by oil.

Accordingly, the first and second damper portions 3a and 3c absorb the torsion generated by a relative rotation between the input plate 6, 13, 37, 38, 62, 70, 71, 82, 121 and 126 and the intermediate 7, 16, 17, 42, 48, 49, 63, 72, 73, 74, 75, 76, 83, 89, 90, 100, 101, 102, 104, 105, 106, 111, 112, 113, 114, 122, 123, 127, 128 and 130 and between the intermediate plate 7, 16, 17, 42, 48, 49, 63, 72, 73, 74, 75, 76, 83, 89, 90, 100, 101, 102, 104, 105, 106, 111, 112, 113, 114, 122, 123, 127, 128 and 130 and the output plate 8, 27, 43, 44, 47, 66, 67, 91, 97 and 116. Therefore, a torsional rigidity may be set at a relatively low level so as to absorb a high torque. Further, the inertia of the output plate 8, 27, 43, 44, 47, 66, 67, 91, 97 and 116 is structurally set to be large. Therefore, performance of absorbing noise and vibrations is increased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A damper device inputting torque of a power source from an input side and outputting the torque to an output side, the damper device comprising:

a plurality of damper portions arranged in series with each other in a power transmission path and absorbing torsion by means of elastic force;

a plurality of hysteresis portions arranged in parallel with the plurality of damper portions at the power transmission path and absorbing the torsion by means of friction force;

an input plate inputting rotational torque into one of the damper portion closest to the input side among the plurality of damper portions and the hysteresis portion closest to the input side among the plurality of hysteresis portions;

an intermediate plate transmitting the rotational torque from the damper portion, arranged at the input side, and the hysteresis portion, arranged at the input side, to the damper portions, arranged at the output side, and the hysteresis portions, arranged at the output side, at a position between the damper portion closest to the input side and the damper portion closest to the output side and between the hysteresis portion closest to the input side and the hysteresis portion closest to the output side;

an output plate outputting the rotational torque from the damper portion closest to the output side among the plurality of damper portions and the hysteresis portion closest to the output side among the plurality of damper portions;

a limiter portion sliding when a torsion reaches a level where the torsion is not absorbed by the damper portions and the hysteresis portions in the power transmission path; and wherein the limiter portion is arranged to be closer to the output side than the damper portion closest to the output side among the plurality of damper portions and the hysteresis portion closest to the output side among the plurality of hysteresis portions, in the power transmission path.

2. The damper device according to claim 1, wherein
the hysteresis portions include different hysteresis torque values, respectively.

3. The damper device according to claim 1, wherein
the limiter portion is arranged at a position radially corresponding to the damper portion, arranged at the radially most outward position among the plurality of damper portions, or at a radially more outward position than the damper portion, arranged at the radially most outward position among the plurality of damper portions.

4. The damper device according to claim 1, further including a compressible arc spring.

5. The damper device according to claim 1, further including
a first rotational shaft outputting rotational torque of an engine to an outside of the engine;

a hub connected to a second rotational shaft at an outer circumference thereof and arranged to be closer to the output side than the damper portion closest to the output side among the plurality of damper portions and the hysteresis portion closest to the output side among the plurality of hysteresis portions, in the power transmission path; and a guide guiding one of the first rotational shaft, a connecting plate connected to the first rotational shaft, the input plate, the intermediate plate and the output plate so as to be rotatable relative to the hub.

6. The damper Odevice according to claim 5, wherein
the guide commonly guides two or more of the first rotational shaft, the connecting plate connected to the first rotational shaft, the input plate, the intermediate plate and the output plate.

7. The damper device according to claim 5, wherein
the guide is arranged between two of the input plate, the intermediate plate and the output plate, while functioning as a component of one of the hysteresis portions.

8. The damper device according to claim 1, wherein
the output plate includes a portion extending radially more outwardly than a rotational torque receiving portion of the damper portion closest to the output side among the plurality of damper portions and a rotational torque receiving portion of the hysteresis portion closest to the output side among the plurality of hysteresis portions.

9. The damper device according to claim 1, wherein
at least two of the damper portions are arranged at positions displaced from each other in an axial direction.

10. The damper device according to claim 9, wherein
a plurality of plates of one of the input plate, the intermediate plate and the output plate is riveted by means of a rivet and
at least one of the input plate, the intermediate plate and the output plate includes an opening portion at a position corresponding to the rivet in the axial direction.

11. The damper device according to claim 1, wherein
the plurality of the damper portions includes a first damper portion and a second damper portion,
a maximum torsion torque of the first damper portion is set to be equal to or more than an engine torque and
a maximum torsion torque of the second damper portion is set to be more than half of the engine torque.

12. The damper device according to claim 1, wherein
one of the damper portions includes a coil spring and a pair of seats, and one of the seats is arranged at one end portion of the coil spring and the other of the seats is arranged at the other end portion of the coil spring.

* * * * *